(12) United States Patent
Chen et al.

(10) Patent No.: US 6,367,933 B1
(45) Date of Patent: Apr. 9, 2002

(54) METHOD AND APPARATUS FOR PREVENTING KEYSTONE DISTORTION

(75) Inventors: Shuei-Lin Chen, Kao-Hsiung; Chun-Hung Chen, Hsin-Chu; Hou-Chun Ting, Chang-Hua; Meng-Shan Yang, Hsin-Chu; Ting-Yao Chang, Hsin-Chuang; Chun-Hao Kuo, Hsin-Chu, all of (TW)

(73) Assignee: Macronix International Co., Ltd. (TW)

( * ) Notice: Subject to any disclaimer, the term of this patent is extended or adjusted under 35 U.S.C. 154(b) by 0 days.

(21) Appl. No.: 09/446,796

(22) PCT Filed: Oct. 1, 1999

(86) PCT No.: PCT/US99/22726

§ 371 Date: Dec. 24, 1999

§ 102(e) Date: Dec. 24, 1999

(87) PCT Pub. No.: WO00/21282

PCT Pub. Date: Apr. 13, 2000

(51) Int. Cl.[7] ............................ G03B 21/00; H04N 5/64; H04N 3/22; H04N 3/223
(52) U.S. Cl. ............................ 353/69; 353/70; 348/745; 348/747; 348/744
(58) Field of Search ............... 353/69, 70; 348/745, 348/746, 747, 806, 580, 581, 583, 744

(56) References Cited

U.S. PATENT DOCUMENTS

| | | |
|---|---|---|
| 3,637,308 A | 1/1972 | Van Raalte et al. ........... 353/69 |
| 3,790,267 A | 2/1974 | Ramberg ..................... 353/70 |
| 5,008,702 A | 4/1991 | Tanaka et al. ................ 355/52 |
| 5,355,188 A | 10/1994 | Biles et al. ................... 353/69 |
| 5,455,647 A * | 10/1995 | Fujiwara ..................... 353/101 |
| 5,465,121 A | 11/1995 | Blalock et al. ............. 348/744 |
| 5,640,479 A | 6/1997 | Hegg et al. ................. 385/120 |
| 5,641,957 A * | 6/1997 | Chae ....................... 250/23.14 |
| 5,664,858 A * | 9/1997 | Woo ............................ 353/69 |
| 5,716,118 A | 2/1998 | Sato et al. .................... 353/98 |
| 5,720,539 A * | 2/1998 | Woo ............................ 353/69 |
| 5,752,758 A * | 5/1998 | Woo ............................ 353/69 |
| 5,764,311 A | 6/1998 | Bonde et al. ............... 348/746 |
| 5,795,046 A * | 8/1998 | Woo ............................ 353/69 |

* cited by examiner

*Primary Examiner*—Russell Adams
*Assistant Examiner*—Rodney Fuller
(74) *Attorney, Agent, or Firm*—Park, Vaughan & Fleming LLP

(57) ABSTRACT

A method and apparatus for preventing keystone distortion. A projected image is produced by projecting light through a display image rendered on a display device (e.g., and LCD panel) and onto a viewing surface at a non-perpendicular vertical and/or horizontal angle. An original image is deformed in proportion to the angle(s) to produce the display image. The original image may also be resized for storage in memory and/or to fit within a specified or usable area of the display device. An apparatus for preventing keystone distortion includes a digitizer module to receive and resize an original image (e.g., reduce it) for storage and a generator module to resize (e.g., enlarge) the image to fit the display device. Deformation of the image to prevent keystone distortion may be performed in either or both of the digitizer and generator for either or both a vertical and horizontal angle.

38 Claims, 32 Drawing Sheets

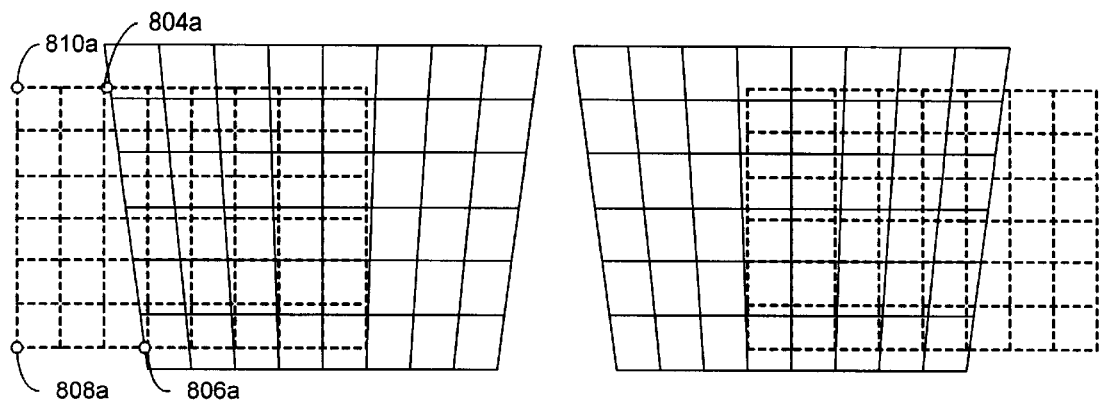
FIG. 8A  FIG. 8B
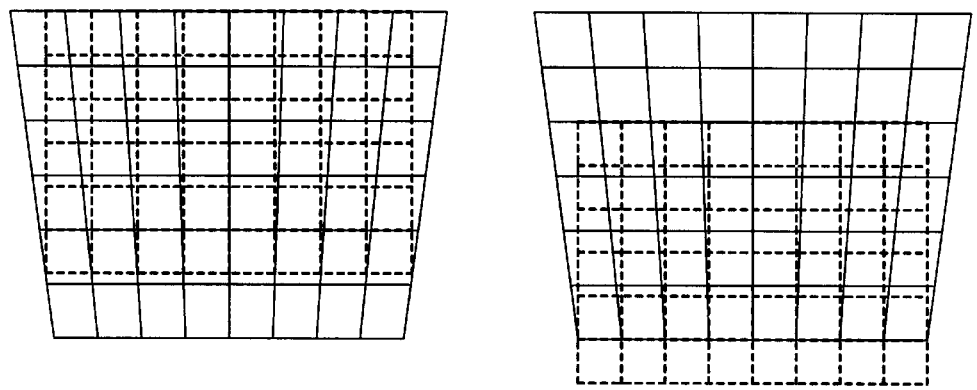
FIG. 8C  FIG. 8D
PROJECTION OF IMAGE_1: ─────
PROJECTION OF IMAGE_2: ----------

FIG. 8E  FIG. 8F

PROJECTION OF IMAGE_1: ⎯⎯⎯⎯⎯⎯
PROJECTION OF IMAGE_2: ----------------

IMAGE_2 BEFORE SHIFT UPWARD: ----------------

ORIGINAL IMAGE 1000

DECIMATION AND KEYSTONE CORRECTION

DISPLAY IMAGE 1002

ORIGINAL IMAGE 1300

DECIMATION AND KEYSTONE CORRECTION FOR $\theta$

ROTATE -90°

INTERPOLATION AND KEYSTONE CORRECTION FOR $\alpha$

ROTATE +90°

DISPLAY IMAGE 1302

ORIGINAL IMAGE 1400

REDUCTION

INTERPOLATION

KEYSTONE CORRECTION FOR θ

DISPLAY IMAGE 1402

ORIGINAL IMAGE 1500

DECIMATION

ROTATION -90°
&
INTERPOLATION

KEYSTONE
CORRECTION
α

METHOD AND APPARATUS FOR PREVENTING KEYSTONE DISTORTION

BACKGROUND

This invention relates to the fields of image processing and projection. More particularly, a computer-controlled projection system and methods of using the system to project an image without keystone distortion are provided.

An image projector or projection system is often used to produce an enlarged version of a video image. For example, an original image may be rendered on an LCD (Liquid Crystal Display) or other device through which light may be projected onto a viewing surface, in order to magnify or enlarge the original image. Where the projection system is aligned so as to project an image perpendicularly upon the screen, the projected image may accurately reproduce the proportions of the original image. However, projection systems are often situated at an angle to the viewing screen. As a result, the projected image typically suffers from what is known as keystone distortion and thus may differ substantially from the original image.

In particular, when the projection axis of the system is not perpendicular to the viewing screen, a portion of the projected image may appear distorted (e.g., stretched or compressed). For example, if the projector is situated below a line normal to the viewing area of the screen, then the image must be projected upward to the screen. As a result, the upper portion of the image may appear expanded or stretched in relation to the bottom portion, or the bottom portion of the image may appear condensed or contracted compared to the upper portion. The projected image may thus take on a trapezoidal or keystone shape. Similarly, if the projector is situated above or to one side or the other of a line normal to the viewing screen a different portion of the projected image may appear distorted. Depending upon the resolution or detail of the image being projected, the distortion may significantly degrade one's appreciation of the image.

A projector may be situated at a non-perpendicular angle to a viewing screen because of transient or temporary use of the equipment, because of a lack of space in front of the screen, because the projector may obstruct a person's view if placed normal to the center of the screen, and for other reasons. As the projector is moved further from the screen, a larger projected image may be possible but the keystone distortion increases commensurately.

One method by which the keystone distortion problem has been addressed involves mechanical compensation. In such a method, an LCD panel on which the original image is rendered, and through which light is passed to yield the projected image, may be rotated so as to be situated parallel to the plane in which the screen is located. This solution may cause high cost, however, and require manual adjustment for different environments. Each time the viewing screen or projector changes position, an LCD panel may need to be mechanically adjusted. This type of correction thus takes time to effect and depends upon the manual dexterity of an operator.

Beyond the keystone distortion problem, some projection systems incorporate multiple LCD panels (e.g., one for each of the three primary colors) in order to improve image quality. In such a case, the complexity of the system increases accordingly and further complicates correction of keystone distortion. In addition, present LCD projector systems lack the ability to easily impart useful image modifications such as luminance equalization or variably sized images.

SUMMARY

In one embodiment of the invention a system and methods are provided for modifying an image for projection without keystone distortion, where the projection system is aligned at a non-perpendicular angle to the surface on which the image is projected. In this embodiment an original image is resized, if necessary, and reshaped to offset keystone distortion that may otherwise occur during projection of the image. In particular, an original image may be electronically deformed or altered for rendering on one or more LCD panels within a projector or projection system. The deformed image is configured such that when projected upon a viewing screen, the original image is recreated with the benefit of magnification or enlargement and retention of the original image's proportions, but without significant keystone distortion.

In this embodiment of the invention a vertical offset of the projection apparatus (e.g., the apparatus is rotated vertically about a horizontal axis) results in tilt angle $\theta$ between the projection axis of the apparatus and a line normal to the viewing screen. In this case images are projected upward or downward to the viewing screen. Similarly, pan angle $\alpha$ a results from a horizontal offset of the apparatus (e.g., the apparatus is rotated horizontally about a vertical axis). When either or both tilt angle $\theta$ and pan angle $\alpha$ are not equal to zero, the necessary deformation operations may be performed separately or in combination.

In one embodiment of the invention an apparatus for preventing keystone distortion comprises a digitizer module in which an original image is resized (e.g., decimated or reduced) for storage in memory and a generator module in which the stored memory is resized (e.g., enlarged or expanded) for rendering on a display device (e.g., an LCD panel). Deformation of an image to offset or prevent keystone distortion may be performed in either or both of these modules. If both tilt angle $\theta$ and pan angle $\alpha$ are non-zero, the image may be deformed for one angle and then rotated (e.g., ninety degrees) and deformed to offset the other.

The extent and effect of the deformation performed to prevent or offset keystone distortion in an embodiment of the invention may depend on several factors. These factors may include the magnitude of tilt angle $\theta$ or pan angle $\alpha$, the distance from the projection light source to the display device (e.g., an LCD panel), the dimensions of the original image, the dimensions of the usable area of the display device, etc.

An original image may be deformed on a line-by-line, pixel-by-pixel or other basis. In one embodiment of the invention several parameters are calculated to identify the usable area of the display device, the number of lines in an image to be rendered and projected, the number of positions (e.g., pixels) in each line, etc. Then, for each selected or usable portion (e.g., pixel) of the display device, a corresponding portion of the original image (e.g., a pixel or set of pixels) is identified by applying one or more geometrical or mathematical relationships. The characteristics (e.g., color, intensity) of the corresponding portion of the original image may then be applied to the selected portion of the display device. As a result of deforming an original image and copying its characteristics, the image that is rendered on a display device and projected onto a viewing screen may reproduce the proportions of the original image (on a magnified scale) without significant or appreciable keystone distortion.

In one alternative embodiment of the invention a method and apparatus are also provided for ensuring uniform illumination intensity of the projected image. In particular, the intensity of an image rendered on a display device for projection purposes may be attenuated or otherwise adjusted in order to equalize the image's intensity.

DESCRIPTION OF THE FIGURES

FIGS. 8A–8G depict offset display images in accordance with an embodiment of the present invention.

DETAILED DESCRIPTION

Figure 1A:
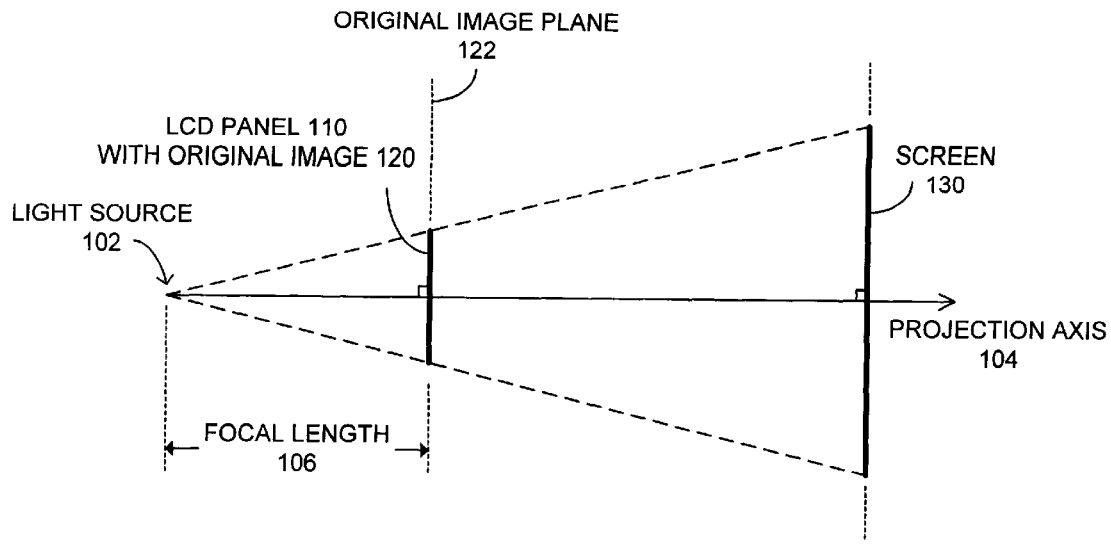
FIG. 1A depicts a projection system aligned to project an image without keystone distortion.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose computing device. Details of such devices (e.g., processor, memory, data storage) are well known and are omitted for the sake of clarity.

It should also be understood that the techniques of the present invention might be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

Various apparatuses and methods are described below for projecting an image onto a viewing screen or other surface in a manner that minimizes or eliminates keystone distortion. As will be seen, other effects may be applied as well, such as adjustment of the sharpness, contrast, brightness, position and other characteristics of an image.

One or more embodiments of the invention are directed toward projection systems in which light is projected through an original image onto a viewing screen. The original image may be rendered on transparent or translucent devices such as one or more Liquid Crystal Displays (LCD). As one skilled in the art will recognize, if a projection system is oriented such that the axis of the projection light source is perpendicular to and collinear with the centers of the original image and the screen, there will be no keystone distortion in the projected image. However, where a projection system is situated at a non-perpendicular horizontal and/or vertical angle to the viewing screen (either of which may be adjustable), an embodiment of the invention may be applied to prevent or minimize keystone distortion. Embodiments of the invention described herein may be applied to both front and rear-projection systems.

In one embodiment of the invention in which a projection device is oriented at a non-normal angle to a viewing screen, a method of preventing keystone distortion is as follows. From an original image that is to be projected an altered or deformed image is generated which, when rendered on an LCD panel and projected onto the screen, results in a magnified view of the original image but with little or no keystone distortion. The deformed image may be considered to offset or prevent the keystone distortion that would otherwise result from the orientation of the projection system. Conceptually, the deformed image that is rendered on the LCD panel is a perspective view of the original image as it would appear if magnified on the viewing screen without appreciable keystone distortion. The perspective view is captured at some location between the viewing screen and the projection light source - such as within the plane of the LCD panel.

Keystone Distortion

The problem of keystone distortion may be better understood with reference to FIGS. 1A–1D. FIG. 1A depicts a projection system in which projection axis 104 of projector 100 (represented by light source 102) is perpendicular to the viewing surface 130 and the original image 120 (as rendered on a projection medium such as LCD panel 110). And, because light source 102 is collinear with the centers of the projection medium and viewing surface, keystone distortion may be at a minimum.

FIG. 1A may be perceived as either a top or side view of the projection system due to the normal alignment of light source 102, LCD panel 110 and screen 130. Original image plane 122 is thus parallel to screen 130, and projection axis 104 pierces the center of the LCD panel. In this projection system, the original image is displayed on the LCD panel, through which light is projected from light source 102 onto viewing screen or surface 130. Light source 102 is the illumination mechanism for projector 100 and has focal length 106.

As one skilled in the art will appreciate, in the projection system illustrated in FIG. 1A the projection of original image 120 in LCD panel 110 upon screen 130 from projector 100 would be magnified in size but would fairly reproduce the details and proportions of the original image. Thus, keystone distortion would not significantly detract from viewers' appreciation of the projected image.

One may readily perceive from FIG. 1A that once projector 100 (i.e., light source 102 and LCD panel 110) is rotated or relocated so that projection axis 104 is no longer normal to screen 130, LCD panel 110 will no longer be parallel to screen 130 and original image plane 122. Keystone distortion prevention or correction then becomes desirable. In this event an embodiment of the invention described below may be applied to generate, from an original image, a deformed or modified image that may be projected without the keystone distortion that would result from directly projecting the original image.

Figure 1B:
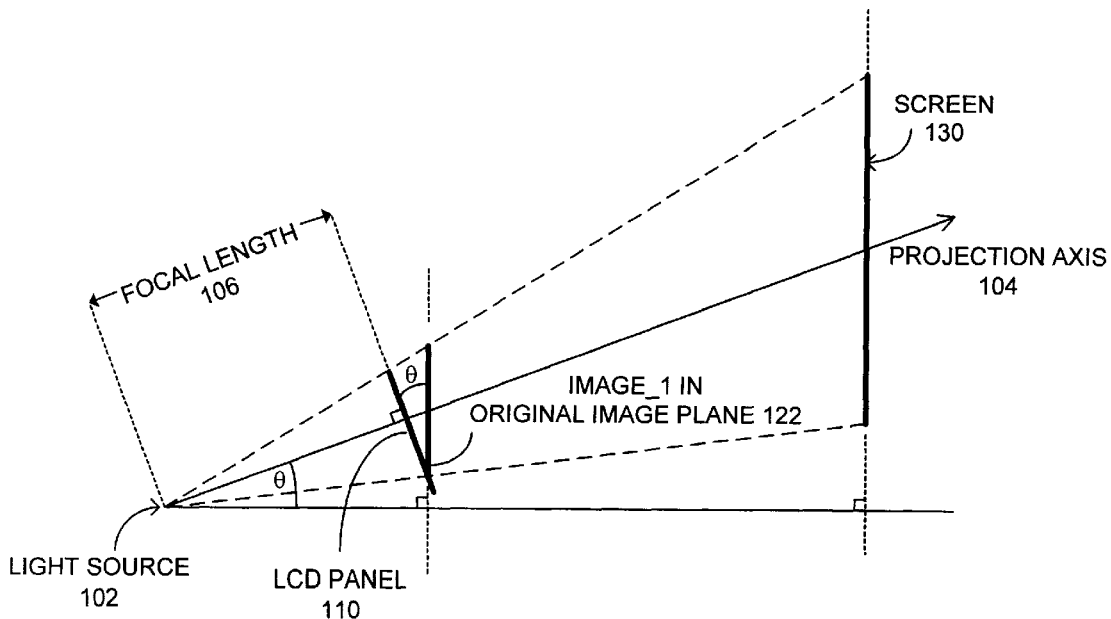
FIGS. 1B–1D depict the problem of keystone distortion in a projection system having a non-perpendicular alignment with a viewing screen.

FIG. 1B depicts the projection system of FIG. 1A after projector 100 (again represented by its light source 102) is offset from its normal alignment with screen 130 and original image plane 122 in one embodiment of the invention. FIG. 1B may be appreciated as representing a side view of the projection system, in which case projector 100 should be seen as having been translated vertically or rotated about a horizontal axis of the light source, such that it now must project in an upward direction to reach screen 130. Projection axis 104 still passes through the center of LCD panel 110, which, however, has been translated along with projector 100.

The vertical angle that is formed between projection axis 104 and a line normal to the plane of screen 130 may be termed the tilt angle and is represented herein as $\theta$. Similar to the tilt angle, a horizontal angle may be introduced into the projection system to represent a horizontal translation of projector 100, or its rotation about a vertical axis. This angle is termed a pan angle and is represented herein as $\alpha$. Tilt angle $\theta$ therefore represents the vertical offset of the projector from a position at which projection axis 104 is normal to the original image plane (and screen 130) and pan angle $\alpha$ represents the horizontal offset. FIG. 1B may thus also be perceived as a top view of the projection system after a pan angle has been applied instead of a tilt angle. In this case tilt angle $\theta$ should be interpreted as pan angle $\alpha$.

From the preceding discussion, it will be understood that keystone distortion may result from the misalignment of projection axis 104, LCD panel 110 and screen 130 as depicted in FIG. 1B. Thus, in one or more embodiments of the invention presented below, original image 120 as received from its source is transformed, deformed or distorted prior to its display on LCD panel 110, which remains normal to the projection axis. In FIG. 1B, Image__1 represents the original image as it would appear if aligned parallel to screen 130 (e.g., in original image plane 122). As will be described in detail in a following section, Image__1 provides a convenient starting point for generating a deformed image to be rendered on the LCD panel and projected onto the viewing screen with minimal, if any, keystone distortion.

Figure 1C:
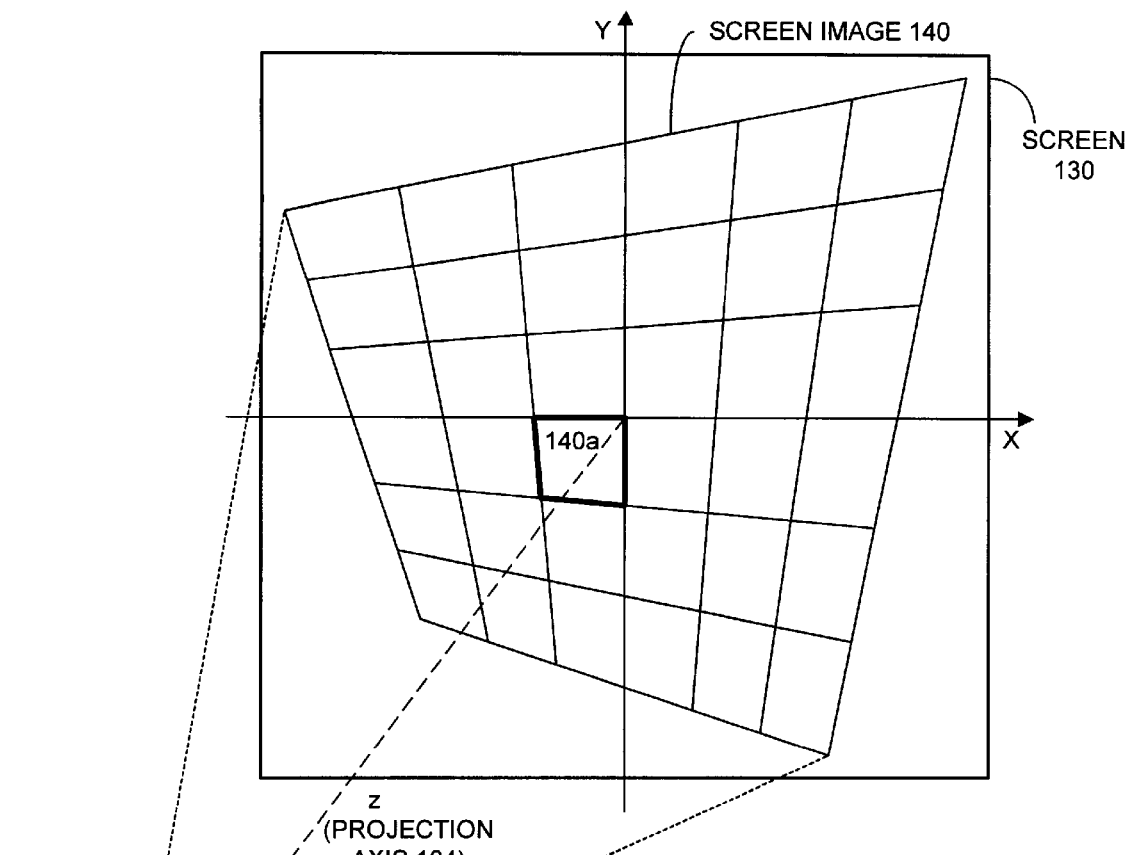
Figure 1C:
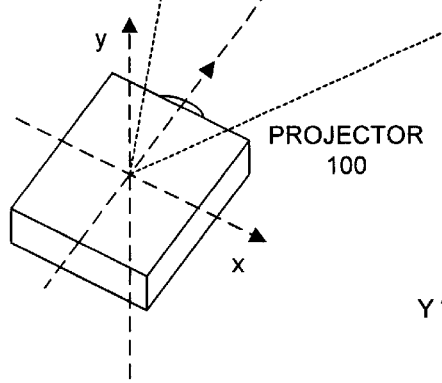

FIG. 1C demonstrates how a rectangular original image rendered on LCD panel 110 may appear on screen 130 when projector 100 is moved or rotated both horizontally and vertically (i.e., both tilt angle $\theta$ and pan angle $\alpha$ are greater than zero). In particular, in FIG. 1C, instead of substituting a suitable deformed image for the original image, the original image is projected and keystone distortion has not been corrected. Projection axis 104 passes through the center of the original image and LCD panel 110 (not shown in FIG. 1C). Screen image 140 appears distorted, both vertically and horizontally, because projector 100 is not aligned normal to screen 130.

In FIG. 1C and in discussions below of various embodiments of the invention, two three-dimensional coordinate systems are used for reference purposes in describing how an original image may be altered to prevent keystone distortion. A first coordinate system is represented by lower-case letters (x, y, z) and employs light source 102 of projector 100 as its origin (i.e., the light source is point o, having coordinates (0, 0, 0)). In this system the x-axis is horizontal to the light source, the y-axis vertical to the light source and the z-axis forms projection axis 104 through the center of the LCD panel and the original image. The LCD panel is parallel to the x-y plane, and measurements in this system may be in pixel-pitch units of the LCD panel. This may be termed a projection or light source coordinate system.

A second coordinate system, represented by upper-case letters (X, Y, Z), has an origin, point O, at the center of the original image as it would appear in a plane parallel to the viewing screen (e.g., in original image plane 122—shown in FIGS. 1A–1B). The X-axis of this system extends horizontally, the Y-axis extends vertically and the Z-axis is normal to original image plane 122. This may be termed the Image_1 coordinate system.

In alternative embodiments of the invention different coordinate systems may be employed without limiting the scope of the invention or restricting the manner in which an image may be translated or altered. For example, in one alternative embodiment a coordinate system origin may be situated at one corner of the original image so that all coordinates in the Image_1 coordinate system are contained in one quadrant. In another alternative embodiment a coordinate system may have an origin located in the LCD panel. One skilled in the art will realize that references in one coordinate system may be readily translated to another coordinate system and that embodiments of the present invention are therefore not limited to any particular system(s) of coordinates.

It can be seen in FIGS. 1B–1C that light beams projected from projector 100 through LCD panel 110 onto screen 130 strike the screen asymmetrically about the axis of projection (i.e., the z-axis). As a result of the tilt and pan angles in FIG. 1C, the upper right-hand corner of screen image 140 appears expanded or enlarged more than other portions of the original image. Conversely, if projector 100 were situated in a position normal to screen 130 (e.g., as in FIG. 1A), the resulting screen image would ideally be symmetrical about the axis of projection.

Figure 1D:
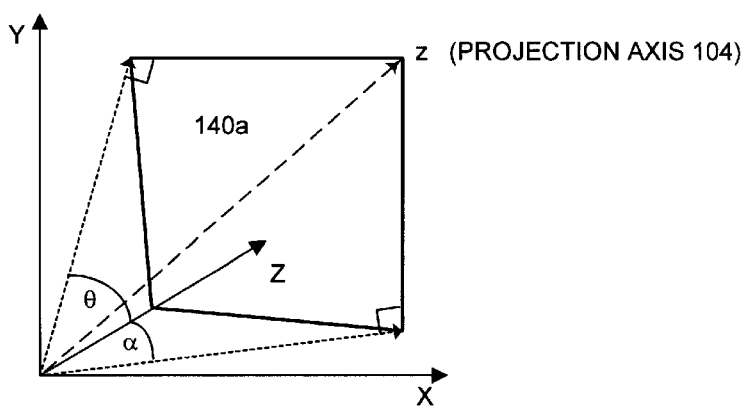

FIG. 1D demonstrates the distortion of portion 140*a* of screen image 140 from FIG. 1C. In FIG. 1D portion 140*a* is depicted in the coordinate system (X, Y, Z) of the original image plane. In addition to the X-, Y- and Z-axes of the original image coordinate system, the projection axis (the z-axis) of the projection system is also shown extending toward the upper right-hand portion of portion 140*a*. Tilt angle θ and pan angle α are also depicted.

FIGS. 1A–1D demonstrate that keystone distortion may be caused by the displacement of the light source along or about either a horizontal axis, vertical axis, or both. As briefly described above, keystone distortion may be alleviated in one embodiment of the invention by deforming the original image in such a manner as to offset potential keystone distortion. In particular, by re-scaling, skewing, translating or otherwise distorting the original image—depending upon angles θ and α and possibly the size of the original image or display device—allowance may be made for the keystone distortion that would result from projecting an image at a non-normal angle to a viewing screen. By making the necessary offsetting adjustments prior to displaying the deformed image on LCD panel 110, the resulting projection on screen 130 may be made to closely match the original image, particularly in terms of proportion. Other corrections may be made for criteria such as magnification, transposition and aesthetic factors such as brightness, sharpness, contrast, etc. In particular, the intensity of individual elements of an image (e.g., pixels) may be modified to promote uniformity or a special effect in the projected image.

In one embodiment of the invention an original image may be modified for projection without keystone distortion by deforming the original image according to the projection system's tilt and pan angles and resizing the image as necessary to fit LCD panel 110. The effect of this deformation is as if an enlarged version of the original image, without keystone distortion, was perceived on screen 130 and then a perspective view of that image, collapsed toward light source 102, was captured at LCD panel 110.

Figure 6A:
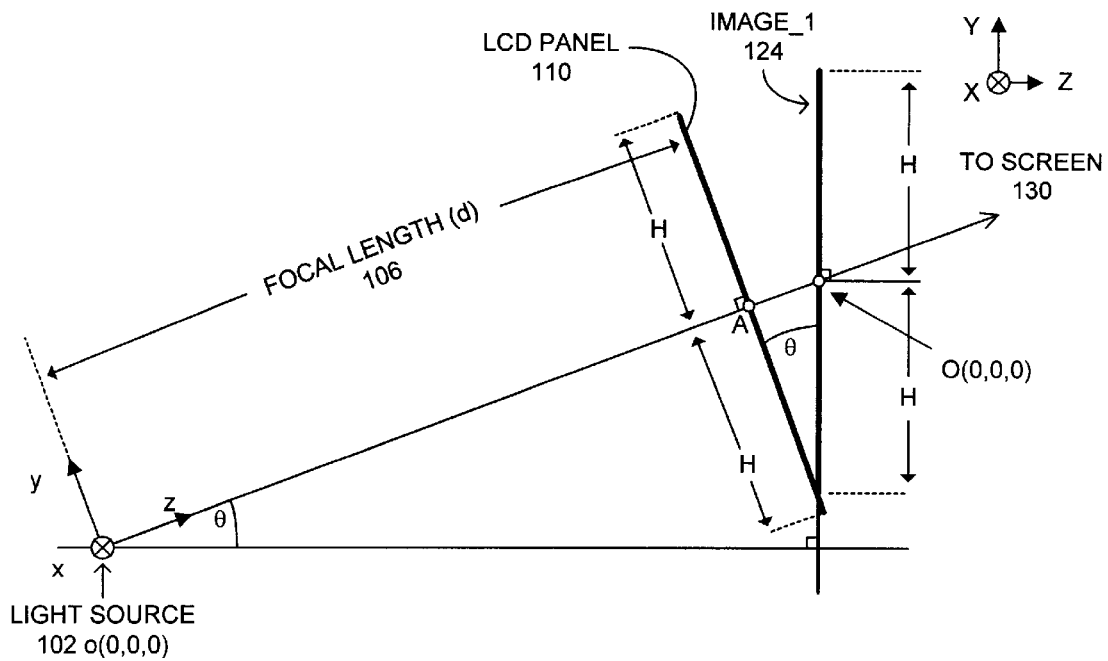
FIGS. 6A–6B depict side and top views of a projection system suitable for implementing an embodiment of the present invention.
Figure 6B:
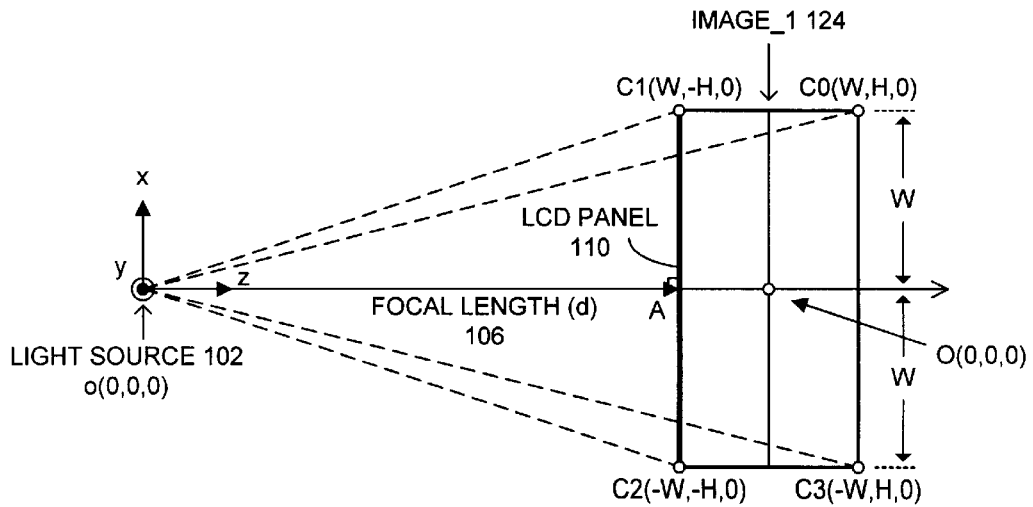

FIGS. 6A–6B illustrate a projection system of a present embodiment of the invention in terms of the coordinate systems introduced above. In this embodiment tilt angle θ is non-zero (e.g., light source 102 has been rotated about the x-axis) but pan angle α is zero. FIG. 6A is a side view (i.e., along the x- and X-axes) of the projection system and FIG. 6B is a top view of the system (i.e., looking down the y-axis). Screen 130 is not shown in FIGS. 6A–6B.

Image_1 124 represents the original image that may be received for projection, as it may appear in a plane (e.g., original image plane 122) parallel to the viewing screen. From Image_1, a deformed image (referred to below as Image_2) is calculated and rendered on LCD panel 110 for projection onto screen 130.

Focal length 106 is the focal distance of light source 102. Representing focal length 106 as d for ease of reference, the center of LCD panel is situated in the projection coordinate system at point A, having (x, y, z) coordinates of (0, 0, d). The origin of the light source coordinate system (i.e., light source 102) is represented as point o. In the Image_1 coordinate system, the center of Image_1 is point O, having (X, Y, Z) coordinates of (0, 0, 0). As shown in FIG. 6B, the four corners of Image_1, represented as points C0, C1, C2 and C3, are located at coordinates (W, H, 0), (W, −H, 0), (−W, −H, 0) and (−W, H, 0), respectively. W and H represent one-half the width and one-half the height of the original image, respectively.

Suitable apparatus and methods for producing, from an original image, a suitable deformed image for display on LCD panel 110 and projection onto screen 130 are presented in the following sections. The term "original image" refers to an image that is received from an image source (e.g., a third party, an image repository, a storage device) and which is to be projected onto a viewing surface. "Image_1" refers to the original image situated in a plane parallel to the viewing surface and may be described using the Image_1 coordinate system introduced above. "Image_2" refers to the deformed version of the original image which may, illustratively, be rendered on an LCD panel and projected onto the viewing surface with minimal or no keystone distortion. Image_2 may also be referred to as the deformed or display image, and may be described using the light source coordinate system (introduced above).

One Embodiment of a Keystone Adjustment Apparatus

Various methods and sequences of events may be performed in order to construct a deformed image (e.g., Image_2) from an original image (e.g., Image_1) for display on an LCD panel and projection onto surface without significant keystone distortion. In this section a suitable apparatus and illustrative alternative apparatuses for performing one or more of these methods are presented. The invention is not limited to the configurations described in this section, which may be altered or adjusted to yield other configurations that are also suitable.

Figure 2:
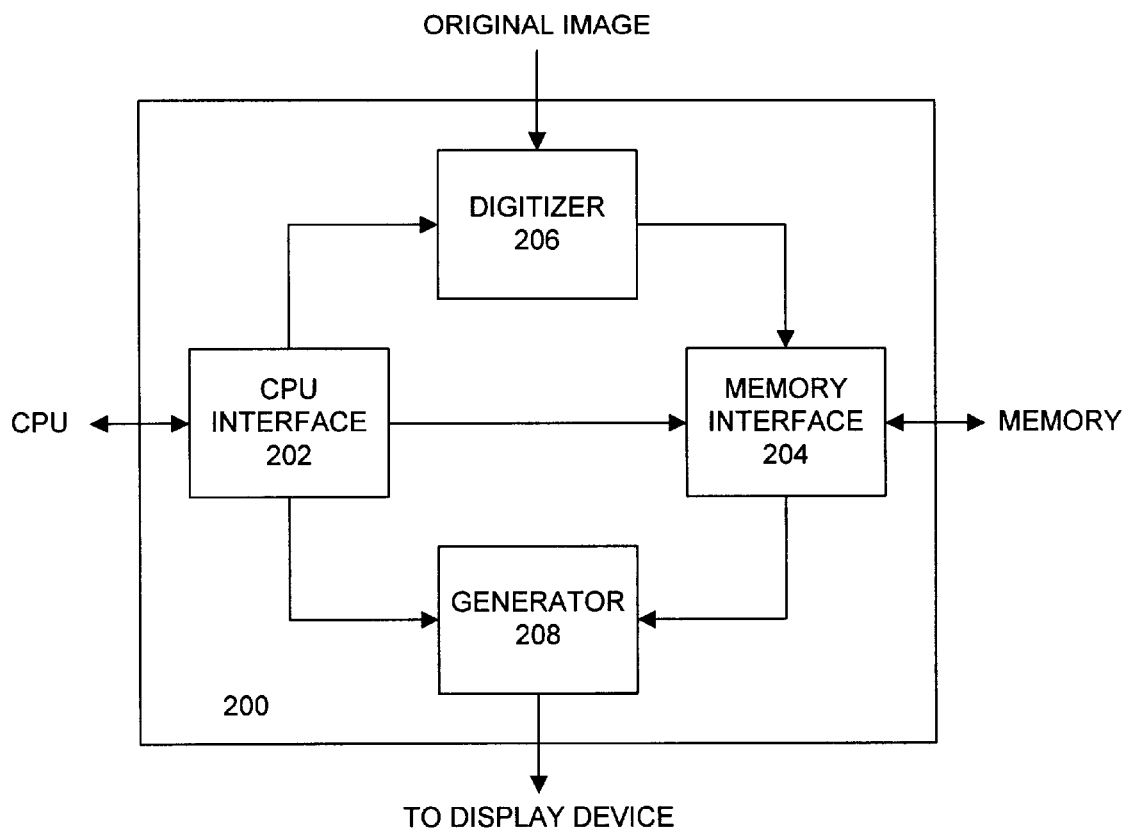
FIG. 2 is a block diagram of an apparatus for preventing keystone distortion in a non-aligned projection system in accordance with an embodiment of the invention.

FIG. 2 is a block diagram of one apparatus for generating a display image from an original image, wherein the display image is rendered on an LCD panel and projected onto a screen without appreciable keystone distortion. In FIG. 2, apparatus 200 comprises CPU interface 202, memory interface 204, digitizer 206 and generator 208. In one embodiment of the invention apparatus 200 may be included in a projector or projection system.

In this embodiment CPU interface 202 is coupled to a processor that may be internal or external to apparatus 200. CPU interface 202 communicates with the processor to coordinate memory access (e.g., to a gamma table). The processor may operate in accordance with a sequence of instructions to facilitate one or more of the various methods of the invention that are described in a following section. Illustratively, CPU interface 202 comprises memory space including one or more registers.

Memory interface 204 interfaces with memory (e.g., SDRAM, SGRAM, ROM, disk) to store and retrieve images. Memory interface 204 accesses the memory on behalf of other components of apparatus 200 that are illustrated in FIG. 2. For example, digitizer 206 or CPU interface 202 may instruct the memory interface to store image data (e.g., of a new original image), perhaps at a specified storage location. Or, generator 208 or CPU interface 202 may instruct the memory interface to retrieve a specific amount of image data starting at a certain location in memory.

In addition, various parameters that may be used to derive Image_2 from the original image may be stored in memory managed by memory interface 204. In particular, digitizer 206 and/or generator 208 may store or receive parameters from the memory interface for use in resizing or deforming the image.

The memory that is accessed by memory interface 204 may be internal or external to apparatus 200. In one embodiment, memory interface 204 ensures that all memory requests are rapidly serviced (e.g., in one time interval) so that image processing and transformation is not delayed.

Images that are stored in the memory accessed through memory interface 204 may include an original image (e.g., Image_1) and a deformed image (e.g., Image_2) to be displayed on an LCD panel or other display device. As described above, an original image, if displayed directly by a projector may suffer from keystone distortion. A suitably deformed image created from the original image, however, is configured for projection from an LCD panel or other suitable device with little or no keystone distortion.

In addition, one or more intermediate images between an original image and a display image derived from the original image may also be stored in memory. For example, as described below one or more of digitizer 206, generator 208 or another module may rotate, translate, shrink, enlarge, or otherwise distort an image in one or more operations in order to transform the original image into a suitable image for projection without appreciable keystone distortion. Functions of one or more of the components of apparatus 200 may be merged or apportioned in a manner different from the embodiments described in this and the following subsections without exceeding the scope of the invention.

One Embodiment of a Digitizer

Figure 3A:
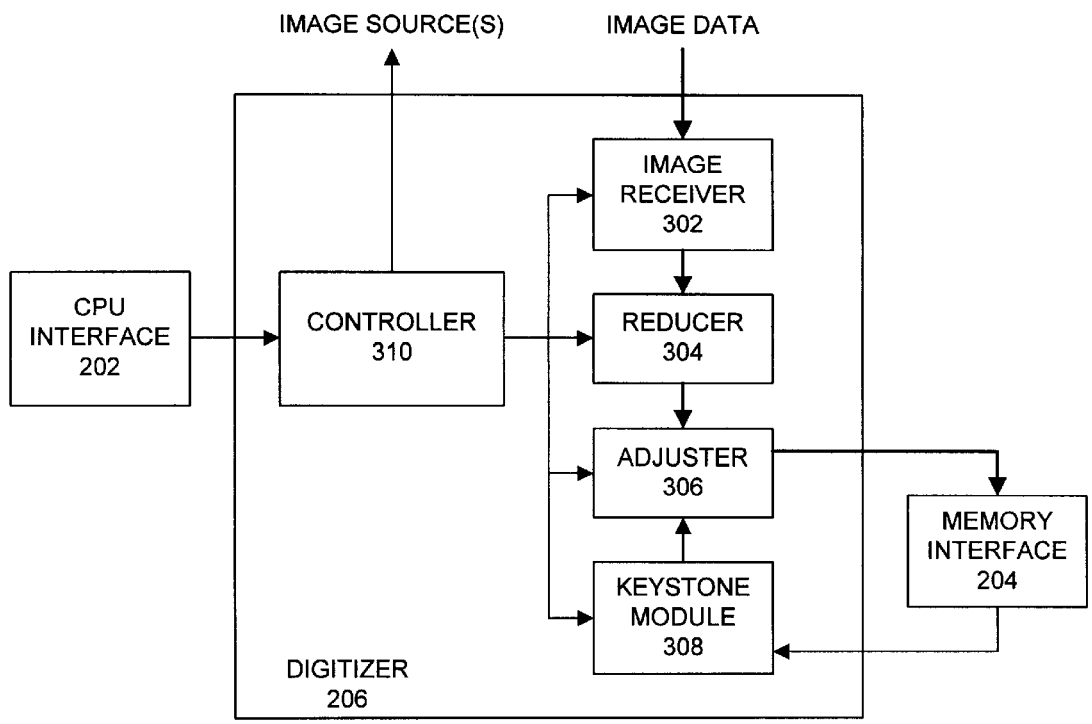
FIGS. 3A–3C depict a digitizer portion of the apparatus of FIG. 2 and its operation on an original image in accordance with an embodiment of the present invention.
Figure 3B:
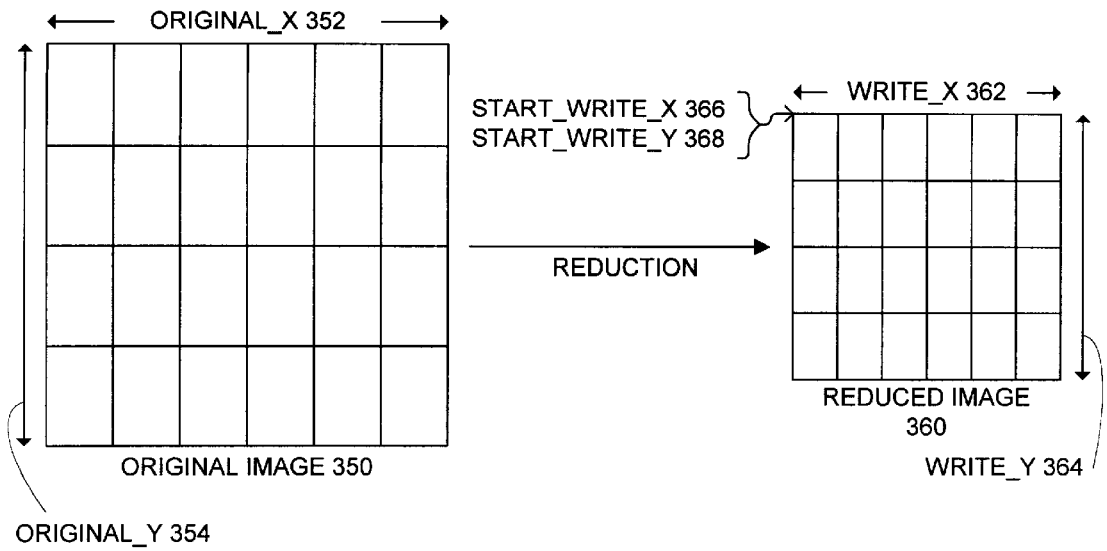

FIGS. 3A–3B depict an implementation of digitizer 206 in one embodiment of the invention. In this implementation an original image is received and stored in memory. The original image may be altered in some manner (e.g., reduced, enlarged, rotated, or otherwise adjusted to prevent keystone distortion or induce some other effect) before being stored.

Illustratively, digitizer 206 includes image receiver 302, reducer 304, adjuster 306, keystone module 308, and controller 310. In the illustrated embodiment, controller 310 is coupled to image receiver 302, reducer 304, adjuster 306, keystone module 308 and the source(s) of the original image. In addition, controller 310 is coupled to CPU interface 202. Image receiver 302 is also coupled to the image source(s) in order to receive the original image data. Adjuster 306 and keystone module 308 are coupled to memory interface 204.

Illustratively, an original image is received at image receiver 302 from one or more sources such as a storage medium (e.g., a disk or tape), a processor, one or more analog to digital converters, etc. One line of the original image may be received at a time from one or more sources or, for a color image, the color data for an image may be received from different sources one pixel at a time, etc. Image receiver 302 may therefore be configured to multiplex data from multiple sources or to accept a single stream of data from a single source. In the illustrated embodiment, controller 310 interfaces with the source(s) of the original image to synchronize receipt of the image data. In an alternative embodiment this task may be performed by another module or component of the projection apparatus.

Reducer 304 is configured to reduce the size of the original image in one or more dimensions according to one or more ratios. The ratio(s) that is/are applied to shrink a given original image (e.g., a different ratio for each dimension, line or other portion of the image) may depend upon several factors. Among these factors are the size and/or source(s) of the original image, the size of the display device from which the modified display image will be projected (e.g., LCD panel 110), the memory space in which the original image is to be stored, tilt angle θ or pan angle α, etc. In one embodiment of the invention a reduction ratio is a numerical value no larger than one. As a result, in this embodiment the image that is stored in memory is no larger than the original image.

Reducer 304 may incorporate one or more memory buffers (e.g., line buffers) or other storage devices for temporarily storing portions (e.g., lines, pixels) of the reduced image. These buffers may be part of the memory of CPU interface 202 or the CPU to which it is coupled, or the buffers may be part of the memory pool coupled to memory interface 204, or the buffers may comprise one or more modules native to digitizer 206. The number and size of buffers incorporated in an embodiment of the invention may depend upon the speed of memory access, the rate at which image data is received into digitizer 206, the expected size of original images, the rate at which images are rendered on the display device, etc. In one embodiment of the invention each line buffer is large enough to store one line of data for a computer-originated image at a high resolution (e.g., such as 640, 800, 1,024 or 1,280 pixels per line) and with good color coverage (e.g., 16 or 32 bits per pixel). In alternative embodiments of the invention the configuration of line buffers (e.g., quantity, size) may be programmable in order to accept original images of various sizes, colors and resolutions. Reducer 304 may also include components that cooperate with the line buffers (e.g., multiplexer, de-multiplexer) to manage data flow through the line buffers.

Adjuster 306 accepts a reduced image from reducer 304 (e.g., line-by-line from buffers used by the reducer) for storage in memory. In addition, adjuster 306 may be configured to distort or skew one or more portions of the image received from reducer 304. In particular, in the illustrated embodiment keystone module 308 generates a ratio or other factor by which an image portion (e.g., line) is to be skewed in order to prevent keystone distortion. Different ratios may be applied to different portions of the image. From adjuster 306, the modified or distorted image data is stored in memory by memory interface 204. Adjuster 306 may employ a second set of memory (e.g., line) buffers and associated components to divide image data among the buffers and/or re-combine image data from the buffers.

In one alternative embodiment of the invention, the adjustment function of adjuster 306 to prevent keystone distortion may be merged with reducer 304 or, even further, may be implemented in a different portion of apparatus 200 (e.g., generator 208). In yet other embodiments of the invention other components of digitizer 206 may be merged.

Keystone module 308 stores and/or fetches appropriate parameters to or from memory to be used to deform or skew the image prior to its storage. The parameters may include the necessary ratio(s) to be applied or the keystone module may calculate ratios with which to shrink or skew the image in digitizer 206. Different sets of parameters, described in a following section, may be used with different embodiments of the invention. These parameters may be used to deform an original image (e.g., Image_1) to offset keystone distortion, or to determine in what manner to deform the image, to form a suitable display image (e.g., Image_2). As described above, in an alternative embodiment of the invention one or more operations to prevent keystone distortion may be performed in a different component of digitizer 206 or in a module other than digitizer 206. Thus, keystone module 308 may be omitted from such an embodiment, in which case a module with similar functionality may be included in generator 208, for example.

FIG. 3B demonstrates how digitizer 206 may reduce an original image (e.g., Image_1) in one embodiment of the invention. Original image 350, illustratively two-dimensional, is received at digitizer 206 as described above. In this example, the original image's horizontal dimension is stored in a register (or variable or other data structure) and is termed Original_X, which is associated with the reference numeral 352 in FIG. 3B. The vertical dimension of original image 350 may be known as Original_Y, which is associated with the reference numeral 354. Illustratively, Original_X and Original_Y are expressed in the units of the Image_1 coordinate system.

When original image 350 is received and processed (e.g., line by line) by digitizer 206, it may be stored or intended to be stored as reduced image 360 in memory accessed through memory interface 204. The horizontal and vertical dimensions of reduced image 360 are stored as Write_X 362 and Write_Y 364, respectively, to indicate the dimensions of the storage space in which they are written. The starting memory positions for storing reduced image 360 may be stored as Start_Write_X 366 and Start_Write_Y 368. The ratios of Write_X 362 to Original_X 352 and of Write_Y 364 to Original_Y 354 are known as the Reduce_X and Reduce_Y ratios, respectively. These are the reduction ratios described above.

Figure 3C:
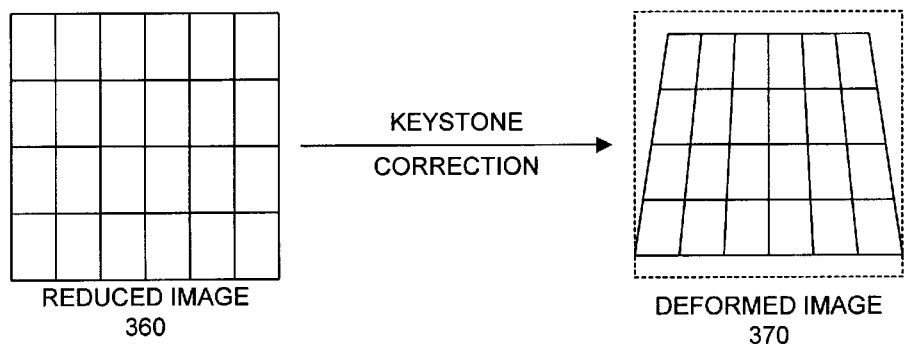

FIG. 3C illustrates the manner in which adjuster 306 of digitizer 206 may prevent keystone distortion by adjusting or skewing the reduced image in accordance with ratios provided by keystone module 308. In FIG. 3C, reduced image 360 is skewed, line by line, to create deformed image 370. In one embodiment of the invention deformed image 370 may serve as the display image (e.g., Image_2) that is rendered on LCD panel and projected onto a viewing screen. In another embodiment, adjusted image 370 may be re-scaled (e.g., enlarged) to form a suitable display image.

The manner in which an image is deformed may be determined by a portion of the display device in which Image_2 is to be rendered. For example, methods of preventing keystone distortion described in a following section demonstrate how the outline or effective area of a suitable Image_2 may be derived from Image_1.

Thus, in one method of preventing keystone distortion described below, an original image is received at digitizer 206 and a starting position in memory at which to begin storing the image is read from registers Start_Write_X and Start_Write_Y. Then the original image is reduced in the horizontal dimension by ratio Reduce_X and in the vertical dimension by ratio Reduce_Y as it is stored in memory. If either of these ratios are equal to one, then the image is stored with its original size in the respective dimension. If the image is to be deformed by the digitizer, the image may also be skewed, illustratively on a line-by-line basis, before being stored.

Besides the reducing and adjusting operations described above, digitizer 206 may perform other operations, such as various image-filtering functions, on an original image. For example, in one embodiment of the invention described below the luminance or intensity of an original image is equalized so as to produce a projected image having uniform or near-uniform intensity.

The various registers and image data described above may be maintained by CPU interface 202 (shown in FIG. 2), may be maintained in memory managed by memory interface unit 204 or may be part of digitizer 206 or yet some other portion of apparatus 200.

One Embodiment of a Generator

Figure 4A:
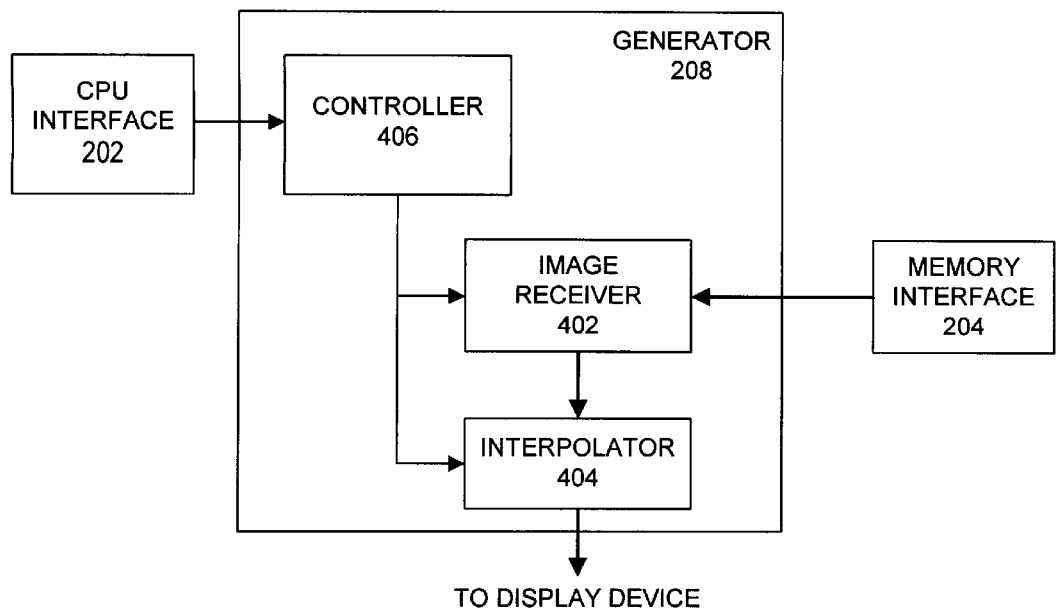
FIGS. 4A–4B depict a generator portion of the apparatus of FIG. 2 and its operation on a stored image in accordance with an embodiment of the present invention.
Figure 4B:
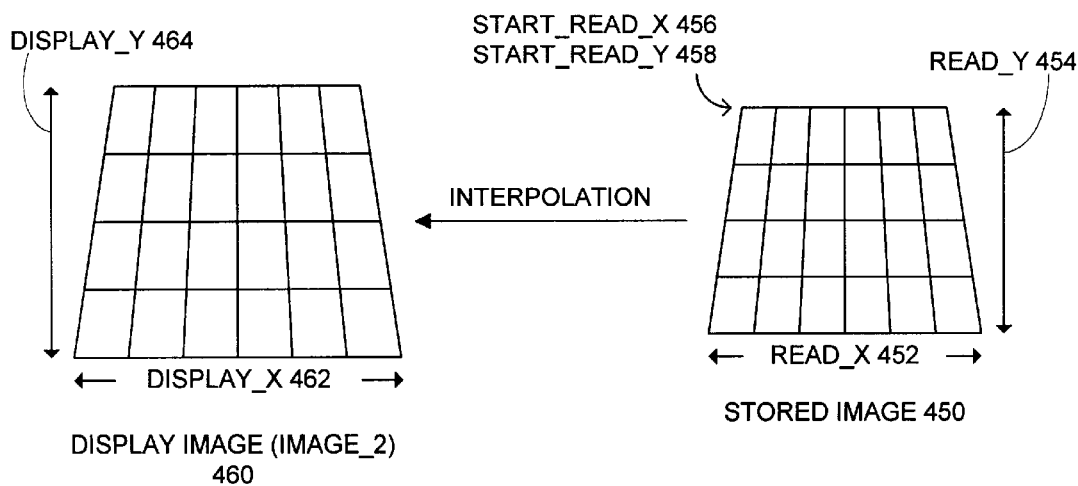

FIGS. 4A–4B depict one implementation of generator 208 of apparatus 200 in an embodiment of the invention. One function of generator 208 in this embodiment is to render a suitable display image (Image_2) on an LCD panel, CRT screen or the like for projection onto a viewing screen or other surface so as to recreate an original image without noticeable keystone distortion. In particular, a generator may be configured to scale, resize, or otherwise distort image data stored in memory (e.g., to offset or prevent keystone distortion) and forward the result with a particular size or resolution to a specified display device. Or, a generator may be configured to simply retrieve and render a stored image that has already been deformed by a digitizer. In an alternative embodiment of the invention, however, both digitizer 206 and generator 208 may perform deformation operations (e.g., where both tilt angle θ and pan angle α are non-zero).

The generator depicted in FIGS. 4A–4B is configured to operate with digitizer 206 as depicted in FIGS. 3A–3C. Therefore, the illustrated generator is not configured to perform keystone correction because that function is performed by the digitizer.

In FIG. 4A, generator 208 includes image receiver 402, interpolator 404 and controller 406. Image receiver 402 may comprise one or more buffers (e.g., line buffers) configured to receive and temporarily store image data received from memory interface 204. The number and size of line buffers incorporated in an interpolator may depend upon the speed of memory access, the rate at which image data is received into digitizer 206 or from memory interface 204, the expected size of original images, the manner in which image data is received (e.g., by lines, pixels), etc.

Interpolator 404 is configured to receive an image (e.g., reduced image 360 of FIG. 3B or deformed image 370 of FIG. 3C) from memory for translation or rescaling, if necessary, and transmission to a display device such as LCD panel 110. Interpolator 404 in one embodiment of the invention resizes the retrieved image according to specified ratios (described below). Controller 406 receives commands from CPU interface 202 (shown in FIG. 2) and controls the operation of image receiver 402 and interpolator 404.

FIG. 4B depicts the interpolation of image data stored in memory, such as stored image 450, into display image 460 (Image_2). As with digitizer 206 described above, several registers, variables or other data structures may be employed to store values concerning the interpolation of stored memory data into an image to be projected. In FIG. 4B, Start_Read_X 456 and Start_Read_Y 458 define a starting position in memory from which to begin extracting image data. Other registers store Read_X 452 and Read_Y 454, which identify the dimensions of the memory area to be read. Further, Display_X 462 and Display_Y 464 define the horizontal and vertical dimensions of the display device (or the portion of the display device to be used for display image 460). The ratios of Display_X 452 to Read_X 462 and of Display_Y 454 to Read_Y 464 may be identified as Enlarge_X and Enlarge_Y, respectively. These ratios thus determine the extent to which stored image 450 is enlarged or interpolated in order to produce an appropriately sized display image. Illustratively, these two ratios have values of at least one. It can be seen then that one function of generator 208 of FIG. 4A is to resize a stored image to fit a display device.

During the interpolation process, other image enhancement functions may also be performed, such as adjusting the displayed image's sharpness, contrast, brightness, gamma correction, etc. One skilled in the art will appreciate that the functions performed by digitizer 206 and generator 208 are complementary. In particular, the modifications made to a stored image by generator 208 to produce a display image that may be projected without keystone distortion depend upon how the corresponding original image was modified by digitizer 206. Together they function to alter the size and shape of the original image to yield the appropriate display image.

Figure 19:
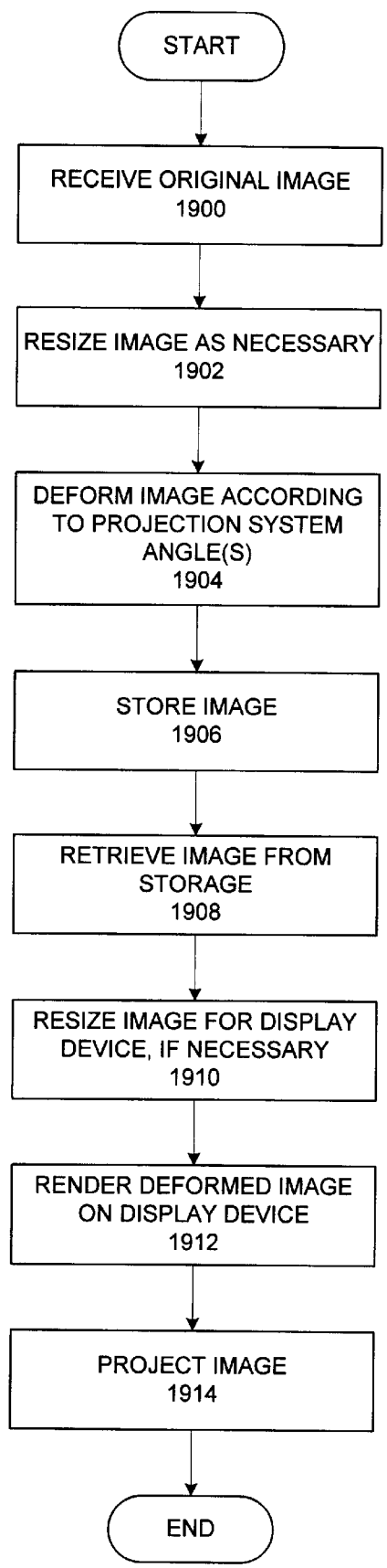
FIG. 19 is a flowchart demonstrating one method of deriving, from an original image, a display image that may be projected with little, if any, keystone distortion, in accordance with one embodiment of the invention.

FIG. 19 demonstrates one method of employing generator 208 and digitizer 206, of this and the preceding sub-section, to transform an original image into a display image that may be projected with little, if any, keystone distortion. In state 1900, an original image is received at the digitizer. The image may be received as a complete set of data or may be received and processed one portion at a time (e.g., line-by-line).

In state 1902, the digitizer resizes or re-scales the image, if necessary. For example, the dimensions of the original image may be reduced or decimated in order to store the image in a particular area of memory. Ratios such as Reduce_X and Reduce_Y, described above, may be applied. The re-scaling factor(s) applied by the digitizer may have been defined and stored before the original image was received, or may be determined when the image is received. Illustratively, reducing the original image allows the proportions of the original image to be retained while requiring less storage space.

In state 1904 the digitizer deforms the image to offset keystone distortion that would occur due to a projection system angle (e.g., tilt angle θ and/or pan angle α). Illustratively, this process is performed on a line-by-line basis in accordance with prestored parameters derived from the angle(s) of the projection system, which describe how each line must be altered to counteract the effect of keystone distortion. Alternatively, the parameters may be computed in real-time.

The deformation of state 1904 may be performed in sequence or in combination with the re-scaling operation of state 1902. And, as described in the following sub-section, deformation of an image to offset or prevent keystone distortion may be performed solely in one or the other of the digitizer or generator or, alternatively, may be performed in both modules. Further, in the event that both the tilt angle and the pan angle are not equal to zero, separate deformation operations may be performed for each angle, which operations may, again, be combined or placed in sequence with a re-scaling operation of the digitizer or generator.

In state 1906 the image is stored in memory, illustratively on a line-by-line basis. The memory in which the image is stored may be managed by memory interface 204 described above.

In state 1908, the generator retrieves the image data from memory (e.g., line-by-line). As described below, however, in another embodiment of the invention the image may be rotated for additional processing (e.g., to deform it in accordance with another projection system angle) by reading and interpreting the stored image data in a column-by-column format.

In state 1910 the generator re-scales the image as necessary for a specified display device (e.g., one or more LCD panels). In particular, a usable or effective area of the display device may be defined with parameters stored in memory or generated on the fly. The generator may then resize (e.g., enlarge) the image retrieved from memory in order to use the maximum area possible or a specified area of the display device.

In state 1912, the deformed image is rendered on the display device and, in state 1914 is projected onto a viewing surface.

Alternative Digitizer and Generator Embodiments

As mentioned above, efforts to correct or prevent keystone distortion may be effected in either, or both, of digitizer 206 and generator 208. In addition, a keystone distortion correction/prevention function may be performed by distinct components in these modules (e.g., as depicted in FIG. 3A) or may be merged with other functions (e.g., reducing or enlarging an image) of a module or a component of a module. Thus, alternative configurations for apparatus 200 may now be described with reference to FIGS. 5A–5D. One skilled in the art will readily perceive how the method of operation depicted in FIG. 19, and described above, may be altered to suit these alternative apparatus configurations.

Figure 5A:
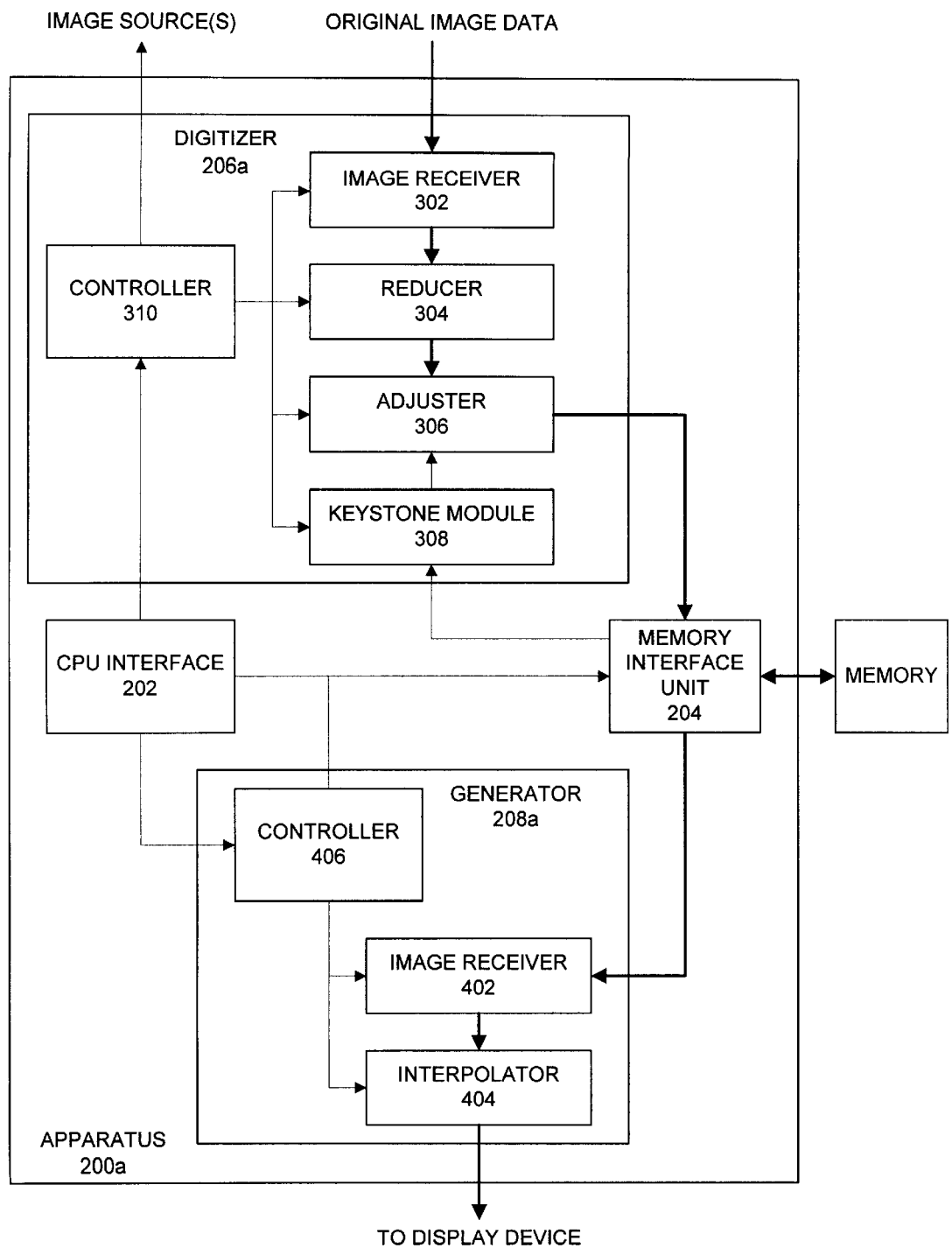
FIGS. 5A–5D depict alternative embodiments of an apparatus for preventing keystone distortion in accordance with alternative embodiments of the invention.

FIG. 5A depicts apparatus 200a with digitizer 206a and generator 208a similar to the digitizer and generator of FIG. 3A and FIG. 4A. As already described, in this embodiment the prevention of keystone distortion is primarily a digitizer function. As one skilled in the art will appreciate, the order in which the reduction and adjustment operations are performed in digitizer 206 of FIG. 5A by reducer 304 and adjuster 306 may be reversed in another alternative embodiment.

Figure 5B:
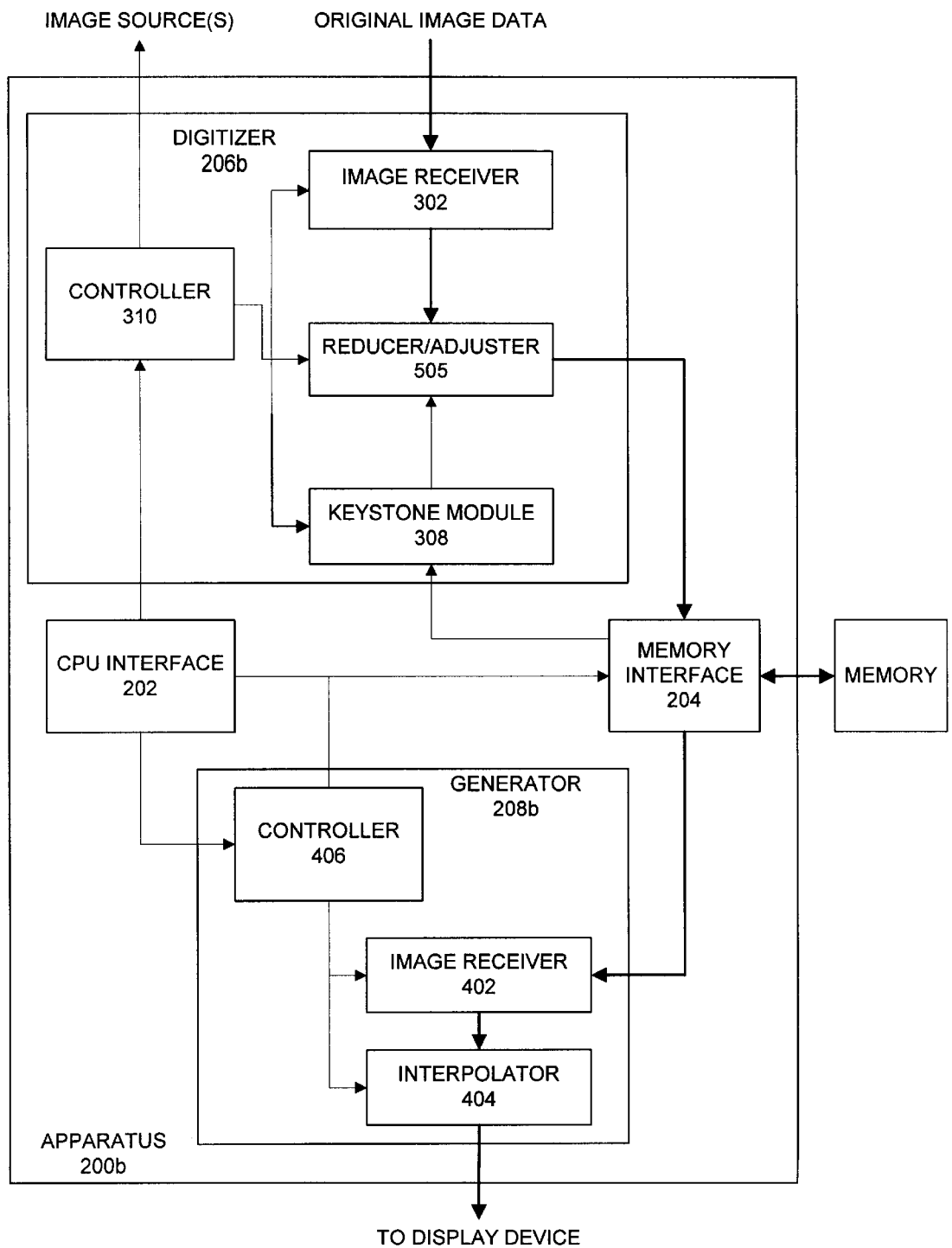

FIG. 5B depicts apparatus 200b in which the digitizer functions of image reduction and keystone distortion prevention are combined. In this embodiment reducer/adjuster 505 of digitizer 206b performs the functions of both reducer 304 and adjuster 306 of FIG. 5A. Reducer/adjuster 505 may incorporate a set of buffers (e.g., line buffers) to store portions of an image as it is processed and before it is stored in memory by memory interface 204.

Figure 5C:
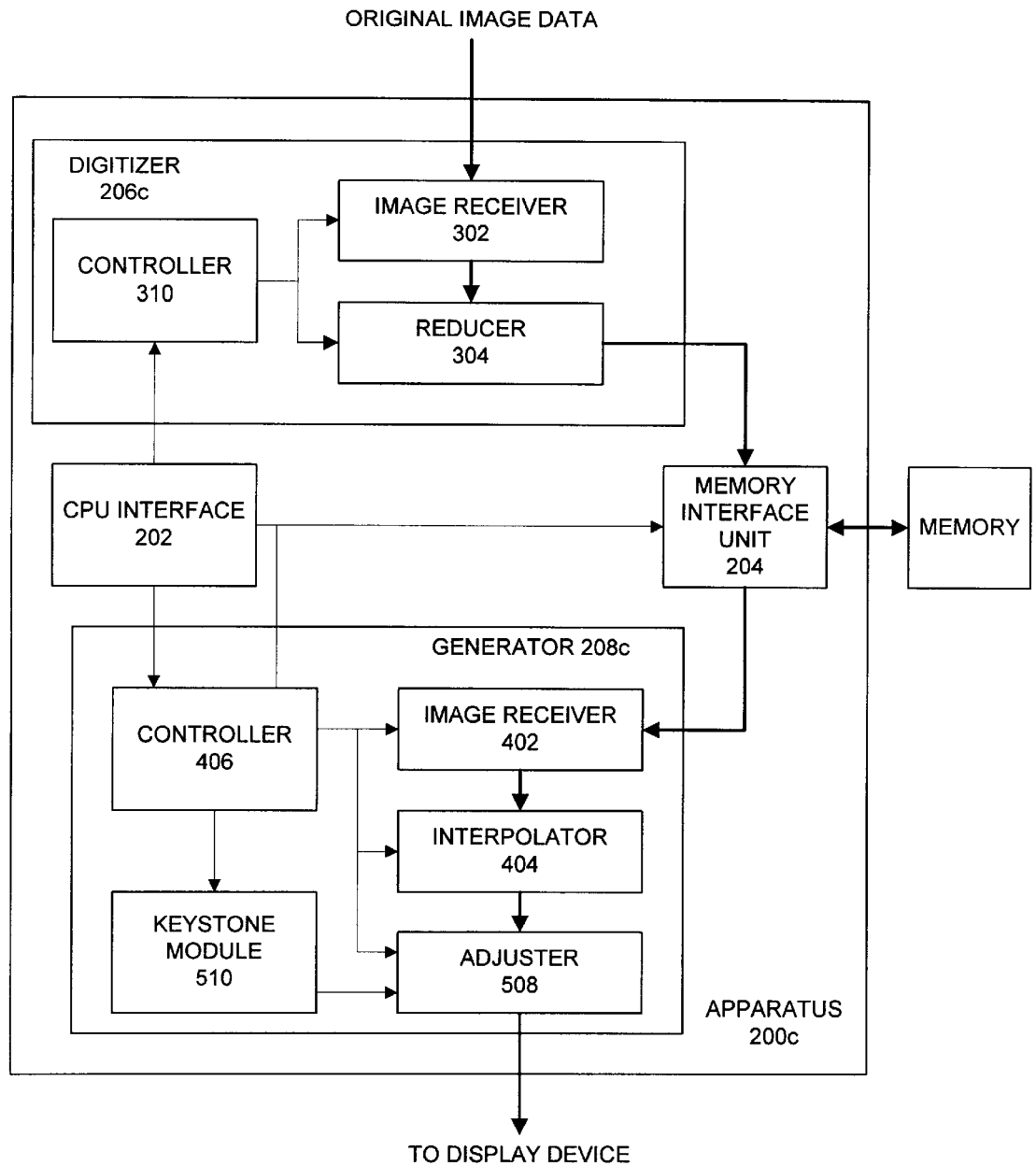

FIG. 5C demonstrates apparatus 200c as it may appear when keystone correction is performed in generator 208c rather than digitizer 206c. In this embodiment digitizer 206c still reduces an original image if necessary. When the reduced image is retrieved from memory by generator 208c, it is then enlarged and adjusted (e.g., skewed, deformed), in either order, before being sent to the display device. Adjuster 508 and keystone module 510 are incorporated into generator 208c for the purpose of preventing keystone distortion. These components may be configured and operate in a similar manner to their counterparts in digitizer 206 of FIG. 3A.

Figure 5D:
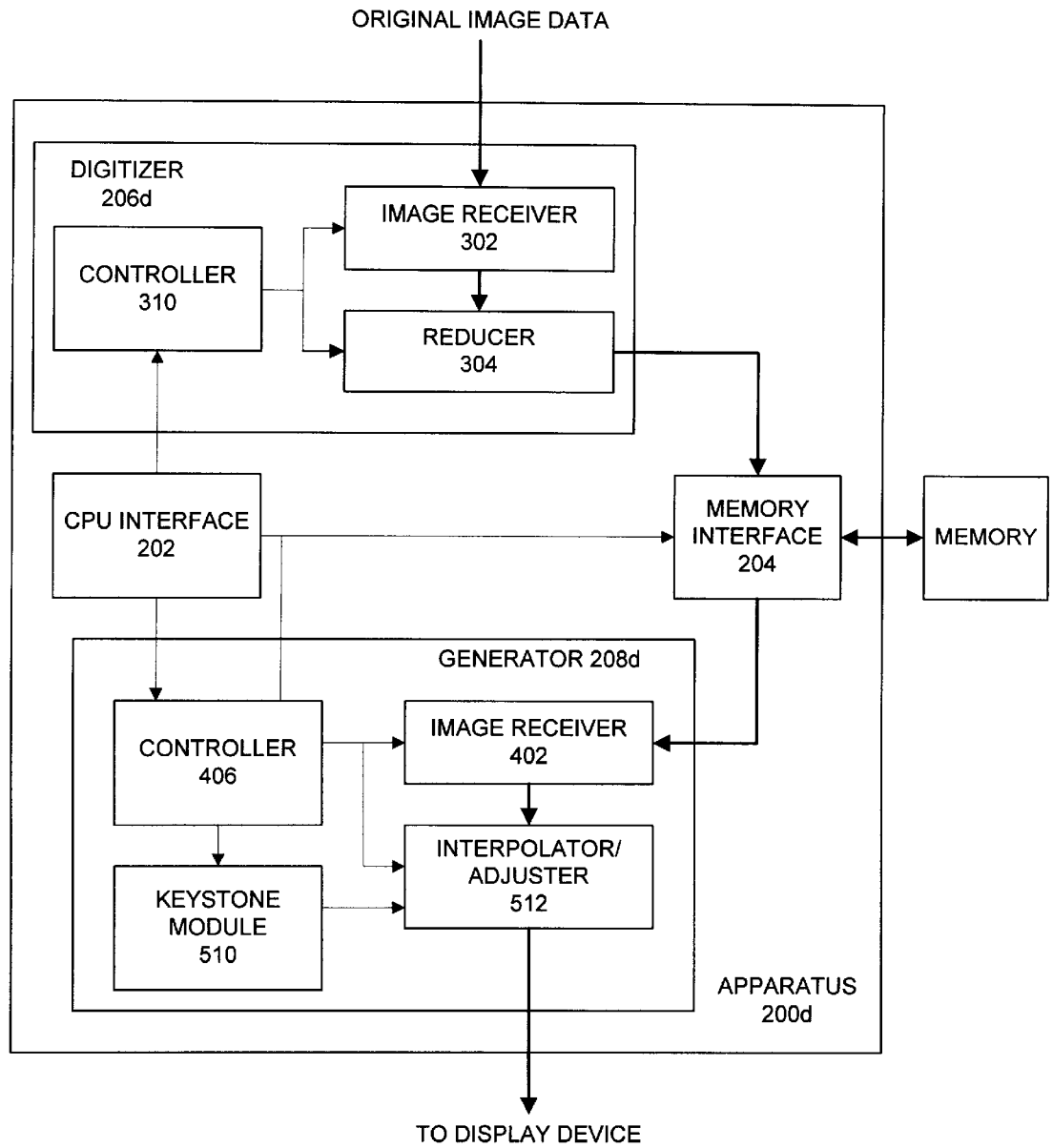

FIG. 5D illustrates apparatus 200d with the interpolation and keystone adjustment functions merged in generator 208d. In particular, interpolator/adjuster 512 performs both the functions of enlarging an image retrieved from memory and adjusting it as necessary to prevent keystone distortion.

A Method of Preventing Keystone Distortion

As described above, in one embodiment of the invention an original image received from an image source is deformed, distorted or otherwise altered before being rendered on a display device such as an LCD panel. Then, when the displayed image is projected, the projected image may be viewed without appreciable keystone distortion.

Figure 7A:
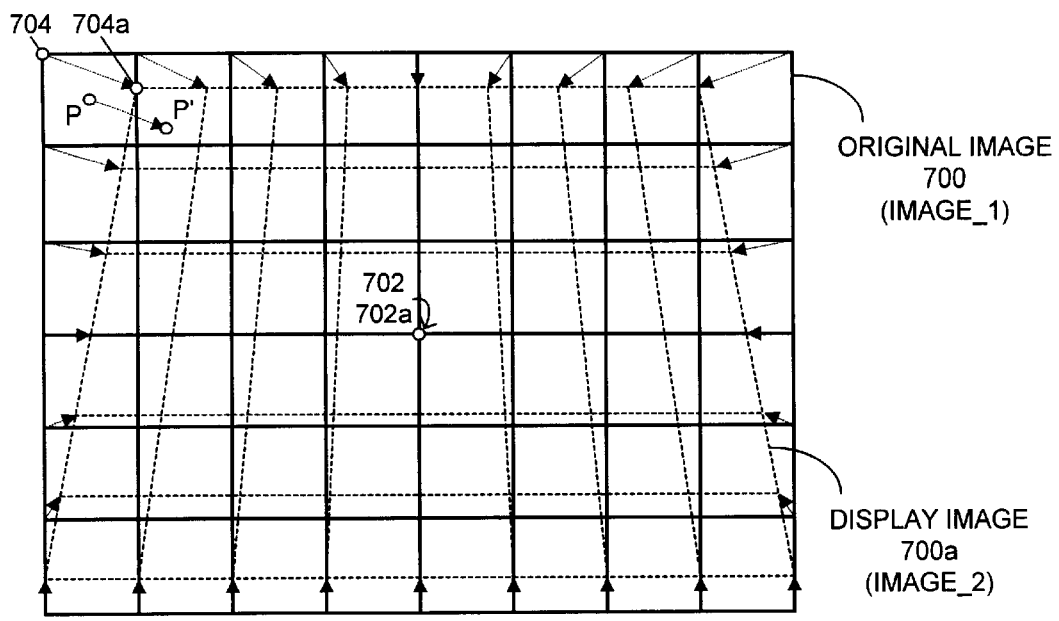
FIG. 7A illustrates the derivation of a display image from an original image in accordance with an embodiment of the present invention.
Figure 7B:
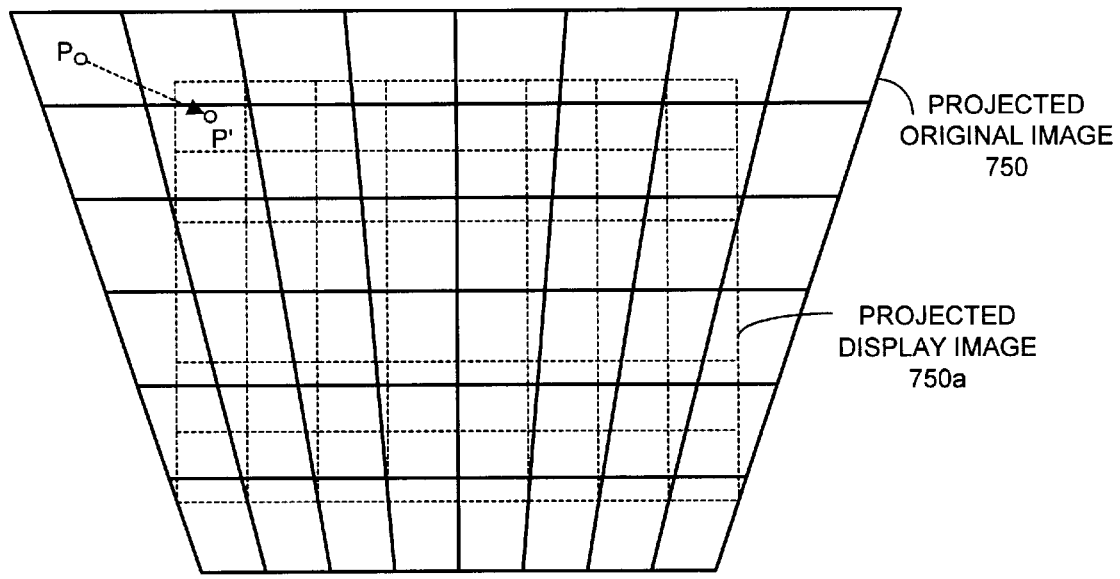
FIG. 7B illustrates the projected images yielded by the display and original images of FIG. 7A in accordance with an embodiment of the present invention.

FIGS. 7A–7B demonstrate an effect of this method. FIG. 7A depicts, with solid lines, the boundaries of an original image 700 (e.g., Image_1) as it might be received prior to any deformation or alteration. Display image 700a (e.g., Image_2), shown with dashed lines, is the image that may be derived from original image 700 and rendered on LCD panel 110 for projection onto a viewing surface. Illustratively, display image 700a is the result of resizing the original image, if necessary, and deforming it appropriately. It may be seen that the centers of original image 700 and display image 700a, represented by points 702 and 702a respectively, coincide in FIGS. 7A and 7B.

One method of creating Image_2 from Image_1 may involve determining the proper shape of the Image_2 that is necessary to offset any keystone distortion that may otherwise occur due to tilt angle $\theta$ and/or pan angle $\alpha$. As described below, this determination may be made based on the geometrical relationships between Image_1 and Image_2. This shape of Image_2 may be termed its effective area, because it defines an area of the display device in which the image may be rendered.

FIG. 7B depicts, with solid lines, the projected original image 750 that results from rendering original image 700 on LCD panel 110 and projecting it onto screen 130 in the projection system of FIGS. 6A–6B. One can easily perceive the keystone distortion that results. Projected display image 750a, shown in dashed lines, however, is the result of projecting display image 700a with the same projection system, and demonstrates the ability to reduce or eliminate keystone distortion in an embodiment of the invention.

The derivation of display image 700a from original image 700 in one embodiment of the invention may be visualized as follows, with reference to FIGS. 1B and 6A. In this embodiment, tilt angle $\theta$ is non-zero but pan angle $\alpha$ is equal to 0. One skilled in the art will recognize how a method of preventing keystone distortion for one pan or tilt angle may be modified to prevent keystone distortion for a different angle. Another embodiment of the invention is directed to a projection system in which both angles are non-zero. Embodiments of the invention are described below for counteracting the effects of either or both of the tilt and pan angles.

In the presently described embodiment, the original image is received as if it were to be rendered on the LCD panel without being deformed or altered. From its position within the LCD panel, the image is then rotated by tilt angle $\theta$ about an axis extending through the center of the LCD panel and parallel to the x-axis. Rotation of the image by angle $\theta$ places it in a plane parallel to the viewing surface. The image is then translated along the z-axis, keeping its center on the z-axis, away from the LCD panel and toward the screen or viewing surface, until just one edge of the image coincides with the plane of the LCD panel. We may refer to this image as Image_1, as it is a first step in the derivation of Image_2 (the deformed image that is rendered and projected with little or no keystone distortion). In this position (e.g., parallel to screen 130), the relation of the Image_1 plane to the plane of the LCD panel recreates tilt angle $\theta$, and their centers are collinear with the projection axis of light source 102. FIG. 1B illustrates the position of Image_1, where the bottom edge of Image_1 meets the LCD panel, with tilt angle $\theta$ formed between them. Note, however, that the LCD panel may overlap Image_1 or vice-versa in an alternative embodiment of the invention.

Image_2 (i.e., the display image rendered on the LCD panel) may then be generated by capturing a geometrical perspective projection of Image_1 on the LCD panel, as if Image_1 were collapsed toward light source 102. The size of Image_2 is thus dependent upon tilt angle $\theta$ and will not be larger than Image_1 in this embodiment, as can be seen in FIGS. 7A–7B.

Thus, in one embodiment of the invention a series of computations are performed on an original image (as Image_1) in order to derive a display image (Image_2) that may be projected without keystone distortion. In particular, for each portion (e.g., point, pixel) on the LCD panel that may be rendered and projected, the corresponding portion of Image_1 is identified. Characteristics of that corresponding portion (e.g., color, intensity, contrast) may then be applied to the LCD panel.

In one embodiment of the invention an offset may be applied to an intermediate image (e.g., Image_1), perhaps by further translating or re-locating its geometric center in the light source (i.e., x-y-z) coordinate system prior to deriving Image_2. Illustratively, an offset may be expressed as $(\gamma, \delta, \lambda)$. FIGS. 8A and 8B illustrate the effect on the image projected on screen 130 of imparting a horizontal offset (i.e., parallel to the x-axis) to move Image_1 to the left or right in relation to its original orientation. It will be recalled that in its original orientation the center of Image_1 is aligned with the axis of projection. FIGS. 8C and 8D illustrate the effect of imparting a vertical offset (i.e., parallel to the y-axis) to slide Image_1 up or down before generating Image_2. Similarly, Image_1 may be offset along the z-axis, as illustrated in FIGS. 8E and 8F, to magnify or shrink Image_2. FIG. 8E demonstrates the shrinking effect of translating Image_1 further away from the LCD panel, while FIG. 8F demonstrates the enlarging effect of translating Image_1 toward the LCD panel.

If too great an offset is specified, however, so that part of Image_2 would appear outside the displayable area of the LCD panel, that portion may be clipped and not displayed or projected. For example, in FIG. 8A the area encompassed by points 804a, 806a, 808a and 810a will not be displayed or projected because it extends beyond the displayable portion of the LCD panel. Similarly, the portion of Image_2 that extends below the displayable area of the LCD panel is not projected. One skilled in the art will understand how the computations described below for creating a suitable Image_2 for the LCD panel may change if Image_1 is translated or shifted along the x-, y- or z-axis prior to, or in combination with, the deformation of an image.

Figure 8G:
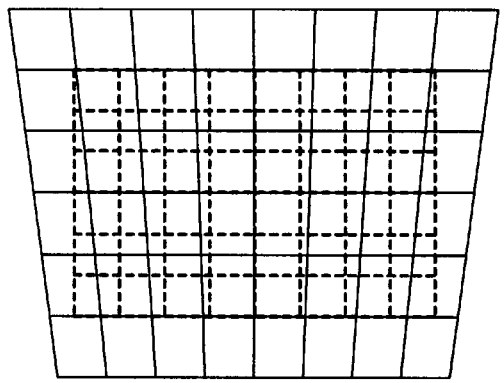
Figure 8G:
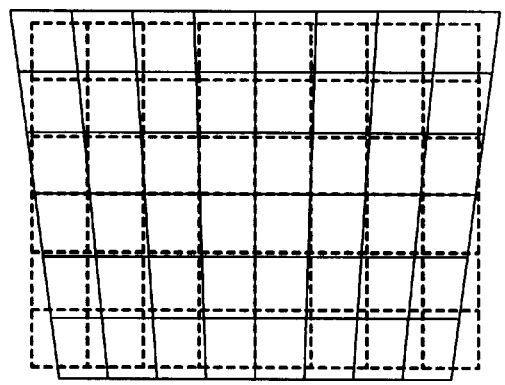
Figure 8G:
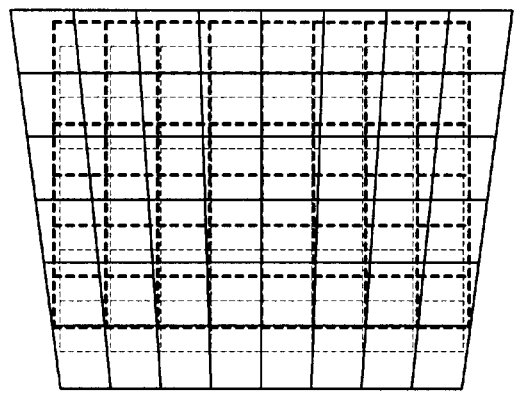

In addition, FIG. 8G demonstrates how a projected Image_2 may increase in size because of being shifted upward, which may not be noticeable in FIG. 8C. The different sizes and positions of Image_2, before and after being shifted may be easily compared. Similarly, a smaller Image_2 may be projected by shifting Image_1 downward.

When offsets are not injected into the computations, however, the geometric centers of Image_1 and Image_2 coincide on the same beam of light from light source 102 (e.g., as shown in FIGS. 7A–7B). Advantageously, this alignment carries through to the projected image, thus necessitating little, if any, adjustment by an operator or user to ensure an accurate reproduction of the original image. Also, aligning an edge of Image_1 with the plane of the LCD panel prior to deriving Image_2 maximizes the size of the resulting image by employing as much of the display area of the LCD panel as possible. Of course, as the tilt angle θ (or pan angle α) becomes greater in magnitude, the display image derived from the original image will necessarily shrink in size.

In the following discussions of methods of deriving a suitable Image_2 from an Image_1, positions within a coordinate system (e.g., the light source or Image_1 coordinate systems) may be expressed without a value in the z or Z dimension. As one skilled in the art will appreciate, in these embodiments of the invention the coordinates of all points in the Image_1 plane or Image_2 plane will have constant Z or z values, respectively. In particular, all points in the LCD panel have a value of d (the focal length of light source 102) in the z-dimension, and all points in Image_1 have the value 0 in the Z-dimension.

It should be understood in the following discussions that Image_1 is formed by re-orienting the original image so as to appear in a plane parallel to the viewing screen. Further, Image_2 is the deformation of Image_1 or the original image to fit within an appropriately shaped display area of the LCD panel. The shape of Image_2 may be derived from the geometrical or spatial relationship between Image_1 and Image_2, and is illustratively configured to substantially offset any keystone distortion that may otherwise be injected into a projected image.

Geometrical Relationship Between Image_1 and Image_2

The geometrical relationships that exist in a projection system employing an embodiment of the invention are described in this sub-section so that the various methods of generating an Image_2 from an Image_1 that are presented in following sub-sections may be better understood. These relationships may be used as described below to locate, for each portion (e.g., pixel) of Image_2, the corresponding portion of the original image (i.e., Image_1). Characteristics of the corresponding portion (e.g., color, intensity) may then be applied to the LCD panel to produce an effective modification of the original image that may be projected with little, if any, keystone distortion.

In a present embodiment of the invention the centers of Image_1 and Image_2 are aligned with the z-axis (the axis of projection) so that an operator of the projection system will not need to make constant adjustments as different images are projected. In addition, Image_2 is rendered as large as possible on the LCD panel (or other display device); this is facilitated by aligning one edge of Image_1 with the LCD panel prior to computing Image_2. The size (e.g., dimensions, shape) of Image_2 varies accordingly as tilt angle θ and/or pan angle α vary.

Figure 9A:
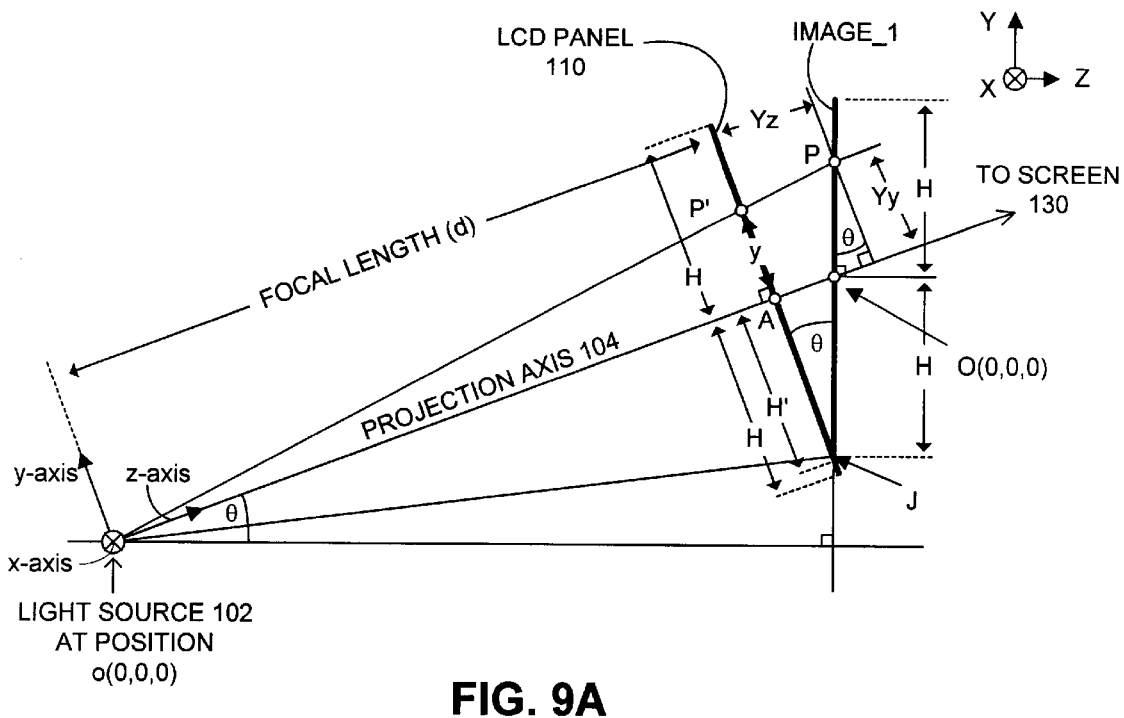
FIGS. 9A–9B depict side and top views of a projection system suitable for implementing an embodiment of the present invention.
Figure 9B:
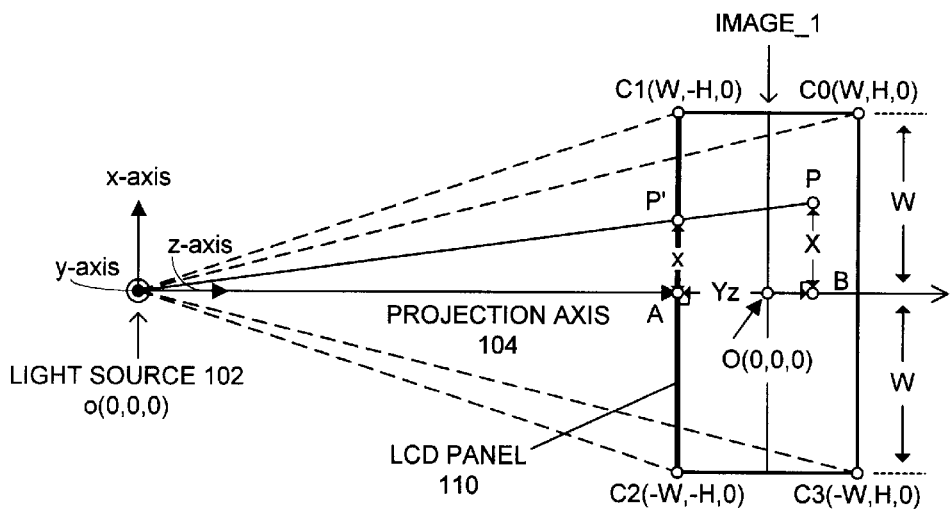

An illustrative projection system in which an embodiment of the invention may be applied is now described in order to demonstrate the geometrical relationships that affect the derivation of Image_2. The projection system is illustrated in FIGS. 9A–9B. In this system, light source 102 of projector 100 (not depicted in FIGS. 9A–9B) is situated at point o (0, 0, 0) in the light source coordinate system. Projector 100 is oriented so that projection axis 104 (i.e., the z-axis) forms tilt angle θ to a line normal to screen 130 (also not shown in FIGS. 9A–9B); pan angle α is zero. Thus, FIG. 9A is a side view and FIG. 9B is a top view of the projection system. One skilled in the art will readily appreciate how the presently described method may be modified to work in a projection system having a pan angle and no tilt angle or a system in which both angles are non-zero.

LCD panel 110 is situated at a distance d (e.g., the focal length of light source 102) from the light source, so that its center, point A in FIGS. 9A–9B, is at coordinates (0, 0, d) in the light source coordinate system. The center of Image_1 is denoted as point O, at coordinates (0, 0, 0) in the Image_1 coordinate system. The corners of Image_1 are represented as points C0–C3 in FIG. 9B. As described above, Image_1 is produced by rotating and translating the original image from the LCD panel. Therefore, angle θ appears between LCD panel 110 and Image_1.

In FIGS. 9A–9B, LCD panel 110 and Image_1 have the same dimensions (i.e., 2W×2H), but this is not necessary for other embodiments of the invention. Illustratively, the magnitude (i.e., actual size) of units in both coordinate systems are identical, thus allowing elements of LCD panel 110 and Image_1 to be readily compared.

Point P of Image_1 is an illustrative point having coordinates (X, Y, 0) in the original image. Point P' is the corresponding point (i.e., on the same beam of light from light source 102) in LCD panel 110. The location of point P' may be represented in the light source coordinate system as (x, y, d). Point A is therefore the projection of point P' onto the z-axis, while point B represents the projection of point P onto the z-axis. In FIG. 9A, y represents the length of the line segment (A, P') projected onto the y-z plane, while x represents the length of the line segment (A, P') projected onto the x-z plane. Similarly, Y represents the length of the line segment (O, P) in the Y-Z plane and X represents the length of the line segment (O, P) in the X-Z plane.

Point B may be defined in the light source coordinate system as having coordinates (0, 0, d+Yz), where Yz represents the length of line segment (A, B). In particular, trigonometry requires that $\sin(\theta)=Yz/(H+Y)$, and so $Yz=(H+Y)*\sin(\theta)$. Similarly, the length of the line segment (P, B) in the y-z plane may be represented as Yy. Mathematically, $\cos(\theta)=Yy/Y$, and so $Yy=Y*\cos(\theta)$.

It may be seen in FIG. 9A that when Image_1 is in position (e.g., parallel to the viewing screen, with its center on the axis of projection and one edge coinciding with the plane of LCD panel 110), the LCD panel may extend beyond the edge of Image_1, or vice-versa. In particular, the junction of LCD panel 110 and Image_1 in FIG. 9A is represented as J. The length of line segment (A, J) may be depicted as H', and because $\cos(\theta)=H'/H$, then $H'=H*\cos(\theta)$. Thus, LCD panel 110 extends beyond the edge of Image_1 by the distance of $H-(H*\cos(\theta))$.

Several other mathematical relationships and equations may be derived from the projection system illustrated in FIGS. 9A–9B, which will be used below to generate Image_2 from Image_1. First, it can be seen that triangles ΔoAP' and ΔoBP are geometrically similar. Therefore, where Yy represents the normal distance from the LCD panel to point P, oA represents the length of line segment (o, A) and oB represents the length of line segment (o, B), one can see that x:X=y:Yy=oA:oB. Because the length of line segment (o, A) is equal to d and the length of line segment (o, B) is equal to (d+Yz), this relationship of ratios may be rewritten as $$x:X=d:(d+Yz)=y:(Y*\cos(\theta)). \qquad (1)$$

FIG. 9A shows that Yz is equal to the length of the line segment (A, B), which can be divided into (A, O) and (O, B). Further, the length of line segment (A, O)=(H*sin(θ)) and the length of line segment (O, B)=(Y*sin(θ)). Thus, $$Yz = H*\sin(\theta) + Y*\sin(\theta).$$

Substituting this value of Yz into the left side of equation (1) above yields $$X = [(d+(H+Y)*\sin(\theta))*x]/d. \tag{2}$$

In order to be able to determine the coordinates of an element (e.g., a pixel) in the Image_1 coordinate system (i.e., as (X, Y, Z)) from the coordinates of an element in the light source coordinate system (i.e., as (x, y, z)), however, we must eliminate the Y value in equation (2). By substituting the above value for Yz into the right side of equation (1) we see that d:(d+H*sin(θ)+Y*sin(θ))=y:(Y*cos(θ)), so that $$Y = \frac{(d + H*\sin(\theta))*y}{d*\cos(\theta) - y*\sin(\theta)} \tag{3}$$

and $$y = \frac{d*Y*\cos(\theta)}{(d + H*\sin(\theta) + Y*\sin(\theta))} \tag{4}$$

The function Ry(y) is adopted to represent the scaling factor that may be used to map the y-coordinate of a pixel in Image_2 (e.g., pixel P' in FIG. 9A) to the Y-coordinate of a corresponding portion or pixel in Image_1 (e.g., pixel P in FIG. 9A). In particular, Ry(y) may help represent or express the relationship between the position or location of a line of Image_1 and the position of a corresponding line of Image_2. Function Ry(y) is therefore defined as follows:

$$Ry(y) = \frac{d + H*\sin(\theta)}{d*\cos(\theta) - y*\sin(\theta)}$$

Thus, equation (3) may be represented simply as Y=Ry(y)*y and may be rewritten to make Y a function of y for given values of d, H and θ:

$$Y(y) = Ry(y)*y. \tag{5}$$

Another function, designated Rx(y), is adopted to represent the scaling factor that may be used to map the x-coordinate of a pixel in Image_2 (e.g., pixel P') to the X-coordinate of a corresponding portion or pixel in Image_1 (e.g., pixel P) for a given y-coordinate. In particular, Rx(y) may help represent or express the relationship between the width of a line of Image_1, or the position of an element within the line, and the corresponding line or element of Image_2. Rx(y) may be defined as follows:

$$Rx(y) = Ry(y)*\cos(\theta)$$

or $$Rx(y) = \frac{\cos(\theta)*(d + H*\sin(\theta))}{d*\cos(\theta) - y*\sin(\theta)}$$

It will be apparent to one skilled in the art that, for given values of d and H and a given tilt angle θ, Rx(y) is constant for a particular value of y (e.g., within a particular line of pixels in Image_2), and the corresponding x value is proportional to X(x, y). Values for Rx and/or Ry may be stored in a table or other data structure.

Eliminating the middle term in equation (1) above demonstrates that x:X=y:(Y*cos(θ)); therefore X=(Y*cos(θ)*x)/y. Substituting the value of Y from equation (5) yields X=(Ry(y)*cos(θ)*x), where X is now expressed in terms of x and y. And, because Rx(y)=(Ry(y)*cos(θ)), therefore X=Rx(y)*x. This equation may be rewritten as a function of x and y for given values of d, H and θ as:

$$X(x, y) = Rx(y)*x \tag{6}$$

Or, X may be expressed in terms of x and Y instead of x and y. In particular, the left side of equation (1) shows that x:X=d:(d+Yz). Because Yz=(H*sin(θ)+Y*sin(θ)), it can be seen that $$X = \frac{(d + H*\sin(\theta) + Y*\sin(\theta))*x}{d}$$

which may be restated as:

$$X(x, Y) = \frac{(d + (H + Y)*\sin(\theta))*x}{d}$$

Function Rx(Y) may now be introduced to represent the scaling factor applicable to the value of x for a particular pixel in Image_2 to determine the X coordinate of the corresponding pixel in Image_1, based on a value of Y. Rx(Y) is defined as:

$$Rx(Y) = (d+(H+Y)*\sin(\theta))/d \tag{7}$$

and thus $$X(x, Y) = Rx(Y)*x, \tag{8}$$

where d, H and θ are constant values. Rx(Y) should be recognized as a linear function of Y, however, values of Y yielded by equation (5) for use in equation (8) may not always be integers, thus complicating the calculations somewhat.

In summary, Ry(y) facilitates the calculation of the Y-coordinate of a pixel in Image_1 that corresponds to a pixel in Image_2 having a given y-coordinate. Similarly, Rx(y) and Rx(Y) facilitate the calculation of the X-coordinate of the Image_1 pixel, based on the y-coordinate of the Image_2 pixel or the Y-coordinate of the Image_1 pixel, respectively. A method of calculating a scaling factor such as Rx(y) or Rx(Y) incrementally, Through addition or subtraction of an incremental adjustment (e.g., rather than multiplication), is described below.

The equations that may be used to map an element (e.g., an pixel) of Image_2 to its corresponding element in Image_1 in embodiments of the invention described in the following sub-sections may be re-numbered for ease of reference:

$$Ry(y) = \frac{d + H*\sin(\theta)}{d*\cos(\theta) - y*\sin(\theta)} = Rx(y)/\cos(\theta) \tag{11}$$

$$Rx(y) = \frac{\cos(\theta)*(d + H*\sin(\theta))}{d*\cos(\theta) - y*\sin(\theta)} = Ry(y)*\cos(\theta) \tag{12}$$

$$Y(y) = Ry(y)*y \tag{13}$$

$$X(x, y) = Rx(y)*x \tag{14}$$

$$Rx(Y) = (d+(H+Y)*\sin(\theta))/d \tag{15}$$

and $$X(x, Y) = Rx(Y)*x. \quad (16)$$

From these equations, the (X, Y) coordinates of a point P in Image_1 (shown in FIGS. 9A–9B) based on a point P' in Image_2 may be determined. Characteristics such as the color value, brightness, intensity and so on of portions (e.g., pixels) of Image_2 in LCD panel 110 may then be copied from the corresponding portions in Image_1 in order to faithfully reproduce the original image. Characteristics of Image_2 may, of course, be further altered or modified (e.g., beyond or instead of characteristics inherited from Image_1) in order to impart a particular effect or appearance.

As mentioned briefly above, although the coordinates of a pixel in Image_2 may be expressed in integer form (in the light source coordinate system) in one embodiment of the invention, the coordinates of the corresponding portion of Image_1 (in the Image_1 coordinate system) calculated from the above equations may not have integer values. One method of determining the characteristic(s) to be applied to an Image_2 pixel when the calculated Image_1 portion does not align with a pixel or other individual element is to interpolate from the values of adjacent pixels. In one embodiment of the invention, all adjacent pixels (e.g., a maximum of eight pixels) are used for interpolation. In alternative embodiments, any number of pixels—and not limited to adjacent pixels—may be used. In yet another alternative embodiment of the invention, an averaging method may be employed to smooth the characteristics of nearby pixels.

Determining the Effective Area of Image_2

After Image_1 is derived from an original image, Image_2 may be formed according to a method presented in the following sub-sections. In one embodiment of the invention, however, the usable or effective area of Image_2 is determined before deriving Image_2 from Image_1. The area of the display device that is identified in this procedure may indicate the shape of Image_2. In particular, the shape of the defined area may be such that, when filled with image data from Image_1, the image may be projected without appreciable keystone distortion. Illustratively, usable portions of the LCD panel that are not occupied by Image_2 may be filled with a background color or some other pattern.

Some of the factors that may affect the size and dimensions of the effective area of Image_2 include tilt angle θ, pan angle α, the dimensions of the original image (e.g., Image_1), any offset, enlargement or shrinkage imparted to Image_1 (described above), the focal length of the projection light source, etc.

In one method of determining the effective area of an Image_2, the outline of the image is first calculated based on the number of lines in the image and the length of each line (e.g., measured by the number of pixels). Several parameters may be employed in the following computations to determine the effective area of Image_2. For example, Start_Position_y identifies the value, in the y-dimension, of the first effective or useful line of an original image (or Image_1) that can be displayed as part of Image_2 (e.g., the top line of a display image that may be displayed on the LCD panel). Similarly, End_Position_y is the last line to be displayed and Dimension_y is the total number of effective lines that can be displayed. These parameters may be concisely represented as SPy, EPy and Dy, respectively. Note that the case of the last character in these representations (i.e., lowercase) identifies the applicable reference coordinate system—here, the light source coordinate system.

Other parameters relate to individual lines within the effective area of Image_2 or the LCD panel. Thus, Start_Position_x(y) identifies the x value of the first (e.g., leftmost) useful or effective pixel in line number y. End_Position_x(y) is the x value of the last pixel in line y and Dimension_x(y) identifies the number of pixels in line y. These parameters may be concisely represented as SPx(y), EPx(y) and Dx(y).

In sum, the parameters Start_Position_y (SPy), End_Position_y (EPy), Start_Position_x(y) (SPx(y)), and End_Position_x(y) (EPx(y)) define the effective or useful area of the LCD panel for Image_2 in an embodiment of the invention. Portions of Image_1 that are mapped to regions outside this area may not be displayed, although in one embodiment of the invention Image_2 may be shifted within the LCD panel in order to display different portions of the image.

Similar parameters may be introduced for Image_1. Thus, Start_Position_Y (SPY) and End_Position_Y (EPY) identify the first (e.g., top) and last (e.g., bottom) lines in Image_1 and Start_Position_X (SPX) and End_Position_X (EPX) represent the first and last positions in a line of Image_1. SPX and EPX may be constant values for each line in Image_1 where Image_1 is rectangular in shape. In another embodiment of the invention, however, in which Image_1 is not rectangular or symmetrical, the starting and ending positions of a line in Image_1 may be represented as SPX(Y) and EPX(Y), respectively.

One method of deriving values associated with one or more of these parameters is now described. In the embodiment of the invention depicted in FIGS. 9A–9B, for example, SPY=H and EPY=−H. And, because these values correspond to SPy and EPy in the light source coordinate system, equation (13) may be restated as:

$$Y(SPy) = Ry(SPy)*SPy = H$$

and $$Y(EPy) = Ry(EPy)*EPy = -H.$$

By solving these equations for the parameters SPy and EPy using the value of Ry(y) from equation (11), we see that $$SPy = \frac{d*H*\cos(\theta)}{d + 2H*\sin(\theta)} \quad (21)$$

and $$EPy = (-H)*\cos(\theta). \quad (22)$$

Then, because Dy=SPy −EPy:

$$Dy = \frac{2H*\cos(\theta)*(d + H*\sin(\theta))}{d + 2H*\sin(\theta)}. \quad (23)$$

Also in FIGS. 9A–9B, SPX=−W and EPX=W. Thus, from equation (14) it may be seen that $$X(SPx(y),y) = Rx(y)*SPx(y) = -W$$

and $$X(EPx(y),y) = Rx(y)*EPx(y) = W.$$

Solving these equations for the parameters SPx(y) and EPx(y) in light of equation (12) yields:

$$SPx(y) = (-d*W/k) + (\tan(\theta)*W*y/k) \quad (24)$$

and $$EPx(y)=(d*W/k)-(\tan(\theta)*W*y/k), \qquad (25)$$

where $k=d+H*\sin(\theta)$. It is thus apparent that $EPx(y)=-SPx(y)$, which demonstrates the symmetrical nature of Image_2 for rectangular original images. And, because $Dx(y)=EPx(y)-SPx(y)$ we may see that $Dx(y)=2*EPx(y)$ or $$Dx(y)=(2*d*W/k)-(2*\tan(\theta)*y*W/k). \qquad (26)$$

Further, from equation (26) it can be seen that $\Delta Dx(y)$, the difference in width (e.g., number of pixels) of one line of Image_2 from the next, can be represented as $$\Delta Dx(y)=Dx(y)-Dx(y-1),$$

or $$\Delta Dx(y)=-2*\tan(\theta)*W/k. \qquad (27)$$

The values yielded by any of the above equations may be rounded or truncated to integer values for easier location, representation or display.

The parameters SPy, EPy, Dy, SPx(y), EPx(y) and Dx(y) thus define the effective area of Image_2 on the LCD panel, as depicted in FIG. 7A. These parameters may be stored in the projection system or an associated memory or may be calculated as necessary for each original image that is received. These parameters may change, such as when tilt angle $\theta$ or pan angle $\alpha$ is altered.

FIG. 7A also demonstrates how a point P in Image_1 corresponds to a point P' in Image_2. For example, point 704 in Image_1 can be described by the coordinates (SPX, SPY, 0) or the coordinates (−W, H, 0) depicted in FIGS. 9A–9B. Point 704a, which is the corresponding point in Image_2 for point 704, has coordinates (SPx(SPy), SPy, d) in the light source coordinate system.

From the preceding equations, one or more observations may be made. In particular, equations (24) and (25) demonstrate that SPx(y) and EPx(y) vary linearly with respect to y; in other words, the sides of Image_2 are straight lines when Image_1 (the original image) is rectangular. The slopes of these edges, moreover, are opposite in sign, thereby making the effective area of Image_2 a symmetric trapezoid. This may differ for non-rectangular images.

Figure 20:
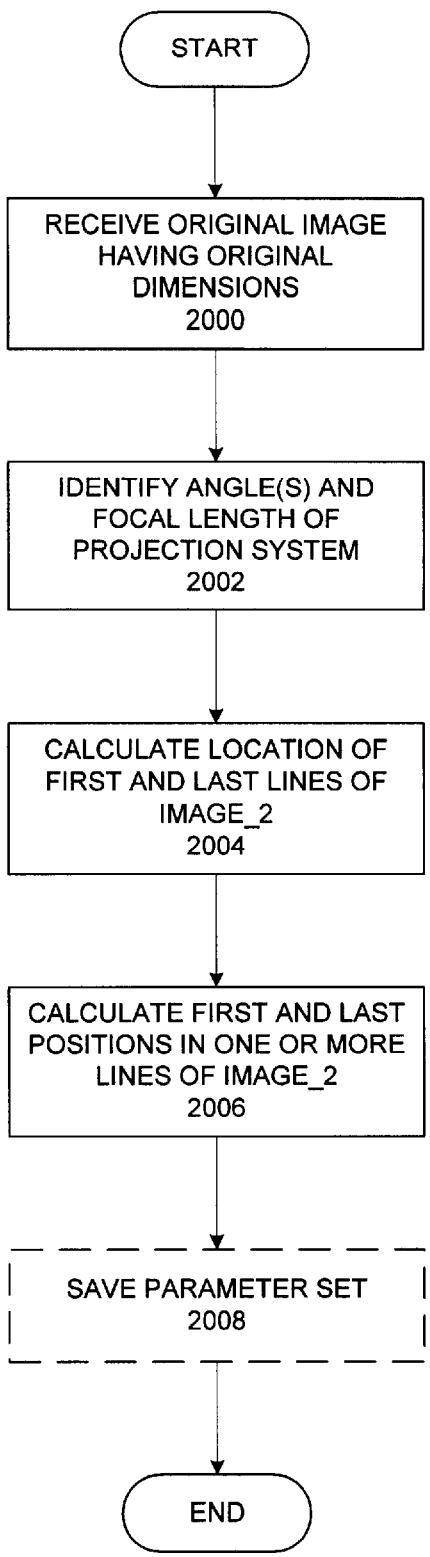
FIG. 20 is a flowchart demonstrating one method of determining an effective area of a display image in accordance with one embodiment of the invention.

FIG. 20 is a flowchart demonstrating one method of identifying or determining the effective area of the display device or one area of the display device in which an Image_2 may be rendered. In state 2000, an original image is received having dimensions Original_X by Original_Y, which correspond to 2*W by 2*H in FIGS. 9A–9B.

In state 2002, the angle(s) (e.g., $\theta$ and/or $\alpha$) of the projection system and the focal length (i.e., d) of the light source are retrieved or determined.

In state 2004 the locations of the first (SPy) and last lines (EPy) of Image_2 are calculated. In one embodiment of the invention these values are determined by applying equations (21) and (22) above. In addition, the total number of lines (Dy) may be determined from the difference between the first and last lines or from equation (23) and their y values may be stored.

In state 2006 the values of SPx(y) and EPx(y) are calculated for one or more lines, or every line, of Image_2. The y-coordinates of the Image_2 are known from state 2004 and may be inserted into equations (24) and (25) to yield the necessary values. The width, or number of positions (e.g., pixels) in each line (Dx(y)) may also be calculated for a specific value of y by taking the difference between SPx(y) and EPx(y) or by applying equation (26). In one alternative embodiment, the width of consecutive lines in Image_2 may be determined by accumulating the incremental factor yielded by equation (27).

In state 2008, the parameter set identifying or outlining the effective area of Image_2 may be saved in memory. The parameters may be saved, for example, for use when another image of the same or similar dimensions is received. Also, if Image_1 is translated (e.g., by offsetting the image as described above), a new effective area may be determined by calculating and applying the adjustments that must be made to the parameter set to effect the offset.

One Method of Deriving Image_2 from Image_1

The parameters described in the preceding sub-section, (e.g., SPy, EPy, Dy, SPx(y), EPx(y) and Dx(y)) provide one method of outlining the effective or useful region into which Image_1 may be translated in order to form Image_2. In one embodiment of the invention, each portion of Image_1 that is to be mapped to a portion (e.g., a pixel) of Image_2 may then be identified. In other words, for each effective pixel in Image_2 a corresponding pixel (or set of pixels) in Image_1 may be calculated. In this embodiment of the invention equations (11)–(14) above are calculated for each (x, y) coordinate in the effective area of the LCD panel in order to identify a corresponding (X, Y) coordinate in Image_1. Pertinent characteristics (e.g., color, brightness, contrast) of the Image_1 pixel or set of pixels may then be used to render the Image_2 pixel. As already described, the Image_2 coordinates have constant z-dimension values of d (the focal length of the projection light source), while the Image_1 coordinates have constant Z-dimension values of zero.

Illustratively, the location of a portion of Image_1 corresponding to a pixel located at (x, y) in Image_2 may be represented in the Image_1 coordinate system as (X+$\delta$X, Y+$\delta$Y). In the presently described embodiment of the invention these coordinates may be computed by applying equations (11) through (14) above, with given values for $\theta$, d and H, for a point (x, y) within the effective area of Image_2. In particular, values for Ry(y) and Rxfy) may be calculated for a given value of y. Then Y may be computed based on Ry(y) and y, and X may be computed using Rx(y) and each x value associated with the given y value.

In one alternative embodiment of the invention a somewhat different method of locating an Image_1 pixel at coordinates (X, Y) corresponding to the Image_2 pixel at coordinates (x, y) is applied. In this alternative method, Y may be calculated as before (e.g., using Ry(y) and the given y value), after which Rx(Y) and X(x, Y) may be calculated for each consecutive x value using equations (15) and (16). Both of these methods, however, may require significant computing resources in order to make the necessary computations in a timely manner.

Further, as described previously several other parameters or characteristics may be used to describe how an original image is stored by a digitizer section of an apparatus and/or retrieved by a corresponding generator section. It will be recalled, for example, that Reduce_X and Reduce_Y represent, in one embodiment of the invention, the horizontal and vertical scaling factors applied to resize (e.g., shrink) an original image when storing it in memory. Reduce_X and Reduce_Y may be computed by a processor associated with the projection apparatus when the original image is received from an image source. Further, the area of memory in which the original image is stored may be described by Start_Write_X, Start_Write_Y, Write_X and Write_Y.

Similarly, in this embodiment of the invention Enlarge_X and Enlarge_Y represent the horizontal and vertical scaling factors for resizing (e.g., enlarging) a stored original image before rendering it on one or more LCD panels. The area(s) of memory from which the stored image is retrieved may be described by the parameters Start_Read_X, Start_Read_Y, Read_X and Read_Y. The area of memory identified by these parameters may or may not correspond to the same area of memory in which the image was initially stored (e.g., the area identified by Start_Write_X, etc.).

The calculations necessary to store and retrieve an image, however, may be difficult to merge with the calculations necessary to deform Image_1 to create Image_2. In particular, the calculations associated with the basic parameter set of SPy, Dy, SPx(y), Dx(y), Y(y) and X(y) are intended for use in deforming an image of a particular size (e.g., 2H by 2W). Thus, whenever a dimension is altered of an original image that is stored, retrieved and deformed, the parameter set may need to be recalculated. Also, additional hardware may be required in order to successively or separately resize the image and deform it. For example, one set of line buffers may be required in order to scale (e.g., reduce or enlarge) an image and another set may be required for the deformation of the image.

In one embodiment of the invention a set of parameters (e.g., SPy, Dy, SPx(y), Dx(y), Y(y), and X(y)) applied to create Image_2 from Image_1 for projection from an LCD panel is stored in memory for use by a processor associated with the projection system. Illustratively, these and/or other parameters may be recalculated any time the values of H, W, tilt angle θ or pan angle α change. In order to conserve memory, parameters may be stored in areas of frame memory that correspond to non-displayable, off-screen areas or portions of the LCD panel outside the effective area of Image_2. The parameters may, alternatively, be stored in some other area accessible to the processor, such as memory accessed through memory interface 204 of apparatus 200 depicted in FIG. 2.

In another embodiment of the invention, a memory with high remanence (e.g., a ROM) may be utilized. In this embodiment a processor's burden of quickly calculating and applying these parameters may be decreased by storing pre-calculated sets of parameters in the memory. The stored parameter sets may encompass a wide range of values for H, W, θ and/or α.

The parameter set comprising SPy, Dy, SPx(y), Dx(y), Y(y), and X(y) or the parameter set comprising SPy, Dy, SPx(y), Dx(y), Y(y) and X(Y) may be referred to as the first parameter set. Alternative methods of deriving Image_2 from Image_1 described in the following sub-section employ alternative parameter sets, and the performance or advantage of one method (or parameter set) compared to another method (or parameter set) may be discussed.

Figure 21:
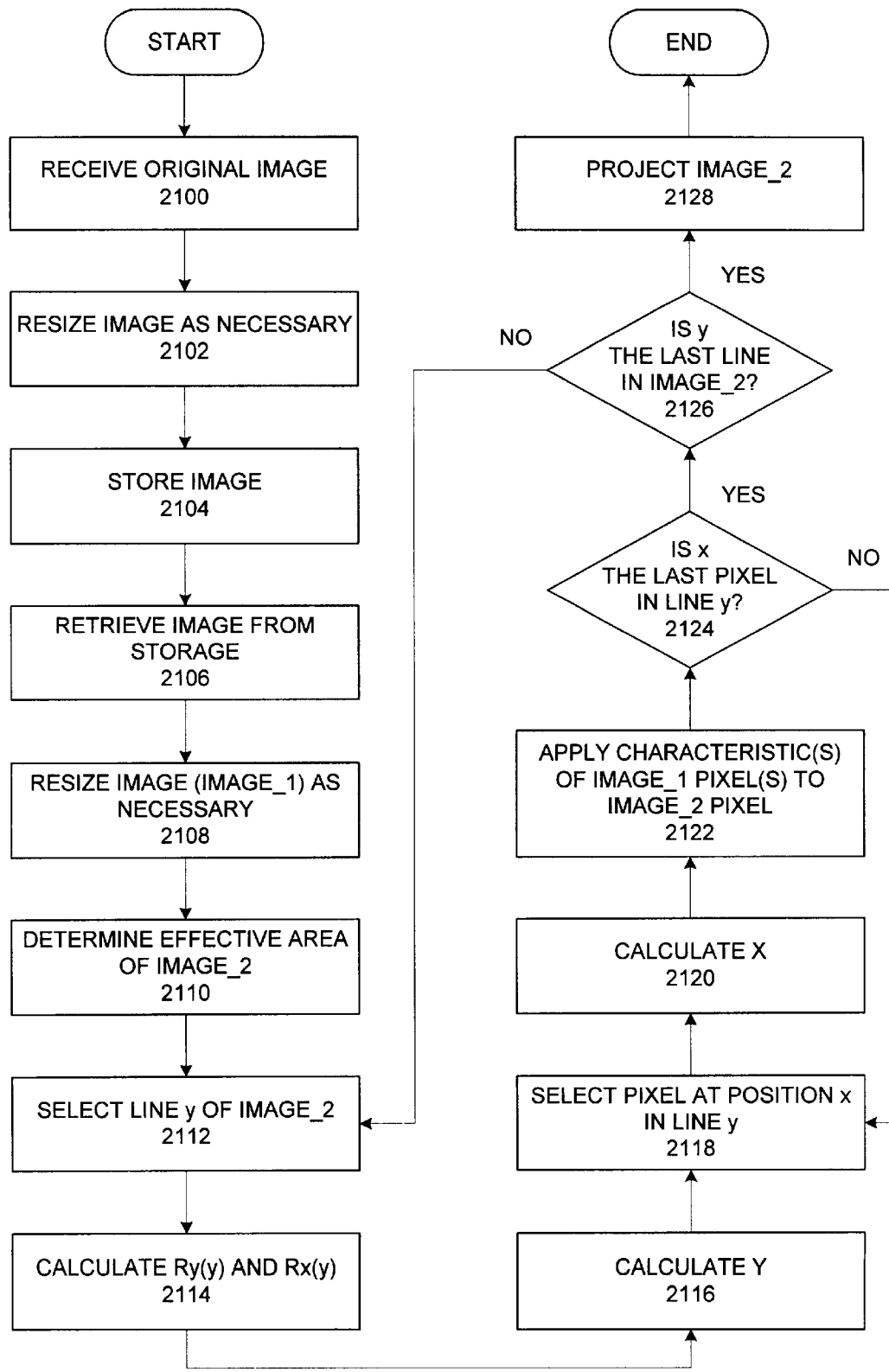
FIG. 21 is a flowchart demonstrating one method of deriving a display image from an original image in accordance with one embodiment of the invention.

FIG. 21 demonstrates one method of generating Image_2 within a pre-determined effective area of a display device (e.g., an LCD panel) using a parameter set described above. The operations performed in this method may be re-ordered in a variety of sequences, as will be apparent to one skilled in the art.

In state 2100, an original image is received from an image source. In state 2102 the image is re-sized, if necessary for storage in memory. In state 2104 the image is stored in memory, illustratively in a line-by-line format. In state 2106 the image is retrieved (e.g., because it is about to be projected) from memory.

In state 2108 the retrieved image, which may be referred to now as Image_1, is re-sized as necessary according to dimensions of the display device.

In state 2110, the effective area of the corresponding Image_2 is computed or retrieved from memory. If, for example, the dimensions of the original image match those of a previous image, the parameters for a suitable effective area may already be stored. The method described above for identifying an effective area may be applied.

In state 2112, a first line (e.g., the top line) of the effective area of Image_2 is selected by noting its y-coordinate, which may be known as SPy above. Then in state 2114 the values of Ry(y) and Rx(y) are calculated, possibly using equations (11) and (12) above. In state 2116, Y(y) is computed (e.g., using equation (13)) and may be represented as (Y+δY), as described above, in order to help locate the pixel(s) of Image_1 that correspond to pixels in the present line of Image_2.

In state 2118, a first pixel in line y of Image_2 is selected by its x-coordinate (e.g., SPx(y)). Then, in state 2120, X(x, y) may be computed by using equation (14) or similar calculations. This value of X may be represented as (X+δX), thus yielding coordinates of (X+δX, Y+δY) in Image_1 that correspond to the coordinates (x, y) in Image_2. The Z-coordinate for Image_1 is zero, while the z-coordinate for Image_2 is d.

In state 2122, one or more characteristics of the Image_1 pixel at, or closest to, coordinates (X+δX, Y+δY) are copied and applied to the current Image_2 pixel. For example, the color or intensity of the Image_1 pixel may be copied and applied. Illustratively, if the (X+δX, Y+δY) coordinates do not closely match the coordinates of a single pixel in Image_1, the characteristics of multiple nearby pixels may be copied, smoothed, averaged, or otherwise combined and applied to the Image_2 pixel.

In state 2124 it is determined whether the current pixel was the last in the current line of Image_2 (e.g., EPx(y)). If not, the illustrated method returns to state 2118 to select a next pixel (e.g., by incrementing or decrementing the value of x). If this was the last pixel in line y, the method proceeds to state 2126.

In state 2126 it is determined whether the last line of Image_2 was just completed (e.g., EPy). If not, the illustrated method returns to state 2112 to select a next line (e.g., by incrementing or decrementing the value of y). Otherwise, the completed Image_2 is now fully rendered and, in state 2128 is projected onto a viewing screen, with a notable lack of keystone distortion.

An Alternative Method of Deriving Image_2 from Image_1

In one alternative embodiment of the invention a method of locating a portion of Image_1 corresponding to a pixel in Image_2 is employed that involves less computational complexity. This method strives to approximate the curve of Ry(y) and Y in equations (11) and (13). The derivation and simplicity of this method are now explained, starting with the application of equation (15) to SPY and EPY— the starting and ending lines in Image_1 (which have values of H and −H, respectively):

$$Rx(SPY) = Rx(H) = 1 + [2*H*\sin(\theta)/d]$$

and $$Rx(EPY) = Rx(-H) = 1.$$

As the value of Rx(Y) varies linearly with Y, the incremental change in Rx(Y), denoted δRx(Y), can be represented as $$\delta Rx(Y) = Rx(Y+\Delta Y) - Rx(Y) = \sin(\theta)*\Delta Y/d \quad (28)$$

Thus, once Rx(Y) is computed for a first line of Image_1, such as SPY (i.e., H) or EPY (i.e., −H), succeeding values may be computed by simply adding or subtracting (sin(θ) *ΔY/d) rather than having to repeat equation (15) above for each Y value. This simplifies the determination of consecutive X values and lessens the burden placed on a processor by replacing the multiplication and division of equation (15) with addition or subtraction.

The computations involved in equation (28) may be approximated by noting that the outline of the effective area of Image_2 for rectangular original images is that of a symmetric trapezoid. Therefore, the difference in the y-dimension between consecutive lines in Image_2 is constant, from a first line (i.e., SPy) to the last (i.e., EPy). And, the constant difference in Rx due to variations in y, represented as δRx(y), can thus be computed:

$$\delta Rx(y) = \frac{|Dx(EPy) - Dx(SPy)|}{Dy} \quad (29)$$

Further, it is known that Rx(EPy)=Rx(EPY) because the bottom edge of the effective area of Image_2 coincides with the bottom line of Image_1 (shown in FIG. 9A). And, it was demonstrated above that Rx(EPY)=Rx(-H)=1; therefore Rx(EPy)=1. Then, starting with this value, Rx(y) for each y value prior to EPy can be computed by consecutively adding or subtracting δRx(y).

An approximation of equation (13) may now be derived that is significantly less computationally intensive. First, a second-order quadratic equation that closely matches equations (11) and (13) may be expressed as $$Y(y) = \beta_2 * y^2 + \beta_1 * y + \beta_0. \quad (30)$$

It may be noted that ΔY(y)=Y(y+1)-Y(y) and, therefore, from this quadratic equation:

$$\Delta Y(y) = 2*\beta_2*y + (\beta_1 + \beta_2) \quad (31)$$

and $$Y(y+1) = Y(y) + \Delta Y(y). \quad (32)$$

And, evaluating equation (31) for (y+1) and simplifying yields:

$$\Delta Y(y+1) = \Delta Y(y) + 2*\beta_2 \quad (33)$$

Thus, from the values of Y and ΔY for a given y, ΔY for the next value of y can be obtained by adding or subtracting the constant $(2*\beta_2)$.

Equation (30) demonstrates that $Y(0)=\beta_0$, and, from equation (31), $\Delta Y(0)=(\beta_1+\beta_2)$. It may be noted that y=0 indicates the middle line of Image_2 in the presently described embodiment of the invention. Then, ΔY for consecutive positive values of y may be calculated by successively adding $(2*\beta_2)$, while ΔY for consecutive negative y values may be calculated by subtracting $(2*\beta_2)$. For example, $\Delta Y(1)=\Delta Y(0)+(2*\beta_2)$, or $\Delta Y(1)=(\beta_1+\beta_2+(2*\beta_2))=(\beta_1+3*\beta_2)$, while $\Delta Y(-1)=(\beta_1+\beta_2-(2*\beta_2))=(\beta_1-\beta_2)$.

Further, from the value of Y for a given y, such as $Y(0)=\beta_0$, equation (32) shows that Y for adjacent y values may be determined by adding or subtracting the ΔY corresponding to the given y value. Therefore, $Y(1)=Y(0)+\Delta Y(0)=\beta_0+(\beta_1+\beta_2)$, while $Y(-1)=Y(0)-\Delta Y(0)=\beta_0-(\beta_1+\beta_2)$.

Thus, by calculating or selecting appropriate values for $\beta_0$, $\beta_1$ and $\beta_2$, computing the Y value of a point in Image_1 from a point in Image_2 is simplified and requires less-intensive calculations. In one embodiment of the invention appropriate values for $\beta_0$, $\beta_1$ and $\beta_2$ are calculated from equation (30) using the special cases in which Y(SPy)=SPY=H, Y(EPy)=EPY=-H and Y(0)=0. Substituting these particular values into equation (30) yields:

$$B_2*(SPy)^2 + B_1*(SPy) + B_0 = H$$

$$B_2*(EPy)^2 + B_1*(EPy) + B_0 = -H$$

and $$B_0 = 0.$$

Solving these equations yields appropriate values for $\beta_0$, $\beta_1$ and $\beta_2$ for this embodiment, which may be stored in memory for use during the deformation of an image. SPy and EPy may be calculated as per equations (21)–(22).

Thus, a table or other collection of various possible $\beta_0$, $\beta_1$ and $\beta_2$ values may be generated and stored for use in the derivation of Image_2 from an original image. This method of calculating Y values allows the use of addition and subtraction functions rather than more complex and time-intensive operations and may therefore allow the use of a less-sophisticated processor and/or other apparatus.

Just as successive Y values may be determined using a known Y value and adding or subtracting an incremental ΔY, successive values for X may be determined in a similar manner. In particular, ΔX(x, Y)=X(x, Y)-X(x-1, Y)=Rx(Y) and ΔX(x, Y+ΔY)=ΔX(x, Y)+δRx(Y), where δRx(Y) can be calculated with equation (28) and ΔY can be calculated using equation (32).

Similar calculations may be applied to X(x, y) as well. For example, ΔX(x, EPY)=Rx(EPY)=Rx(-H)=1 (e.g., from equation (15)), while ΔX(x, EPY+ΔY)=ΔX(x, EPY)+δRx(Y)=(1+(sin(θ)*ΔY/d)).

Further, because Rx(y) is a scaling factor that can represent the difference between consecutive values of X corresponding to consecutive values of x within a given line y of Image_2, equation (14) may be recursively applied as:

$$X(x, y) = X(x-1, y) + Rx(y) \quad (34)$$

once a first X value is known. One such initial value of X may be calculated by evaluating X(SPx(y), y) for each line y. Rx(y) in equation (34) thus approximates ΔX(x, y), wherein Rx(y)=X(x, y)-X(x-1, y)=ΔX(x, y). This may be represented in recursive form as $$\Delta X(x, y) = \Delta X(x, y+1) - \delta Rx(y) \quad (35)$$

or $$Rx(y) = Rx(y+1) - \delta Rx(y),$$

where δRx(y) can be approximated with equation (29). Equation (35) may be applied starting with the bottom line of Image_2, wherein ΔX(x, EPy)=Rx(EPy)=1. Illustratively, values of ΔX(x, y) for all values of y may be calculated in advance and stored in memory, and then each X(x, y) may be determined during operation of the projection system by successively accumulating ΔX(x, y).

Thus, in one embodiment of the invention, instead of calculating each separate X and Y value for a given parameter set, just the differences between consecutive X and Y values may be computed. In particular, in one implementation of this embodiment the parameter set that is applied to create Image_2 comprises SPy, Dy, SPx(y), Dx(y), ΔY(y) and ΔX(y) or ΔX(Y). This implementation embodies at least three advantages.

First, the deformation of an image can now be performed simultaneously with a resizing (e.g., shrinking or enlargement). Advantageously, therefore, only one set of line buffers is needed for both operations. Second, even if the dimensions of a display image (e.g., Image_2) change, the entire parameter set need not be recalculated. Third, less space is required to store these parameters than a previous parameter set.

It will be recalled that the portion of Image_1 that corresponds to a position in Image_2 may be represented as $(X, Y)+(\delta X, \delta Y)$. In applying the presently described alternative embodiment of the invention, $(X, Y)$ may be initially set to (SPX, SPY), which is equivalent to (−W, H), and $(\delta X, \delta Y)$ may be initially set to (0, 0). Illustratively, this combination is the location of the top-left pixel of Image_1 and corresponds to the top-left effective pixel of Image_2, which may be represented as (SPx(SPy), SPy). The calculation of subsequent positions in Image_1 in this embodiment may depend upon how the image is resized (e.g., shrunk or enlarged).

For example, if the horizontal and vertical scaling factors in the digitizer and generator (e.g., Reduce_X Enlarge_Y) are equal to one (i.e., the image is neither decimated nor enlarged), the following procedure may be applied. For a first value of y (i.e., SPy, the first line in Image_2) and a first pixel in line y (i.e., SPx(y)), the corresponding X and Y values may be computed using equations provide above or, they may be known (i.e., SPX, SPY). Values for X corresponding to the remaining pixels in line y of Image_2 may be calculated by accumulating $\Delta X(y)$ with SPX (i.e., −W) up to (Dx(y)−1).

After this first line in Image_2 is derived, subsequent Y values (i.e., after SPY or H) corresponding to succeeding lines in Image_2 may be calculated by accumulating $\Delta Y(y)$ with SPY, as described above, up to (Dy−1) times. Each X value within each succeeding line Y is calculated as just described. In this manner, Image_2 is derived one line and one pixel at a time and each corresponding portion of Image_1 is identified by accumulating $\Delta Y$ and $\Delta X(y)$.

However, if one or both of the horizontal and vertical scaling factors are not equal to one, then the scaling ratio must be incorporated into the calculations. In particular, values for X for a given line are calculated by consecutively accumulating, with SPX, the product of $\Delta X(y)$ multiplied by the horizontal scaling factor (e.g., Reduce_X or Enlarge_X). Successive Y values (e.g., Y(y+1) are calculated by consecutively accumulating, with SPY, the product of $\Delta Y(y)$ multiplied by the vertical scaling factor (e.g., Reduce_Y or Enlarge_Y).

If the dimensions of Image_2 are modified (e.g., shrunk or enlarged), necessary parameters (e.g., SPy, Dy, SPx(y), Dx(y)) may be modified accordingly by multiplying them with the appropriate scaling factor(s).

In this embodiment of the invention, the Image_1 positions that are calculated by adding $\Delta X$ and $\Delta Y$ values, represented as $(X+\delta X, Y+\delta Y)$, may not precisely match the location of an Image_1 pixel. Thus, the characteristics to be assigned to the corresponding Image_2 pixel (e.g., at location (x, y)) may be determined by analyzing (e.g., accumulating, weighting, averaging) the characteristics of nearby Image_1 pixels.

To distinguish it from the set of parameters applied in the previous sub-section, the parameter set comprising SPy, Dy, SPx(y), Dx(y), $\Delta Y(y)$ and $\Delta X(y)$ may be termed a second parameter set.

Another alternative embodiment of the invention is particularly suitable for a projection system in which the dimensions of an image displayed on the LCD panel (e.g., Image_2) rarely, if ever, change. The parameter set employed in this embodiment comprises SPy, Dy, SPx(y), Dx(y), Y'(y) and X'(y) and may be termed a third parameter set. In this embodiment, X'(y) and Y'(y) are products of X(y) and Y(y) from the first parameter set (discussed in the previous sub-section) multiplied by the x- and y-dimension scaling factors, respectively. Thus, one advantage of this alternative embodiment of the invention is the further consolidation of functions within the apparatus employed in this embodiment For example, one common set of line buffers would suffice and a keystone module (e.g., keystone module 308 of FIG. 3A), which may be used to generate individual scaling ratios for each line of an image, may not be needed. Depending on the number of scaling ratios to be prepared for (i.e., by combining them with X and Y parameters), additional storage space may be needed for the various permutations of the parameter set.

Thus, one skilled in the art will appreciate that the use of any of the first, second or third parameter sets, or another parameter set that may be derived from one of these and/or the equations described above, may involve tradeoffs. One parameter set and associated method of deriving Image_2 may be superior in terms of hardware cost, complexity, or storage space. Another parameter set or method of deriving Image_2 may be superior in efficiency, performance, or some other criteria. One skilled in the art will appreciate that selection of one parameter set and method over another may depend upon a particular application or image(s) to be projected.

Figure 22:
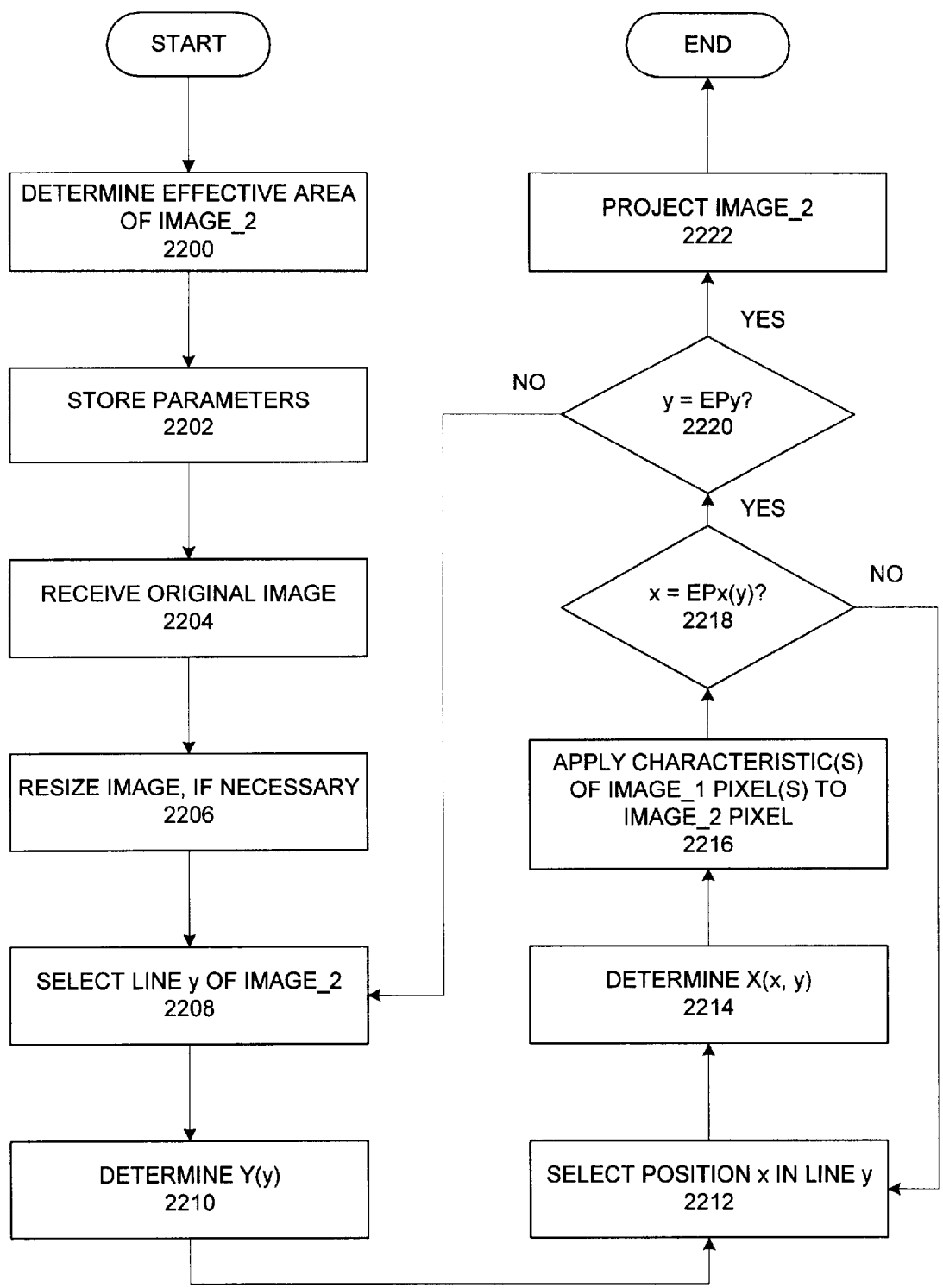
FIG. 22 is a flowchart demonstrating an alternative method of deriving a display image from an original image in accordance with one embodiment of the invention.

FIG. 22 demonstrates one method of the invention, described in this sub-section, in which Image_2 data (e.g., color, intensity) may be derived from portions of Image_1 using less intensive computations than a method described in the previous sub-section.

In state 2200 the effective area of Image_2 is determined, possibly using a method described above. In a situation in which the dimensions of the image(s) to be projected are identical or very similar, and particularly where those dimensions are known beforehand, the effective area of Image_2 can be calculated before an original image is received, thus decreasing the calculations that must be performed at that time. Alternatively, effective areas for multiple sets of original image dimensions may be computed.

In state 2202, various parameters are stored for use in deriving Image_2. In particular, in the illustrated method the stored parameters include SPy, Dy, SPx(y), Dx(y), $\Delta Y(y)$ and $\Delta X(y)$. As described above in conjunction with equations (30)–(32), values for Y(y) and $\Delta Y(y)$ may be generated using a quadratic equation. Thus, appropriate values for $\beta_0$, $\beta_1$, and $\beta_2$ may be generated, retrieved (e.g., from a table) or stored, as necessary, in state 2202. Other parameters (e.g., Rx(y), $\delta Rx(y)$) may also be calculated and/or stored in order to perform as much of the necessary computations ahead of time as possible.

In one alternative embodiment of the invention, in state 2202 one or more of these parameters may be combined with resizing or re-scaling factors that are to be applied to an image. As described above, this may allow any resizing of an image to be performed in concert with its deformation.

In state 2204 an original image is received from an image source. The original image may be stored temporarily prior to further processing of the image.

In state 2206 the image is resized as necessary, perhaps for temporary storage prior to its deformation or rendering or maybe in accordance with the dimensions of the display device.

In state 2208 a line within the effective area of Image_2 is selected. Illustratively, this process may start with the top line (i.e., SPy). In alternative embodiments of the invention, however, the process may start with the bottom line (i.e., EPy) or some other line (e.g., where y=0).

In state 2210 the value of Y(y) is determined. If the necessary parameters were calculated and stored ahead of time (e.g., in state 2202), this may simply involve retrieving the value from memory. It may be noted that Y(SPy)=H. Values of Y for subsequent lines in Image_2 may be determined by adding or subtracting the value of ΔY(y), which may have been stored in state 2202.

In state 2212 a position (e.g., pixel) x is chosen in line y. Illustratively, the first position in a line may be SPx(y); in this method the first position chosen in the first line (e.g., SPy) is thus SPx(SPy).

In state 2214 the value of X(x, y) is determined. The first position in the first line may be X(SPx(SPy), SPy), which equates to −W. The value of X for a first position in each line may among the parameters stored in state 2202, or may be calculated on-the-fly. Values of X for subsequent positions within a line y may be determined by adding or subtracting the constant value ΔX(y) which, again, may be one of the parameters stored in state 2202.

In state 2216 one or more characteristics of a portion of Image_1 are retrieved and applied to the Image_2 pixel located at coordinates (x, y).

In state 2218 it is determined whether the last position in line y has been processed. If, for example, x=EPx(y), then this method of the invention continues at state 2220. Otherwise, the illustrated method returns to state 2212 to select another position.

In state 2220, it is determined whether the last line in Image_2 has been processed. If, for example, y=EPy, the illustrated method continues at state 2222; otherwise the method returns to state 2208 to select another line.

In state 2222 the rendering of Image_2 on the display device is completed and the result may be projected.

Correcting Keystone Distortion for a Tilt Or Pan Angle

In this section, various embodiments of the invention are described for preventing keystone distortion when one or the other of tilt angle θ or pan angle α are present (e.g., non-zero). Embodiments of the invention for preventing keystone distortion when both angles are present are described in the following section.

The configuration of an apparatus for implementing an embodiment of the invention may depend upon the set of parameters chosen to generate a suitable display image (e.g., Image_2). Three illustrative parameter sets were described in the preceding section. One skilled in the art will recognize that any apparatus configurations described in this and the following section that have not been described in earlier may be readily derived from configurations presented in that section. Reference may be made to FIGS. 2–5D to view sample apparatus configurations.

The deformation of an original image to produce the display image may, illustratively, be performed in either the digitizer or generator module of a suitable apparatus. As described previously, a digitizer module may resize (e.g., shrink) an original image for storage and a generator module may resize (e.g., enlarge) a stored image for rendering on a display device. Either of these modules may integrate a deformation operation with its resizing, or may perform the two operations sequentially.

In one embodiment of the invention the digitizer module shrinks an original image (e.g., according to Reduce_X and Reduce_Y) to fit it in a specified storage area (e.g., memory accessed through a memory interface module). The digitizer may then, in a separate operation, deform the reduced image using similar components as the resizing operation. In this embodiment, depicted in FIGS. 3B–3C, the first parameter set (e.g., SPy, Dy, SPx(y), Dx(y), Y(y), X(y)) may be used for the deformation. Parameters in this set may be calculated based on a usable area of the display device (e.g., an LCD panel) and the tilt or pan angle. Illustratively, the original image is deformed a line at a time by copying characteristics of Image_1 into the computed effective area of Image_2, using the parameters Y(y) and X(y) (and perhaps Rx(y) and Rx(x)). The contents of each line (e.g., from position SPx(y) up to its length Dx(y)) may then be placed in memory. Each line, from SPy to EPy (i.e., where EPy=SPy+Dy), is treated in succession in one embodiment of the invention. In another embodiment, lines of Image_2 are processed or derived in a different sequence. After the original image is resized, deformed, and stored, a generator module may apply its own re-scaling factors (e.g., Enlarge_X and Enlarge_Y) to fit the image data into a displayable portion of the LCD panel.

In one alternative method and apparatus, the resizing and deformation functions of a digitizer module are merged. In particular, as each line of an original image is received and resized (e.g., reduced), it is deformed using a parameter set that includes ΔX(y) and ΔY(y) to simplify the process. The image may then be stored in memory. Advantageously, one set of hardware components may perform both of these functions in one operation instead of using duplicate components for sequential resizing and deformation. When retrieved from memory for rendering on the display device, the generator module resizes (e.g., enlarges) the image as usual.

Figure 10:
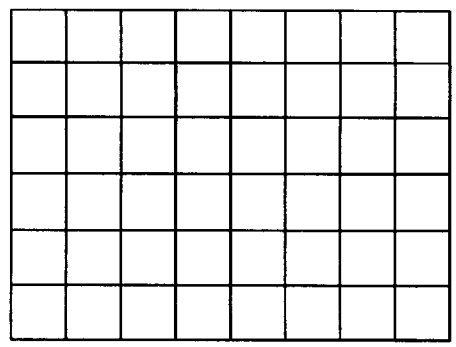
FIG. 10 illustrates the combined resizing and deformation of an original image by a digitizer module in accordance with an embodiment of the invention.
Figure 10:
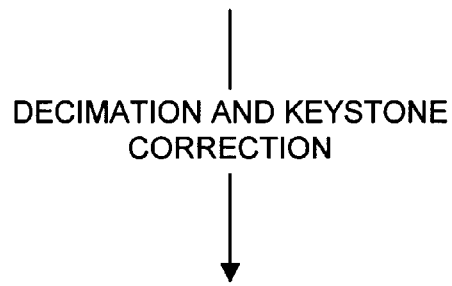
Figure 10:
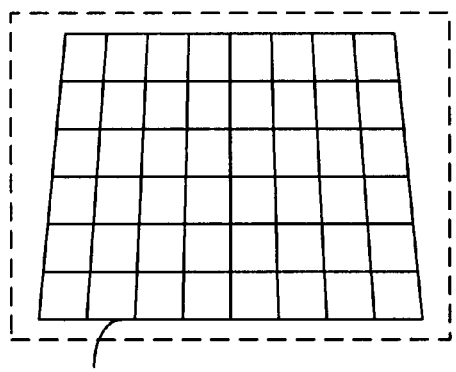

This method is depicted in FIG. 10, which illustrates the combined decimation (i.e., reduction) and deformation of original image 1000 to form display image 1002, which may then be stored in memory or passed on to a generator module. Display image 1002 may possess the same dimensions with which it will be rendered on a display device, or a generator module may re-scale it prior to rendering.

One skilled in the art will appreciate that although the preceding methods, illustrated in FIGS. 3B–3C and 10, depict the entire image being enlarged and/or deformed as a unit, the image may actually be modified one portion (e.g., line) at a time.

In another alternative method and apparatus the deformation of an image is performed in the generator module. In this embodiment of the invention the digitizer module may perform a resizing (e.g., shrinking) operation to fit an original image into an area of memory. When the generator module receives the image (e.g., retrieves it from storage) and resizes (e.g., enlarges) it, if necessary, the first parameter set is again applied to deform the image within the displayable area of the LCD panel and according to the tilt or pan angle. In particular, the retrieved image is first enlarged and its characteristics are then applied to corresponding portions of Image_2, which is then rendered in a portion of the LCD panel outlined by SPy, Dy, SPx(y) and Dx(y).

Figure 11A:
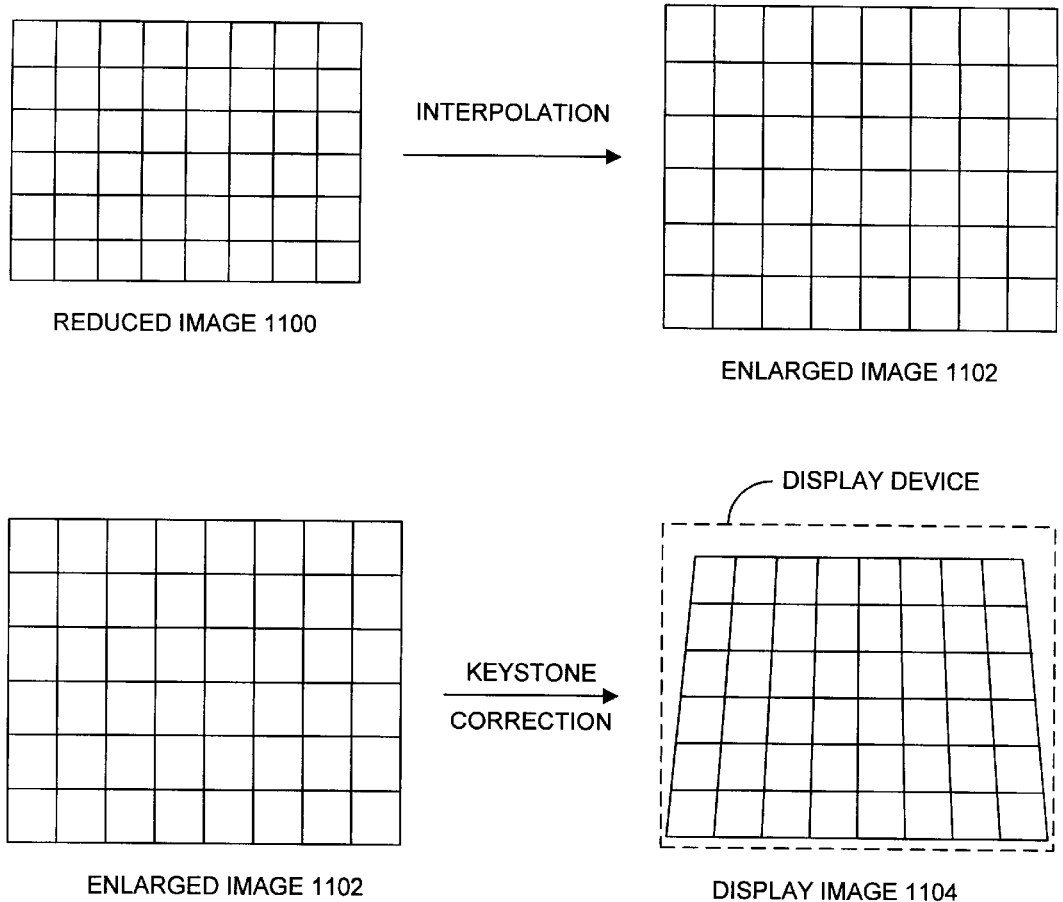
FIGS. 11A–11B demonstrate the resizing and deformation of an image by a generator module in accordance with an embodiment of the invention.

Illustratively, each line is rendered one position at a time, from SPx(y) to EPx(y) (where EPx(y)=SPx(y)+Dx(y)) from the first line, SPy, to the last, EPy. Portions of the display device that are not filled with image data may be rendered according to random or pre-determined data (e.g., a background color). This method is illustrated in FIG. 11A, which shows reduced image 1100 (which may have been created and stored by a digitizer module) being interpolated or enlarged to form enlarged image 1102. Illustratively, the dimensions of enlarged image 1102 may depend upon the dimensions of the display device (e.g., an LCD panel). In a second operation, enlarged image 1102 is deformed or skewed to form display image 1104.

Because the deformation of the image is performed last in this embodiment of the invention, this embodiment may produce a projected image superior in quality to embodiments in which deformation of an image is performed prior to interpolation (e.g., resizing) of the image. In particular, when the image deformation is performed before resizing, the resizing operation may magnify any loss of resolution or "jaggedness" of diagonal lines that was caused by the image deformation. For example, when an original image is rectangular in shape, the deformed version of the image will normally have the shape of a symmetric trapezoid with diagonal sides. When the diagonal sides are then resized for display, the more the image is enlarged the more uneven or jagged the sides may appear.

In yet another alternative method and apparatus, the resizing and deformation functions of a generator module are merged. Because the generator module in this embodiment is not configured to reduce or shrink an image, the products of Enlarge_X and ΔX(y) and of Enlarge_Y and ΔY(y) should be no less than one. Because all reduction of the image is therefore done in the digitizer module, this may require the digitizer module in this embodiment to shrink the original image more than it would otherwise. This method is depicted in FIG. 11B, in which reduced image 1120, which may have been created and stored in memory 1110 by a digitizer module, is enlarged and deformed to create display image 1122 in one combined operation.

Figure 11B:
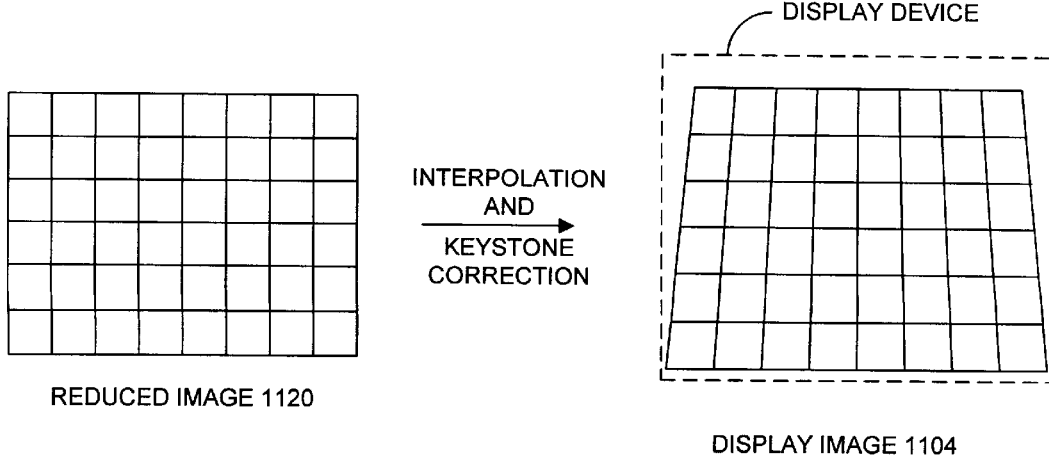

One skilled in the art will appreciate that although FIGS. 11A–11B depict the entire image being enlarged and/or deformed at once, the image may actually be modified one portion (e.g., line) at a time. The dashed lines in FIGS. 10 and 11B may represent the outline of the displayable portion of the display device, thus demonstrating how the display image may appear when rendered on the device. The ineffective area of the display device (e.g., the area within the dashed lines that are not part of the display image) may be filled with color data approximating the viewing screen, some other surrounding area, or a predetermined color such as gray or black.

One skilled in the art will appreciate that the functions of each digitizer module and the functions of each generator module in the embodiments described above may be equivalent if the keystone distortion prevention aspect of the invention is inactive. That is, in each embodiment the digitizer module resizes (e.g., reduces) an original image for storage in a specified memory area and the generator module resizes (e.g., enlarges) the stored image for a display device. Illustratively, the scaling ratios applied by the digitizer module are no greater than one and the scaling ratios applied by the generator module are no less than one. Also shown in the preceding embodiments of the invention is the ability to perform the deformation or skewing of an image (i.e., to prevent keystone distortion) in either the digitizer or generator module, either sequentially or merged with each module's resizing function.

Correcting Keystone Distortion for a Tilt And Pan Angle

FIG. 1C depicts a projection system in which the projector is both tilted around the x-axis (e.g., to project upward) and panned around the y-axis (e.g., to project to the right, from the point of view of the projector). Thus, both tilt angle θ and pan angle α are present (i.e., non-zero).

In one embodiment of the invention keystone distortion may be prevented when both angles are present by first deriving an intermediate image that offsets keystone distortion from one angle (e.g., tilt angle θ). This intermediate image is then re-oriented by rotating it 90 degrees and a suitable display image that offsets keystone distortion from the other angle (e.g., tilt angle α) may be derived. In this embodiment, the intermediate image is oriented within the dimensions of the original image (i.e., 2W in width by 2H in height), while the display image fits in dimension of 2H in width and 2W in height because of the intervening image rotation.

Figure 23:
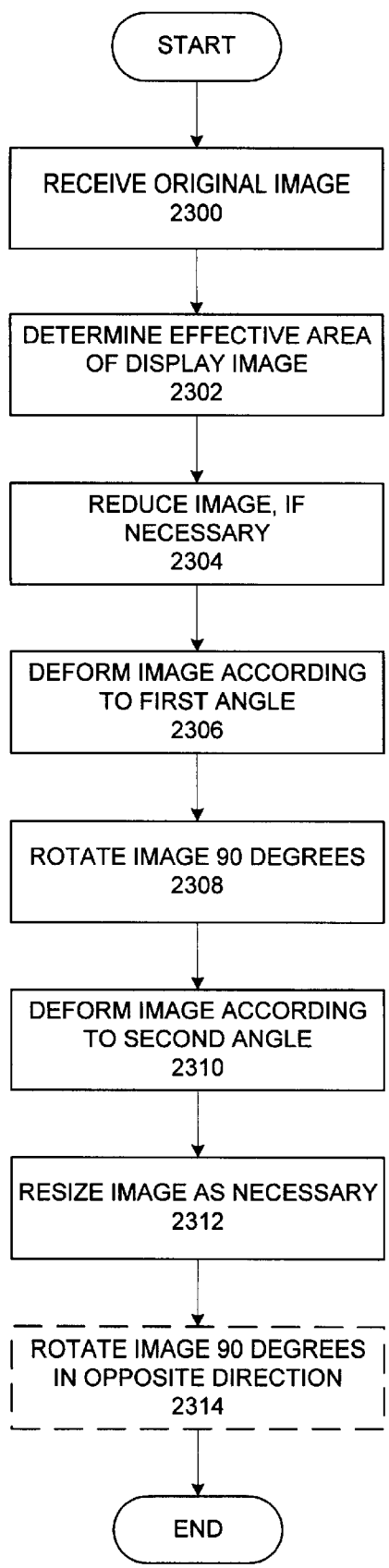
FIG. 23 is a flowchart demonstrating one method of deriving a display image from an original image when both horizontal and vertical angles of the projection system are non-zero in accordance with one embodiment of the invention.

FIG. 23 demonstrates one method of preventing or offsetting keystone distortion according to this embodiment of the invention when both tilt and pan angles are non-zero.

In state 2300, an original image having non-zero tilt and pan angles is received from an image source. In state 2302 the effective area of the image is determined if not already known. This may involve the calculation, retrieval and/or storage of several parameters, described above, that can be used in the following deformation processes.

In state 2304 the original image is resized (e.g., reduced), if necessary, for a designated memory area. This resizing operation may take into account a 90 degree rotation that will be applied to the image before it is stored.

In state 2306 the image is deformed to offset the keystone distortion that would be otherwise result from a first angle (e.g., tilt angle θ). As described above, deformation of an image may involve mapping characteristics of the original image to corresponding portions of the display image within the defined effective area. In one embodiment of the invention the resizing and deformation operations of states 2304 and 2306 may be reversed or merged. One method of combining these operation is described above, wherein the resizing and deformation factors or ratios are combined.

In state 2308 the image is then rotated 90 degrees. This rotation may be performed just prior to storage or may be imparted to the image as it is stored in memory. For example, the memory interface unit may receive the reduced and deformed image data row-wise from the digitizer module. The memory interface thus ends up delivering each row to the generator module as a column.

In state 2310, the generator module then deforms the rotated image to offset the keystone distortion that would be caused by the other angle (e.g., pan angle α). In state 2312 the generator module may resize the image as necessary for the display device. In one embodiment of the invention the resizing and deformation operations of states 2310 and 2312 may be reversed or merged. One method of combining these operation is described above, wherein the deformation and resizing factors or ratios are combined.

If the display device is to be rendered in row-wise format, in state 2314 it may then be rotated 90 degrees in the reverse direction of the previous rotation before being displayed. In one alternative embodiment, the display device itself is rotated 90 degrees to eliminate the need for the final rotation of the image by the generator module. This alternative embodiment eliminates any need for additional buffering or memory resources that may be necessary to perform image rotation in the generator.

In state 2316, the resulting display image is projected.

Figure 12:
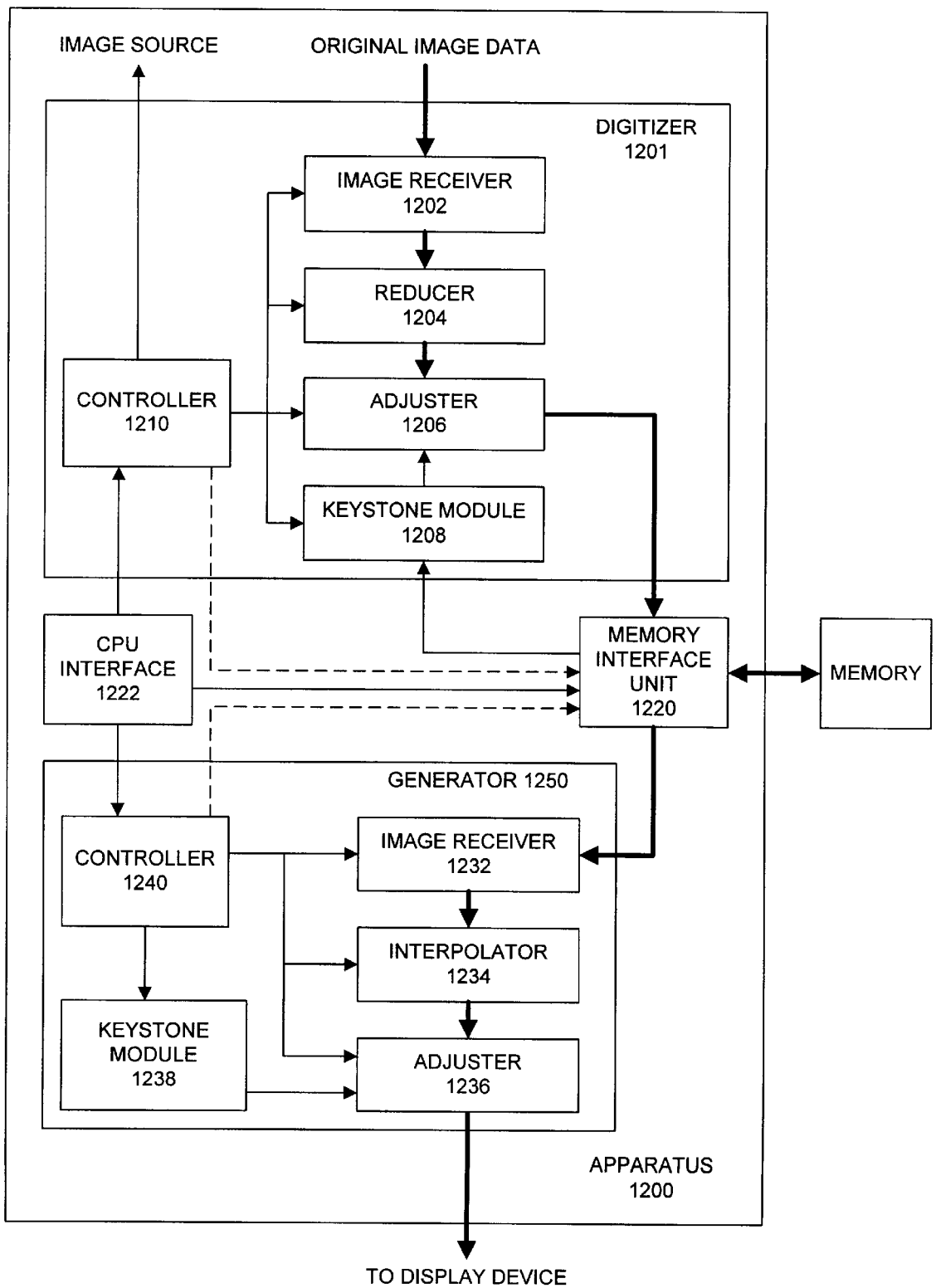
FIG. 12 is a block diagram of an apparatus configured to prevent keystone distortion when both horizontal and vertical angles exist between the projector and a line normal to the viewing screen in accordance with an embodiment of the invention.

FIG. 12 is a block diagram of apparatus 1200 configured to prevent keystone distortion when both tilt and pan angles are present. Digitizer 1201 and generator 1250 are each configured to offset the keystone distortion that would occur due to one of the angles. Illustratively, an original image received at digitizer 1201 by image receiver 1202, is resized (e.g., shrunk) by reducer to fit into a specified area of memory. The image is then deformed by adjuster 1206 according to parameters or ratios computed or retrieved by keystone module 1208 to offset the distortion that would otherwise be caused by tilt angle θ. Adjuster 1206 sends a row (e.g., a line) of reduced and deformed image data at a time to memory interface unit 1220, which rotates the image 90 degrees by storing the data in column order. Controller 1210 of digitizer 1201 controls the flow of data through the digitizer module and into memory interface unit 1220.

The stored image is received by generator 1250 at image receiver 1232. The image is then resized (e.g., enlarged) by interpolator 1234 and adjuster 1236 deforms the image to offset or prevent keystone distortion that may be caused by pan angle α. Adjuster 1236 deforms the image data according to input from keystone module 1238, which may utilize parameters retrieved from memory or calculated as needed. Controller 1240 controls the flow of image data from the memory interface unit and through generator 1250.

In apparatus 1200, after the generator module resizes and deforms the image to offset pan angle α, the image may be rotated 90 degrees in the opposite direction that it was previously rotated or, alternatively, the display device itself may adopt or be situated in a rotated orientation.

Figure 13A:
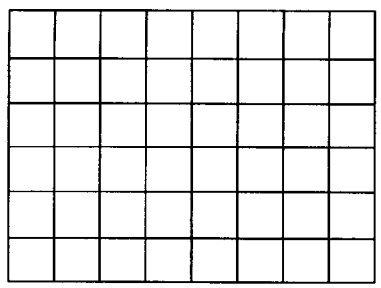
FIGS. 13A–13D illustrate the derivation of a display image from an original image when both horizontal and vertical angles exist between the projector and a line normal to the viewing screen in accordance with an embodiment of the invention.
Figure 13A:
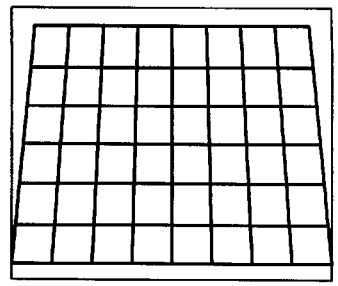
Figure 13B:
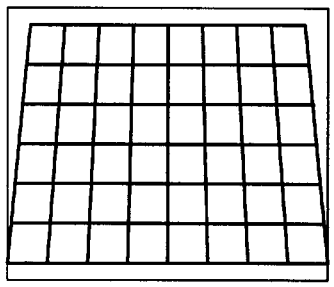
Figure 13B:
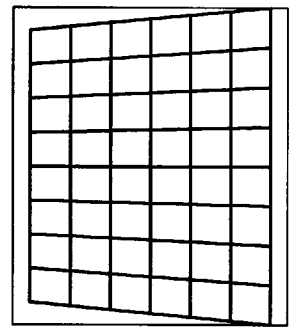
Figure 13C:
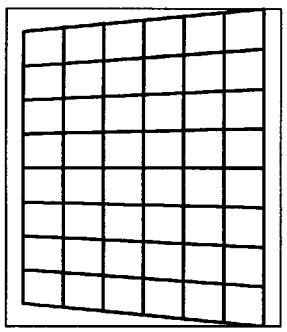
Figure 13C:
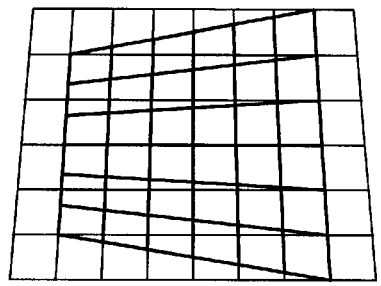
Figure 13D:
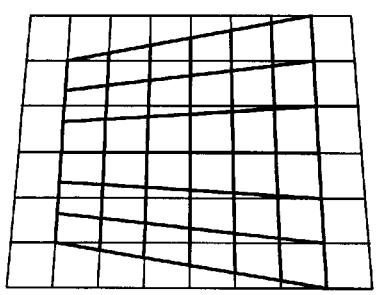
Figure 13D:
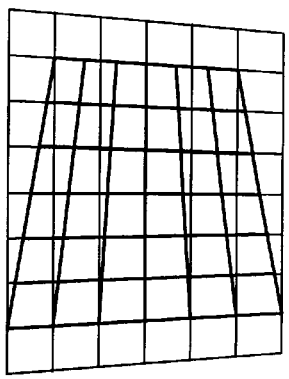

FIGS. 13A–13D demonstrate the manipulation of an image through an apparatus configured to offset keystone distortion for both tilt angle θ and pan angle α according to one embodiment of the invention. In FIG. 13A, an original image is resized (e.g., reduced) and deformed to offset tilt angle θ. FIG. 13B demonstrates the rotation of the once-deformed image by 90 degrees to prepare for farther deformation to counteract the effect of pan angle α. The direction of rotation (e.g., clockwise or counter-clockwise) may depend upon the sign of a. FIG. 13C depicts the further deformation of the image to offset the pan angle and the resizing (e.g., enlargement) of the image for a target display device. FIG. 13D demonstrates the counter-rotation of the image to prepare it for rendering on a display device.

In one alternative embodiment of the invention designed to offset keystone distortion when both tilt and pan angles are present, all resizing of an image is performed before it is deformed. Thus, image quality may be improved in this embodiment. A method of deriving a display image according to this embodiment is illustrated in FIGS. 14A–14F.

Figure 14A:
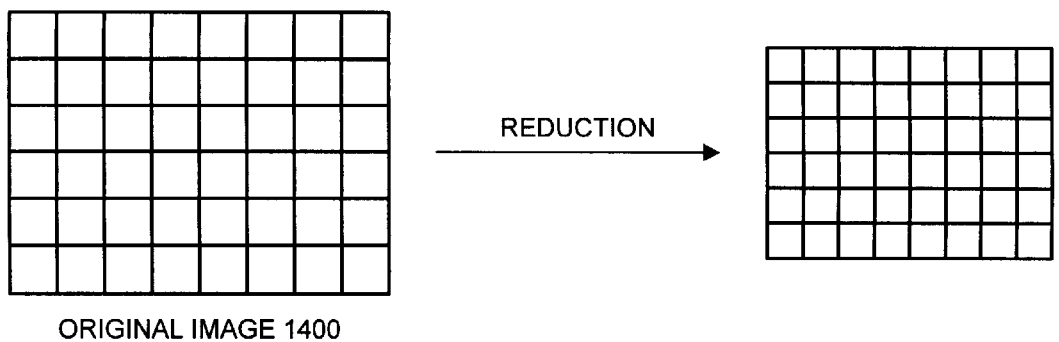
FIGS. 14A–14F depict an alternative derivation of a display image from an original image when both horizontal and vertical angles exist between the projector and a line normal to the viewing screen in accordance with an alternative embodiment of the invention.
Figure 14B:
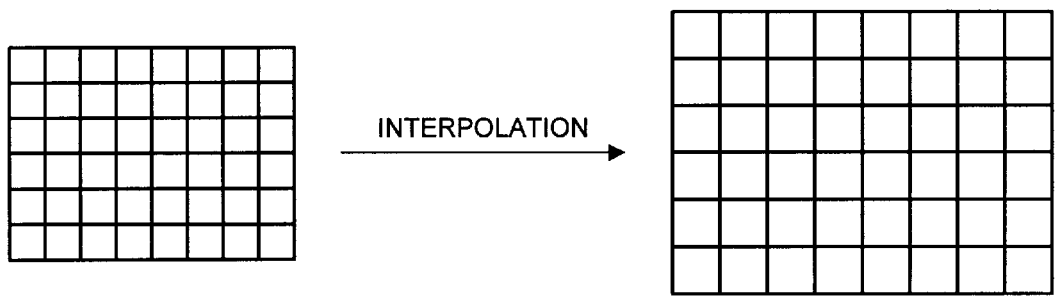
Figure 14C:
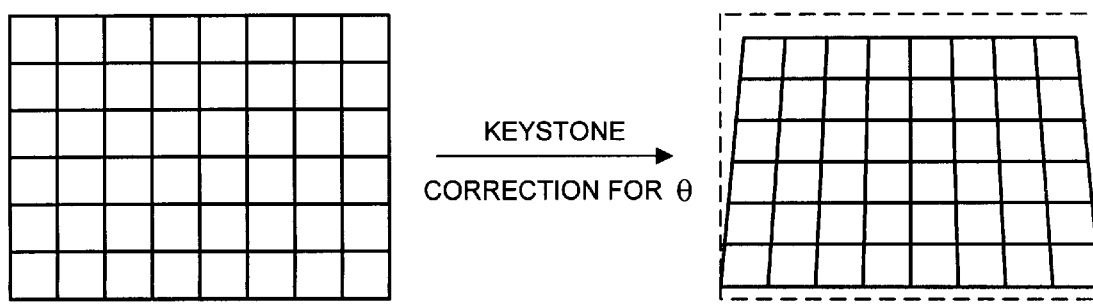
Figure 14D:
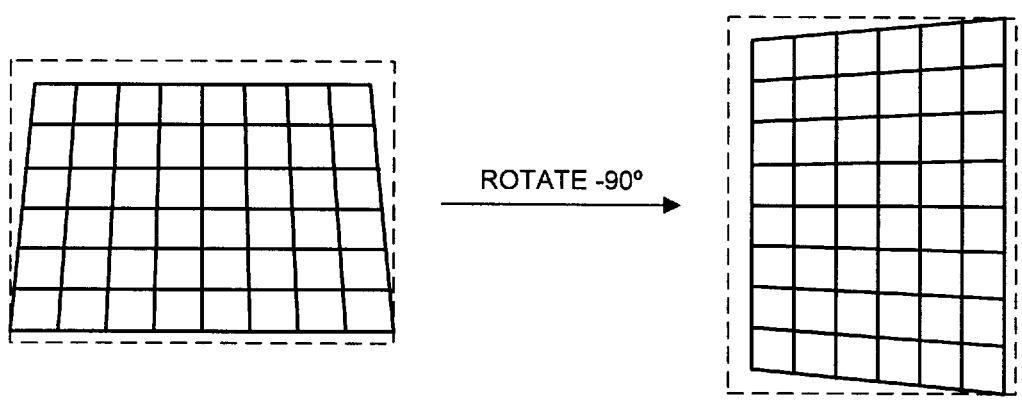
Figure 14E:
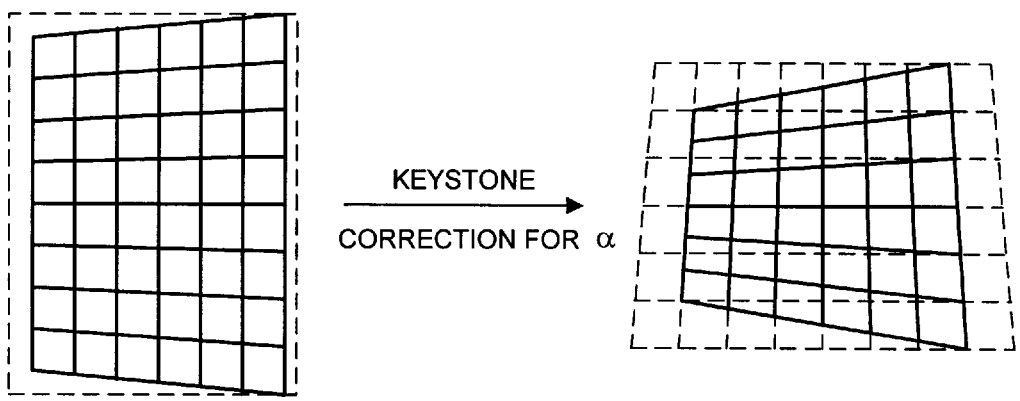
Figure 14F:
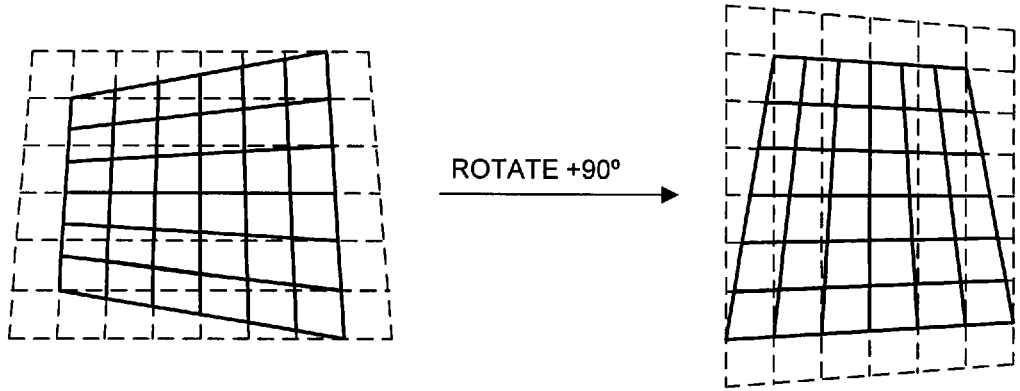

In FIG. 14A, original image 1400 is reduced in a digitizer module and in FIG. 14B is enlarged in a generator module. FIG. 14C demonstrates the subsequent deformation of the image to offset the vertical angle (e.g., tilt angle θ). This deformation may, of course, be combined with the enlargement of the image. In FIG. 14D, the once-deformed image is rotated 90 degrees to prepare for further deformation. This rotation may be performed by translating row-wise data into a columnar format. The second stage of deformation, to offset the horizontal angle (e.g., pan angle α) is illustrated in FIG. 14E. FIG. 14F demonstrates the rotation of the image back to its original orientation, either by re-interpreting the image data from row format to column format or by rendering the image as it is on a display device that has been rotated 90 degrees.

Figure 15A:
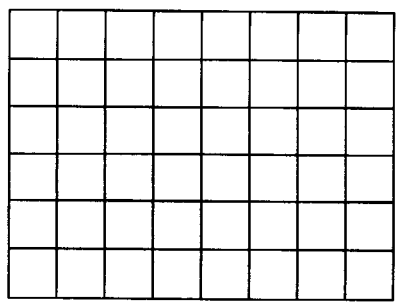
FIGS. 15A–15E depict an alternative derivation of a display image from an original image when both horizontal and vertical angles exist between the projector and a line normal to the viewing screen in accordance with an alternative embodiment of the invention.
Figure 15A:
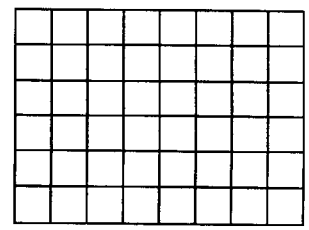
Figure 15B:
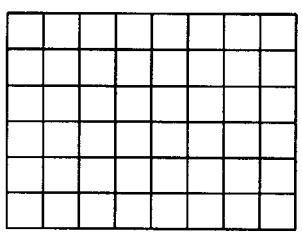
Figure 15B:
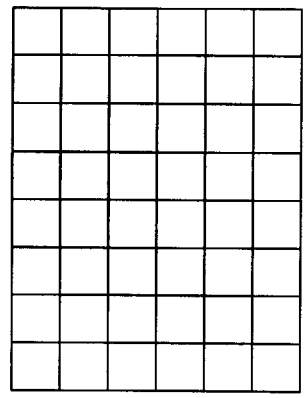

Another alternative embodiment of the invention may be particularly suitable for offsetting tilt and pan angles when a display device cannot be rotated 90 degrees. In this embodiment, illustrated in FIGS. 15A–15E, the image is rotated twice in memory. First, original image 1500 is reduced (e.g., scaled down according to the Reduce_X and Reduce_Y ratios) in a digitizer module as shown in FIG. 15A. Then the reduced image is rotated 90 degrees (e.g., according to the sign of pan angle α) and is scaled up (e.g., according to the Enlarge_X and Enlarge_Y ratios) as shown in FIG. 15B. The rotation may be performed by reading the image data of the reduced image created by a digitizer module in row-wise format and providing it to a generator module (for scaling up) in column-wise format.

Figure 15C:
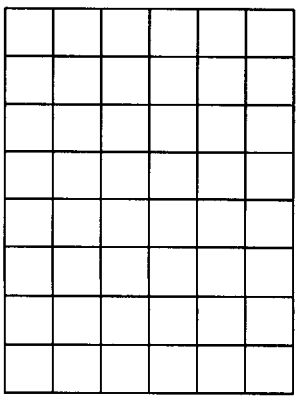
Figure 15C:
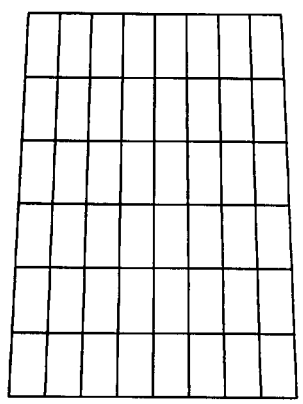
Figure 15D:
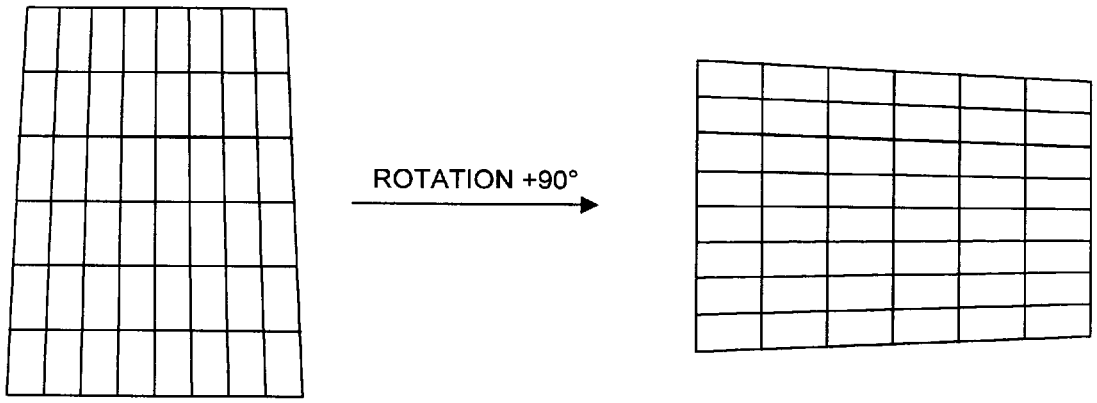
Figure 15E:
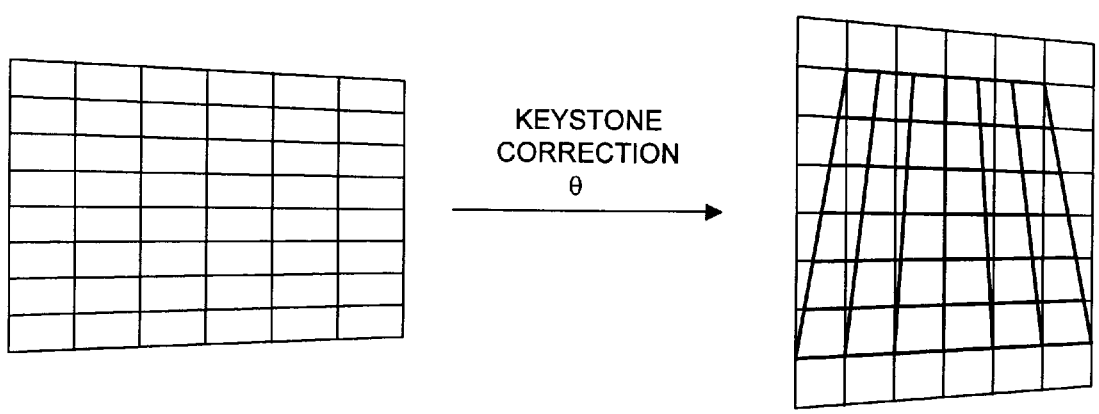

The image is then deformed according to the horizontal angle (e.g., pan angle α) as shown in FIG. 15C. The re-scaling and deformation shown in FIGS. 15B–15C may be combined. The once-deformed image is then rotated 90 degrees to its original orientation as shown in FIG. 15D. As depicted in FIG. 15E, the image may now be deformed to offset the vertical angle (e.g., tilt angle θ). The resulting display image may then be rendered on a display device in traditional row-wise manner.

Preventing Keystone Distortion in a Small or Relocated Image

In one embodiment of the invention an image may be required to fit a particular size or portion of a display device. In other words, instead of deforming an image and keeping it as large as possible (e.g., a full-sized display image), the image is deformed and reduced in size to match a specified portion of the display device or full-sized display image. The resulting projected image would thus be smaller in size and/or located in a different portion of the screen, but is still relatively free of keystone distortion.

Thus, this section describes a method of deriving a display image to meet a particular size or location requirement. The described method may be used with one or more of the apparatuses already presented. Illustratively, a set of parameters including one or more of those described in a previous section may be modified to accommodate the desired re-positioning or re-sizing of the display image.

Figure 16A:
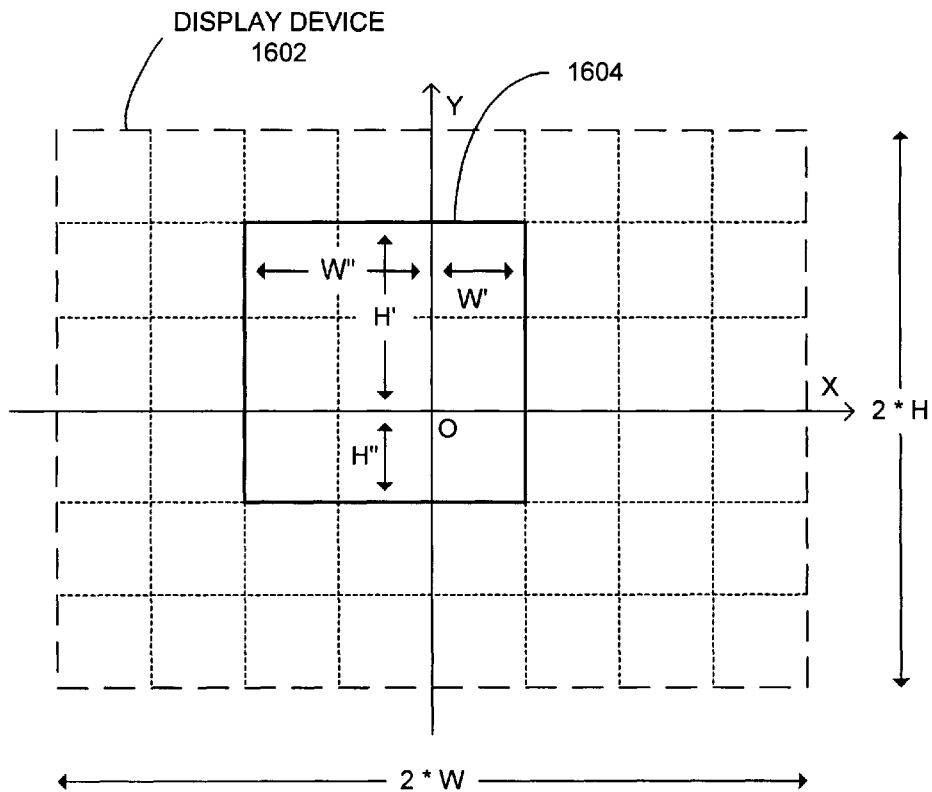
FIGS. 16A–16B demonstrate the prevention of keystone distortion in a display image of reduced size or off-centered placement in accordance with one embodiment of the invention.

FIG. 16A depicts a display device 1602 having an effective (i.e., usable) area outlined by dashed lines. If keystone distortion prevention was inactive, or both tilt angle θ and pan angle α had zero values, the display image would fit the outline of the display device. One or more methods of preventing keystone distortion that were described in previous sections attempted to keep a display image (e.g., Image_2) as large as possible within the usable area of the display device. In this section, however, a display image is intentionally reduced in size and/or positioned off-center in the display device.

In the embodiment of the invention depicted in FIG. 16A, the demarcated portion of the display device having the dimensions (W'+W") wide by (H'+H") high defines an area of the display device in which a display image is to be rendered. This portion is denoted by element 1604. Similar to the methods described above for deriving a display image using as much of the display device as possible, a display image fitting the marked portion of the display device may be derived, rendered and projected with no significant keystone distortion. The portion of the display device outside the delineated area in which the display image is to be rendered may be filled with a background color or may be disregarded.

In order to derive a display image tailored to the reduced area, a suitable set of parameters is defined and calculated. In FIG. 16A, the starting point or location of the reduced display image in terms of the Image_1 coordinate system may be represented as (−W", H'), where the Z value is known to be 0. Therefore, in the illustrated method of preventing keystone distortion while projecting a display image from a reduced area having dimensions (W'+W") by (H'+H"), SPY=H', EPY=−H", SPX=−W" and EPX=W'. As described in methods of the invention designed for "full-sized" display images, the parameters SPy, EPy, SPx(y) and EPx(y) may be derived from the Image_1 parameters.

Thus, this method is similar to the methods described above for "regular"-sized display images, except that the parameter set is tailored to the dimensions of the sub-area in which the reduced display image is rendered.

Figure 16B:
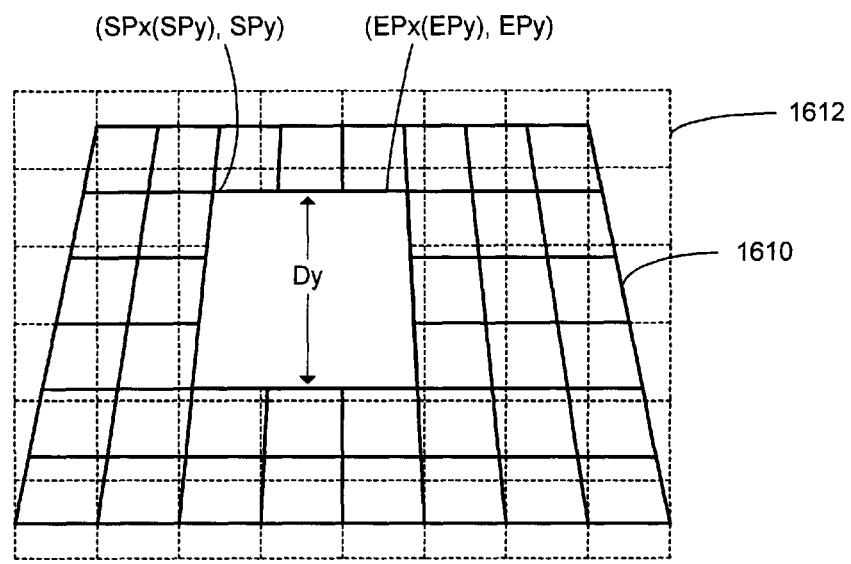

FIG. 16B demonstrates the result of deforming an original image (e.g., in a digitizer module) to fit within a sub-portion of the area in which a full-sized display image would appear. Element 1610 identifies the outline of the full-sized deformed image for comparison purposes, while element 1612 may be interpreted as the boundary of either the display panel in which the reduced display image is rendered or the memory area in which the reduced image is stored.

The portion of the display device or full-sized display image into which the image is condensed in FIG. 16B corresponds to area 1604 outlined in FIG. 16A. FIG. 16B illustrates how the dimension of a smaller display image to be derived from the image may differ from the overall deformed image. Thus, the four points (SPx(SPy), SPy), (EPx(SPy), SPy), (SPx(EPy), EPy) and (EPx(EPy), EPy) define the trapezoidal area into which the entire rectangular original image will be condensed to form a smaller, offset display and projection images.

Similar to previously described methods of the invention, deformation of an image to be displayed and projected in a smaller and/or off-center area may be performed in a generator module instead of a digitizer. Further, in the event that both tilt angle θ and pan angle α have non-zero values, deformation and/or resizing may be performed in both.

Illustratively, if deformation is performed in the digitizer module, as depicted in FIGS. 16A–16B, the original image and associated parameters may be modified or re-scaled in accordance with the dimensions of the area of memory in which the image is to be stored or retrieved from. The image is then reduced and deformed according to the desired area of the display device in which the reduced display image is to be rendered. The deformed image may then be stored in an area of memory identified by parameters such as SPy, Dy, SPx(y) and Dx(y). The area of memory from which the deformed image is then read (e.g., by a generator module) may be identified, as above, by the parameters Start_Read_X, Start_Read_Y, Read_X and Read_Y. Illustratively, this memory area may correspond to the effective area of a full-sized display image.

If deformation is performed in a generator module, the image retrieved from memory may first be interpolated (e.g., enlarged) as necessary, and then deformed to fit the designated portion of the display device.

Figure 17A:
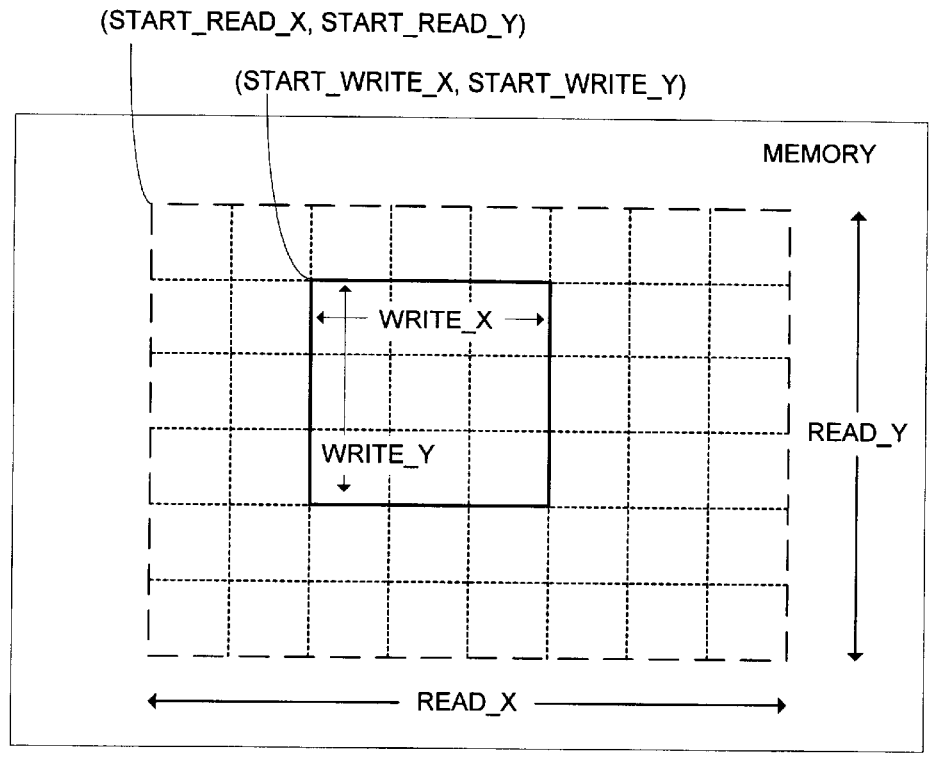
FIGS. 17A–17B demonstrate the prevention of keystone distortion in a display image of reduced size or off-centered placement in accordance with one embodiment of the invention.
Figure 17B:
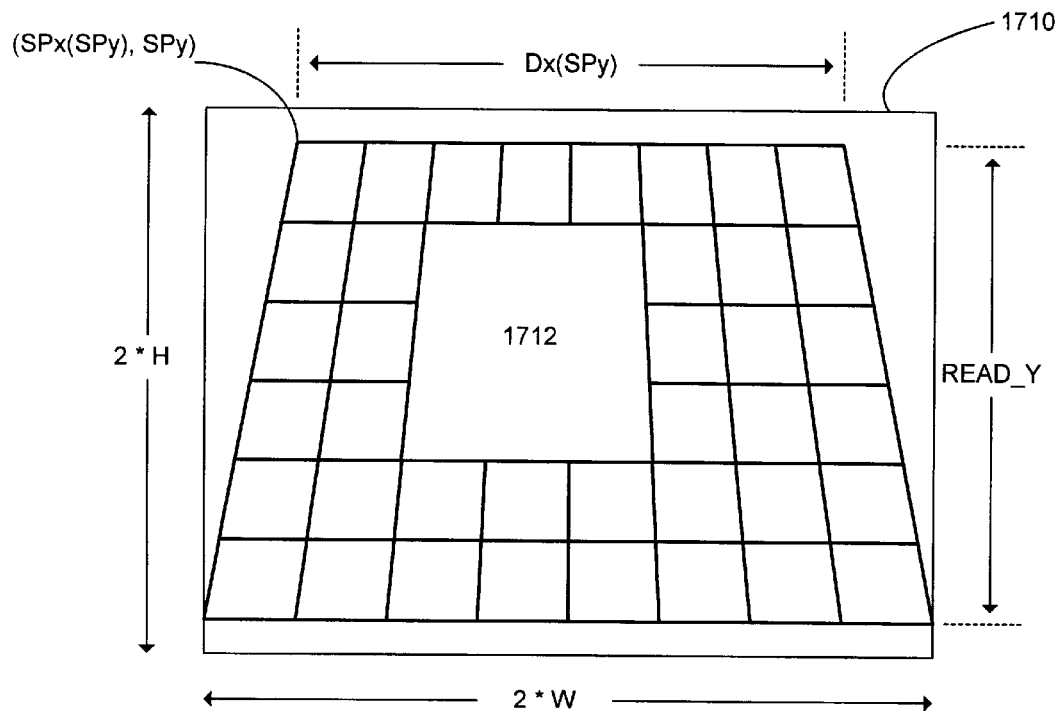

In one particular alternative method of preventing keystone distortion in a smaller and/or off-center image, deformation of the image for a particular area is performed in a generator module. This method is depicted in FIGS. 17A–17B and is well suited for situations in which the display device sub-area in which a display image is to rendered changes (e.g., for one image or from one image to another) size or location. In this alternative method, the image data is stored for retrieval by the generator in an area smaller than the memory area retrieved by the generator, but which is proportional to the display area of the display device.

In particular, after the image is shrunk (if necessary) by a digitizer, it is stored in memory beginning at location (Start_Write_X, Start_Write_Y), as described above in conjunction with another embodiment of the invention. The portion of memory in which this shrunken image data is stored has dimensions Write_X by Write_Y. The memory area from which the image data is read or retrieved by a generator module has dimensions Read_X by Read_Y and starts at location (Start_Read_X, Start_Read_Y). In this method, the dimensions of the memory area read by the generator are greater than the dimensions of the memory area in which the shrunk image was stored.

And, illustratively, the ratio (2*W): Read_X is equal to the ratio (W'+W"): Write_X. This common ratio may be implemented as the horizontal generator re-scaling ratio (i.e., Enlarge_X). Similarly, the ratio (2*H): Read_Y is then equal to the ratio (H'+H"): Write_Y, which may be implemented as the vertical generator re-scaling ratio (i.e., Enlarge_Y).

After the generator re-scaling operation, the image may be deformed to offset keystone distortion and to fit into the specified portion of the display device. In particular, the coordinates (Start_Write_X, Start_Write_Y) are mapped to the starting position of the display portion (–W", H') in the display device. Thus, a fixed parameter set may be applied to deform the image data received by the generator.

The resulting projected image is shown in FIG. 17B as element 1712. The outline of the viewing screen is denoted 1710.

Equalizing Image Luminance

In one embodiment of the invention the intensity of original images is regulated in order to control the appearance of the image projected onto a viewing screen. For example, it may be desirable to ensure a uniform luminance across the projected image. Without some mechanism for controlling or equalizing the luminance, it may vary from line to line after an original image is resized and deformed prior to its display and projection.

Figure 18A:
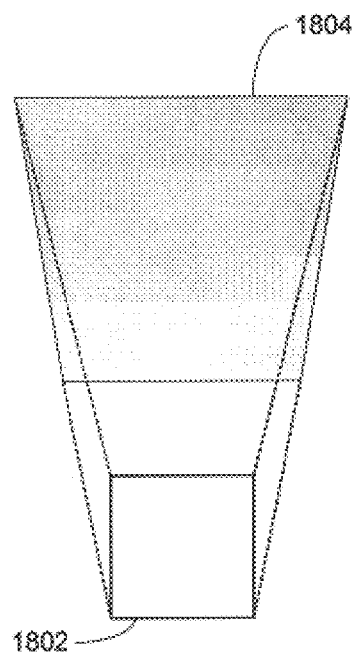
FIGS. 18A–18C illustrate the equalization of light intensity of an original image in accordance with one embodiment of the invention.
Figure 18B:
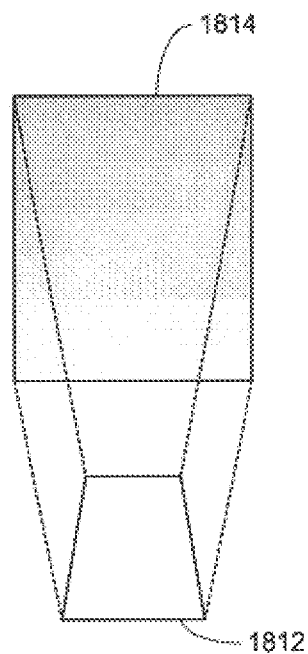
Figure 18C:
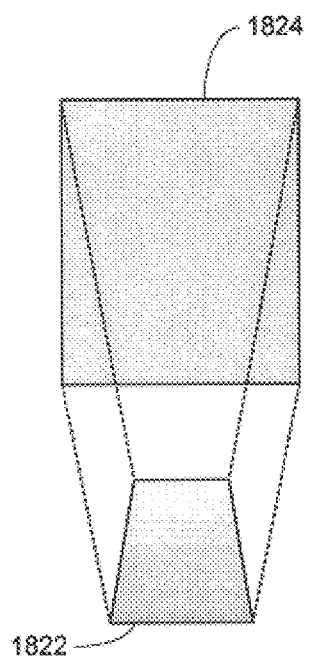

FIGS. 18A–18C depict the uneven lighting of a projected image that may occur if not corrected, and the effect on the projected image of equalizing its luminance. In FIG. 18A, display image 1802 is not deformed and the intensity of the image is not modified from the original image. The resulting projection image 1804 thus suffers from keystone distortion and uneven light intensity. In particular, the top of the image is darker than the bottom, which may be due to the display device (e.g., LCD panel) receiving or possessing a greater intensity of light for lower portions of a rendered image than for upper portions.

FIG. 18B demonstrates the effect of correcting keystone distortion without adjusting the luminance of display image 1812. Projected image 1814 is thus of an acceptable shape, but still suffers from uneven lighting. FIG. 18C depicts projected image 1824 that results from display image 1822 in which keystone distortion is prevented and luminance is equalized.

Illustratively, either a lower portion of a display image may be darkened or an upper portion may be lightened in order to equalize the luminance of the projected image. Whichever solution is selected, however, in one embodiment of the invention it is applied on a line-by-line basis in order to most effectively counteract the unequal lighting. In particular, the lower the line in the display device the more it should be decreased in intensity, while the higher the line the more the intensity should be increased.

In one embodiment of the invention uneven luminance is corrected by adjusting the original image line-by-line, in proportion to its initial intensity and/or ultimate position on the display device. Thus, the intensity of each line is diminished or attenuated, from top to bottom, with lower lines of the original image being attenuated more than upper lines.

In particular, equations (21) and (22) demonstrate how SPy and EPy may be calculated for an original image, based on d, H and tilt angle θ. The attenuation factor or ratio for each line, from SPy to EPy (e.g., from the top of the image to the bottom) may be expressed as $$A(y) = Dx(SPy)/Dx(y). \tag{41}$$

One may see that A(y) for the top line (i.e., SPy) is equal to one, indicating the least amount of attenuation, while A(EPy) will produce the maximum attenuation.

This equation is specified in terms of y because it is tailored to equalizing luminance in an image in which only tilt angle θ is present. One skilled in the art will readily perceive how this attenuation factor may be determined for an image in which only pan angle α is present. If equation (41) results in the luminance of an image being diminished too much (e.g., to where the projected image is too dark), the luminance of the original image may be increased overall, or the intensity of light produced by the light source of the projection apparatus may be increased.

For an original image in which both tilt angle θ and pan angle α are present, attenuation of the image intensity may be performed in two stages. Equation (41) may be applied to attenuate the image for tilt angle θ, while pan angle α may be addressed by applying the following for values of x from SPx to EPx:

$$A(x)=Dy(SPx)/Dy(x). \tag{42}$$

The image may be rotated 90 degrees before applying equation (42). Afterward, the image is then rotated back to its original orientation for display. Illustratively, the brightness control of the projection apparatus may be adjusted in order to affect the overall intensity of the projected image after the luminance within the image has been equalized.

Figure 24:
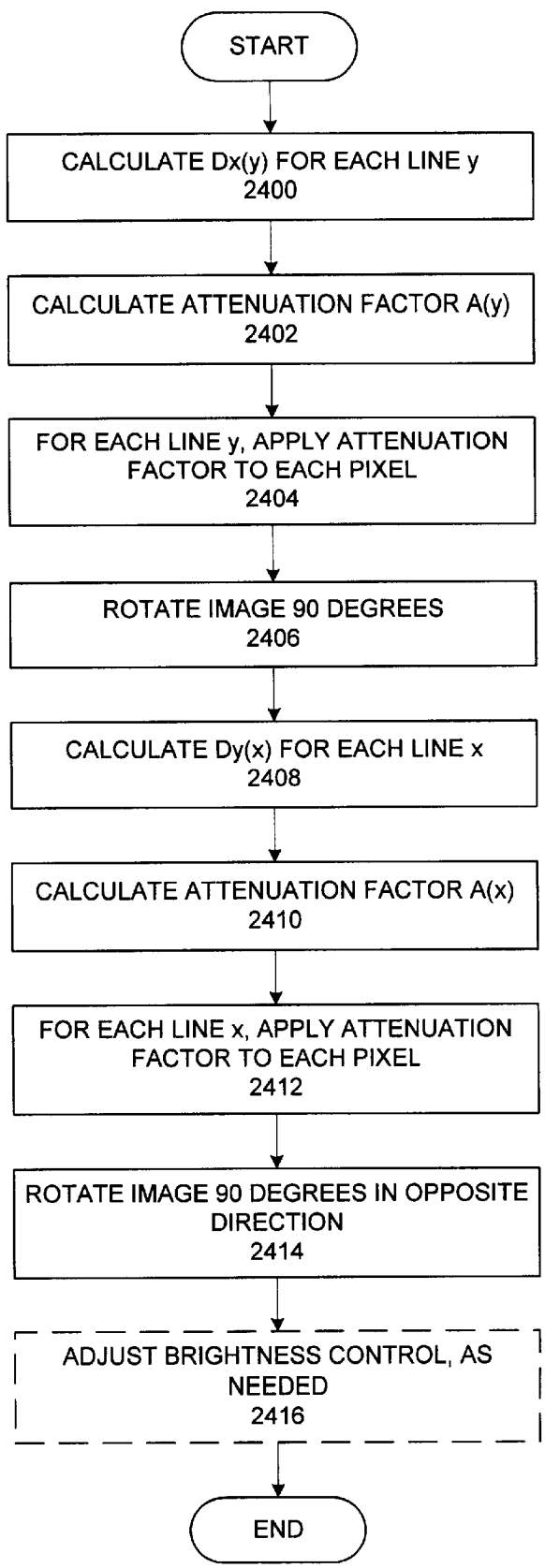
FIG. 24 is a flowchart demonstrating one method of equalizing the luminance of an image by attenuating its intensity in accordance with one embodiment of the invention.

FIG. 24 is a flowchart demonstrating one method of equalizing the luminance of an image by attenuating its intensity in accordance with one embodiment of the invention. This method is suited for a situation in which both tilt angle θ and pan angle α are present. The illustrated method may be easily modified, as apparent to one skilled in the art, to suit a projection system in which only one angle has a non-zero value.

In state 2400 the dimension of (e.g., number of pixels within) each line y (i.e., Dx(y)) of an image is calculated. This parameter may be calculated along with other parameters identified above, such as during the computation of an effective area for an Image_2.

In state 2402 a first attenuation factor, designated A(y) to denote its correlation to vertical angle θ, is calculated for each line y. In particular, A(y)=Dx(SPy)/Dx(y).

Then, in state 2404, the vertical attenuation factors are applied within each line of the image. In particular, within each line y, from SPy to EPy, for x=SPx(y) to x=EPx(y) the luminance of each pixel P having coordinates (x, y) is adjusted. In particular, P'(x, y)=P(x, y)*A(y).

In state 2406 the image is rotated 90 degrees to prepare for a second stage of attenuation to address horizontal angle α. Illustratively, an image may be rotated by interpreting each row as a column. The direction in which the image is rotated may depend upon the sign of angle α. In order to reflect the rotation of the image, each pixel P'(x, y) may now be represented as P'(y, x) for the following computations, until the image is rotated back to its original orientation. Similarly, parameters such as Dy(x) should be interpreted in light of the image rotation.

In state 2408, the dimension of each line x (i.e., Dy(x)) in the rotated image is calculated. As with the calculations in state 2402, state 2408 may be performed in succession or combination with another image operation (e.g., resizing or deformation of an image in accordance with angle α).

In state 2410 attenuation factor A(x), correlating to the pan angle, is calculated for each line x. In particular, A(x)=Dy(SPx)/Dy(x).

In state 2412 each respective attenuation factor A(x) is applied within the corresponding line of the image. In particular, within each line x, from SPx to EPx, for y=SPy(x) to y=EPy(x) the luminance of each pixel P' having coordinates (y, x) is adjusted. In particular, P"(y, x)=P'(y, x)*A(x).

In state 2414 the image is then rotated 90 degrees opposite to the direction in which previously rotated. Thus, each pixel P"(y, x) resulting from state 2412 may now be represented as pixel P"(x, y) because the image is once again in its original orientation.

In state 2416 a brightness control may be applied or adjusted, such as when the image is projected. For example, this may be necessary if the luminance of the image, although substantially equalized, is adjudged too low or too high for aesthetic reasons.

In the preceding description, values of Dx(y), A(y), etc., for each line y or, after rotation, x, were calculated together. In one alternative method, one line at a time may be addressed. In other words, one or more states of FIG. 24 may be performed for just a single line at a time. For example, starting with SPy, Dx(SPy) may be calculated (state 2400), then A(SPy) (state 2402), then A(SPy) may be applied to each pixel in just line SPy (state 2404), then line SPy may be rotated (state 2406), etc.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of projecting an image from a projection system onto a viewing surface without significant keystone distortion, comprising:
    receiving an image at the projection system;
    reducing said image in accordance with a first scaling ratio;
    enlarging said image in accordance with a second scaling ratio;
    deforming said image in accordance with a first angle defined between said projection system and the viewing surface to create a display image;
    rendering said display image on a display device; and
    projecting a portion of said display image onto the viewing surface without significant keystone distortion.

2. The method of claim 1, further comprising storing said image after said reducing and prior to said enlarging.

3. The method of claim 1, wherein said deforming is performed in cooperation with said reducing.

4. The method of claim 1, wherein said deforming is performed in cooperation with said enlarging.

5. The method of claim 1, further comprising rotating said image.

6. The method of claim 1, wherein said first scaling ratio is no greater than one.

7. The method of claim 1, wherein said second scaling ratio is no less than one.

8. The method of claim 1, wherein said deforming comprises:
    identifying a usable area of the display device in which to render said image; and
    calculating a first portion of said image to be represented in a first portion of said usable area.

9. The method of claim 8, wherein said identifying comprises applying a geometrical relationship between the display device and a representation of said image situated in a plane parallel to the viewing surface.

10. The method of claim 1, further comprising offsetting said image prior to said deforming.

11. The method of claim 1, further comprising:
deforming said image in accordance with a second angle defined between said projection system and the viewing surface.

12. A method of generating an image for projection from a projection system without significant keystone distortion, wherein an axis of projection of the projection system is aligned at a non-perpendicular angle with a viewing screen, the method comprising:
receiving an original image having a set of dimensions;
maintaining a set of parameters relating to a geometrical relationship between a display device of the projection system and a plane parallel to the viewing screen;
defining a usable area of the display device in which a representation of said original image may be rendered;
for one or more portions of said usable area, identifying a corresponding portion of said original image;
rendering characteristics of said corresponding portions of said original image to generate a display image for projection by the projection system onto the viewing screen; and
adjusting the intensity of said display image to provide for substantially equal luminance throughout said display image;
wherein said display image may be projected without significant keystone distortion.

13. The method of claim 12, further comprising applying a scaling factor to alter said dimensions of said original image prior to said rendering.

14. The method of claim 12, further comprising offsetting said original image prior to said identifying.

15. The method of claim 12, wherein said defining comprises:
identifying a first line of said display image;
identifying a last line of said display image;
identifying, for each line of said display image, a first position at which to render a representation of a corresponding portion of said rectangular image; and
identifying, for each line of said display image, a last position at which to render a representation of a corresponding portion of said rectangular image.

16. The method of claim 15, further comprising determining a number of lines of said display image.

17. The method of claim 15, further comprising determining a number of positions in one or more lines of said display image.

18. The method of claim 12, wherein said identifying a corresponding portion of said original image for one or more portions of said usable area comprises:
determining the coordinates of a position in said usable area; and
calculating coordinates of one or more positions in said original image corresponding to said position in said usable area.

19. The method of claim 18, wherein said calculating coordinates of one or more positions comprises calculating one or both of a horizontal and vertical scaling factor to be applied to said coordinates of a position in said usable area.

20. The method of claim 18, firther comprising storing a set of parameters to facilitate the calculation of said coordinates of one or more positions in said original image.

21. The method of claim 12, wherein said identifying a corresponding portion of said original image for one or more portions of said usable area comprises:
identifying a first position in a first line of said original image;
identifying a next position in said first line by accumulating a horizontal incremental factor; and
identifying a position in a next line in said original image by accumulating a vertical incremental factor.

22. The method of claim 21, wherein one or more of said horizontal incremental factor and said vertical incremental factor encompass a scaling factor to alter said original image dimensions.

23. A method of transforming an input image to form an output image for projection from a projection system onto a screen, wherein the input image is deformed to offset keystone distortion, the method comprising:
determining a vertical angle between the projection system and normal to the screen;
determining a horizontal angle between the projection system and a normal to the screen;
receiving an input image;
if said vertical angle is greater than or less than zero, transforming said input image to correct for keystone distortion that may be caused by said vertical angle; and
if said horizontal angle is greater than or less than zero, transforming said input image to correct for keystone distortion that may be caused by said horizontal angle.

24. The method of claim 23, further comprising resizing said input image.

25. An apparatus for projecting an image onto a viewing surface with minimal keystone distortion, comprising:
a first memory configured to store an entire original image received from an image source;
a deformation module configured to deform said original image, in accordance with one or more scaling factors derived from an angle formed between said projection axis and a line normal to the viewing surface, to form a display image;
a second memory configured to store a set of parameters for facilitating said deformation of said original image, including said one or more scaling factors;
a luminance module configured to substantially equalize the luminance of said display image;
a display device configured to display said display image; and
a light source configured to project said display image along a projection axis onto a viewing screen.

26. The apparatus of claim 25, wherein said original image is received with a first set of dimensions, further comprising a re-scaling module configured to alter said set of dimensions.

27. The apparatus of claim 26, wherein said deformation module comprises said re-scaling module.

28. The apparatus of claim 25, wherein said set of parameters includes one or more parameters describing an area of said display device in which to display said display image.

29. The apparatus of claim 25, wherein said set of parameters includes one or more parameters configured to facilitate the identification of a portion of said original image to be represented within a portion of said display device.

30. A projection system for projecting an image onto a viewing surface with minimal keystone distortion, comprising:
a digitizer configured to receive an image from an image source, wherein said image is received having a size;
a resizing module configured to alter said size of said image;

a keystone module configured to deform a portion of said image to create a display image by offsetting keystone distortion that would occur from projecting said image;

a display device configured to display said display image;

a generator configured to forward said display image to said display device;

a memory configured to store a set of parameters for facilitating one or more of said deformation of said portion of said image and said resizing of said image; and a light source configured to project said display image from said display device onto the viewing screen.

31. The projection system of claim 30, where said keystone module deforms said image in accordance with an angle formed between a projection axis of said light source and a line normal to the viewing surface.

32. The projection system of claim 30, wherein said digitizer comprises said keystone module.

33. The projection system of claim 30, wherein said generator comprises said keystone module.

34. The projection system of claim 30, further comprising a second keystone module.

35. The projection system of claim 30, further comprising an attenuator configured to attenuate a luminance intensity of a portion of said image.

36. An apparatus for deforming an input image to offset keystone distortion, comprising:

a projector configured to project a display image onto a screen to form a projection image;

an angle acquisition module configured to determine an angle between said projector and a normal to the screen; and an image processing module configured to transform said input image into said display image, comprising:

a first angle correction module configured to deform said input image in accordance with a vertical aspect of said angle;

a second angle correction module configured to deform said input image in accordance with a horizontal aspect of said angle; and a re-scaling module configured to resize said input image.

37. The apparatus of claim 36, wherein said image processing module further comprises a rotation module configured to rotate an image ninety degrees.

38. A computer readable storage medium storing instructions that, when executed by a computer, cause the computer to perform a method of generating an image for projection from a projection system without significant keystone distortion, wherein an axis of projection of the projection system is aligned at a non-perpendicular angle with a viewing screen, the method comprising:

receiving an original image having a set of dimensions;

maintaining a set of parameters relating to a geometrical relationship between a display device of the projection system and a plane parallel to the viewing screen;

defining a usable area of the display device in which a representation of said original image may be rendered;

for one or more portions of said usable area, identifying a corresponding portion of said original image; and rendering characteristics of said corresponding portions of said original image to generate a display image for projection by the projection system onto the viewing screen;

wherein said display image may be projected without significant keystone distortion.

* * * * *

UNITED STATES PATENT AND TRADEMARK OFFICE
CERTIFICATE OF CORRECTION

PATENT NO. : 6,367,933 B1
DATED : April 9, 2002
INVENTOR(S) : Shuei-Lin Chen et al.

It is certified that error appears in the above-identified patent and that said Letters Patent is hereby corrected as shown below:

<u>Title page,</u>
Insert Item:
-- Related U.S. Application Data
[60] Provisional application No. 60/102,889, October 2, 1998 --

<u>Column 1,</u>
Line 3, after the title, please insert:
-- Cross-Reference to Related Application This application is the U. S. National Phase of PCT/US99/22726, filed Oct. 1, 1999, which claims the benefit of Provisional Patent Application No. 60/102,889, filed Oct. 2, 1998. --

Signed and Sealed this

Seventh Day of September, 2004

JON W. DUDAS
*Director of the United States Patent and Trademark Office*